United States Patent
Juhasz et al.

(10) Patent No.: US 11,323,949 B2
(45) Date of Patent: *May 3, 2022

(54) DEAD ZONE IN SMALL CELL APPLICATION

(71) Applicants: Paul R. Juhasz, Houston, TX (US); Christopher Frerking, Frankford (CA); James Tiernan, Houston, TX (US)

(72) Inventors: Paul R. Juhasz, Houston, TX (US); Christopher Frerking, Frankford (CA); James Tiernan, Houston, TX (US)

(73) Assignee: DEADZONE US, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,978

(22) Filed: Jun. 4, 2019

(65) Prior Publication Data
US 2019/0373532 A1    Dec. 5, 2019

Related U.S. Application Data

(63) Continuation-in-part of application No. 15/986,339, filed on May 22, 2018, which is a continuation-in-part of application No. 15/910,190, filed on Mar. 2, 2018, now Pat. No. 10,341,937, and a continuation-in-part of application No. 15/663,660, filed on Jul. 28, 2017, which is a continuation-in-part of application No. 15/620,288, filed on Jun. 12, 2017, now Pat. No. 9,913,200, which is a continuation-in-part of
(Continued)

(51) Int. Cl.
| | |
|---|---|
| H04W 24/00 | (2009.01) |
| H04W 36/00 | (2009.01) |
| H04W 48/04 | (2009.01) |
| H04W 48/16 | (2009.01) |
| H04W 64/00 | (2009.01) |
| H04W 48/10 | (2009.01) |
| H04M 1/72463 | (2021.01) |

(52) U.S. Cl.
CPC ....... *H04W 48/04* (2013.01); *H04M 1/72463* (2021.01); *H04W 48/10* (2013.01); *H04W 48/16* (2013.01); *H04W 64/003* (2013.01)

(58) Field of Classification Search
None
See application file for complete search history.

(56) References Cited

U.S. PATENT DOCUMENTS

| | | | | |
|---|---|---|---|---|
| 6,937,868 B2 * | 8/2005 | Himmel | ................ | H04M 1/642 |
| | | | | 455/412.1 |
| 8,606,656 B1 * | 12/2013 | Franklin | ................ | G06Q 30/06 |
| | | | | 705/27.1 |

(Continued)

*Primary Examiner* — Erika A Washington
(74) *Attorney, Agent, or Firm* — The Juhasz Law Firm

(57) ABSTRACT

A communication system includes a wireless device capable of performing a function. A network is configured to communicate with the wireless device to provide a network service. A small cell is in a location, the small cell is configured to control a communication link between the wireless device and the network. A register includes a database of restrictions on the function of the wireless device at the location. The system is configured to query whether the wireless device is within the location, and to apply the restrictions to the wireless device when the wireless device is in the location.

48 Claims, 42 Drawing Sheets

Related U.S. Application Data application No. 13/462,712, filed on May 2, 2012, now Pat. No. 9,681,358, which is a continuation of application No. 12/571,090, filed on Sep. 30, 2009, now abandoned.

(60) Provisional application No. 62/680,166, filed on Jun. 4, 2018, provisional application No. 62/562,880, filed on Sep. 25, 2017, provisional application No. 62/369,620, filed on Aug. 1, 2016, provisional application No. 62/368,833, filed on Jul. 29, 2016, provisional application No. 62/368,828, filed on Jul. 29, 2016, provisional application No. 61/195,016, filed on Oct. 2, 2008.

(56) References Cited

U.S. PATENT DOCUMENTS

| | | | | |
|---|---|---|---|---|
| 9,681,358 B2* | 6/2017 | Juhasz | | H04W 48/02 |
| 9,913,200 B2* | 3/2018 | Juhasz | | H04W 48/02 |
| 10,341,937 B2* | 7/2019 | Juhasz | | H04W 48/02 |
| 2006/0063560 A1* | 3/2006 | Herle | | H04W 36/32 455/552.1 |
| 2009/0124235 A1* | 5/2009 | Bosch | | H04W 64/003 455/411 |
| 2009/0325566 A1* | 12/2009 | Bell | | H04W 4/029 455/419 |
| 2011/0077022 A1* | 3/2011 | Scovill | | H04L 41/12 455/456.1 |
| 2011/0134833 A1* | 6/2011 | Gogic | | H04W 52/0206 370/328 |
| 2013/0077482 A1* | 3/2013 | Krishna | | H04W 36/22 370/230 |
| 2013/0143528 A1* | 6/2013 | Randazzo | | H04W 48/04 455/411 |
| 2013/0337765 A1* | 12/2013 | Salkini | | H04W 48/04 455/404.1 |
| 2014/0309864 A1* | 10/2014 | Ricci | | A61B 5/0077 701/36 |
| 2015/0256545 A1* | 9/2015 | Dotterer, III | | H04L 63/10 726/1 |
| 2017/0026382 A1* | 1/2017 | Trigger | | H04L 63/102 |
| 2017/0041454 A1* | 2/2017 | Nicholls | | H04L 67/16 |

\* cited by examiner

FIG. 7

NZR — 32

| STATE 1 | ALLOWABLE |
| STATE 2 | NOT ALLOWABLE |
| . | . |
| . | . |
| . | . |
| . | . |

TOUCH SENSITIVE SCREEN

Dashboard on External Utility Controlled Functions ~1123

| Function | Enabled | Disabled | Modified | Script | Function | Enabled | Disabled | Modified | Script |
|---|---|---|---|---|---|---|---|---|---|
| Text messaging | | X | | Network Disabled | Voice-activated virtual assistant | X | | | |
| SMS messaging | | X | | Network Disabled | Siri, Google Voice Search and Cortana). | X | | | |
| Email | | X | | Network Disabled | Alarm clock, stopwatch, timer | X | | | |
| Camera | X | | | | Calculator | X | | | |
| Phone and contact address book | X | | | | Calendar | X | | | |
| Texting | | X | | Network Disabled | Note taker | X | | | |
| Video calling (Apple FaceTime) | | | X | Network Throttled down signal strength | Music player | X | | | |
| Web browser | | | X | Throttled down signal strength | Photo album | X | | | |
| E-mail | | | X | Network Disabled | Camera (still and video) | X | | | |
| Weather | X | | | | GPS navigation | | | X | Network and Wireless Device Throttled down signal strength |
| Predictive typing (see predictive text). | X | | | | App store search | X | | | |
| Voice dictation | X | | | | | | | | |

FIG. 11B-1

TOUCH SENSITIVE SCREEN

Dashboard on Wireless Device Controlled Functions

| Function | Enabled | Disabled | Modified | Script |
|---|---|---|---|---|
| Text messaging | X | | | |
| SMS messaging | X | | | |
| Email | X | | | |
| Camera | | X | | Wireless Device Disabled |
| Phone and contact address book | | | X | Wireless Device Throttled down signal strength |
| Texting | X | | | |
| Video calling (Apple FaceTime) | X | | | |
| Web browser | X | | | |
| E-mail | X | | | |
| Weather | | | X | Wireless Device Throttled down signal strength |
| Predictive typing (see predictive text). | | | X | Wireless Device Throttled down signal strength |
| Voice dictation | | | X | Wireless Device Throttled down signal strength |

| Function | Enabled | Disabled | Modified | Script |
|---|---|---|---|---|
| Voice-activated virtual assistant | | | X | Wireless Device Throttled down signal strength |
| Siri, Google Voice Search and Cortana) | | | X | Wireless Device Throttled down signal strength |
| Alarm clock, stopwatch, timer | | | X | Wireless Device Throttled down signal strength |
| Calculator | | | X | Wireless Device Throttled down signal strength |
| Calendar | | | X | Wireless Device Throttled down signal strength |
| Note taker | | | X | Wireless Device Throttled down signal strength |
| Music player | | | X | Wireless Device Throttled down signal strength |
| Photo album | | | X | Wireless Device Throttled down signal strength |
| Camera (still and video) | | X | | Network Disabled |
| GPS navigation | | | X | Network and Wireless Device Throttled down signal strength |
| App store search | | | X | Wireless Device Throttled down signal strength |

| Wireless Device Enabled | Network Enabled | Wireless Device Disabled | Network Disabled | Wireless Device Modified | Network Modified | Output Enabled | Output Disabled | Output Modified |
|---|---|---|---|---|---|---|---|---|
| X | X | | | | | X | | |
| X | | | X | | | | X | |
| X | | | | | X | | | X |
| | X | X | | | | | X | |
| | X | | | X | | | | X |
| | | X | X | | | | X | |
| | | X | | | X | | X | |
| | | | X | X | | | X | |
| | | | | X | X | | | X |

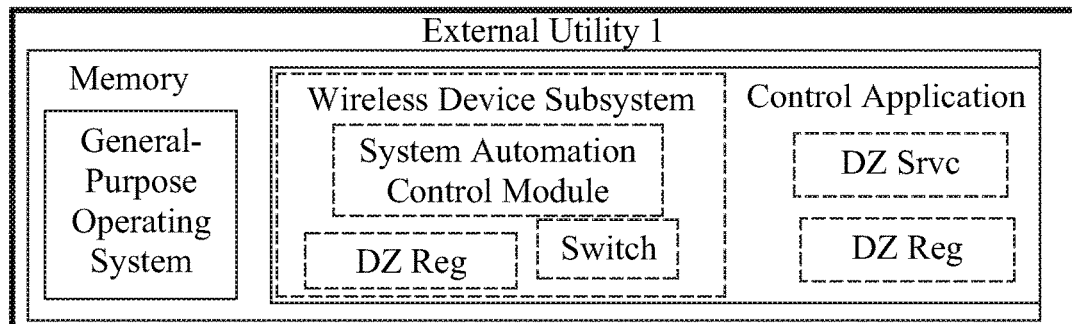
*FIG. 13B*
| Device | Reg. Info | Reg. Date | Permitted Users | User Recognition | Location of Use | Deadzone1 | DeadzoneN | Functionalities Disabled | Other |
|--------|-----------|-----------|-----------------|------------------|-----------------|-----------|-----------|--------------------------|-------|
|        |           |           |                 |                  |                 |           |           |                          |       |
|        |           |           |                 |                  |                 |           |           |                          |       |
*FIG. 13C*
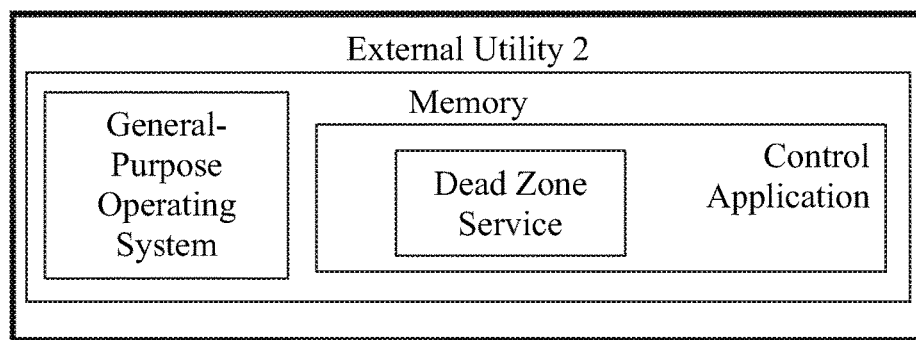
*FIG. 13D*

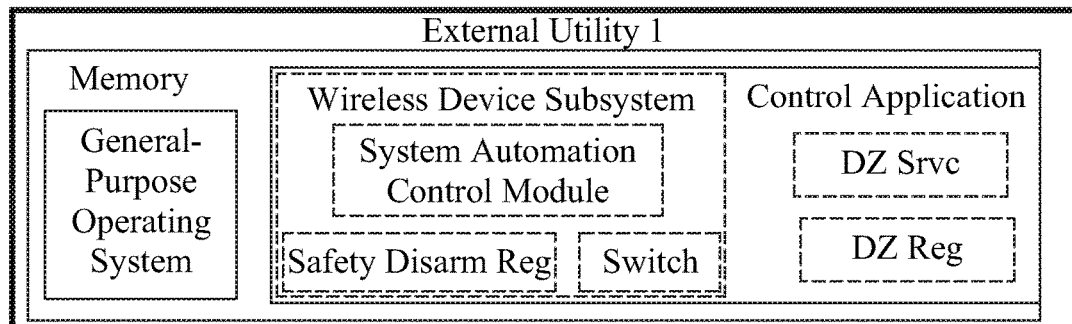
FIG. 14B
| Firearm | Reg. Info | Reg. Date | Permitted Users | User Recognition | Location of Use | Deadzone1 | DeadzoneN | Functionalities Disabled | Other |
|---|---|---|---|---|---|---|---|---|---|
|  |  |  |  |  |  |  |  |  |  |
|  |  |  |  |  |  |  |  |  |  |
|  |  |  |  |  |  |  |  |  |  |
FIG. 14C
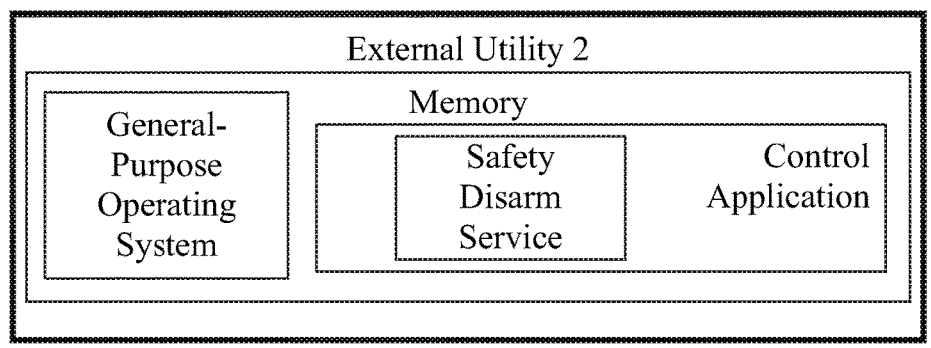
FIG. 14D

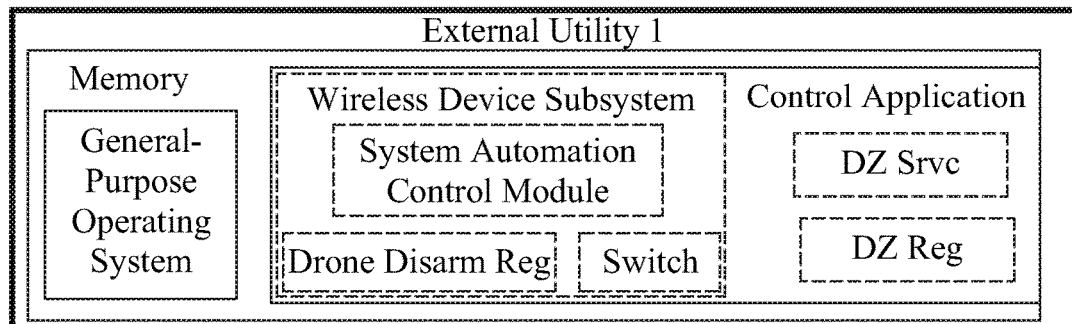
FIG. 15B
| Drone Device | Reg. Info | Reg. Date | Permitted Users | User Recognition | Location of Use | Deadzone1 | DeadzoneN | Functionalities Disabled | Other |
|---|---|---|---|---|---|---|---|---|---|
| | | | | | | | | | |
| | | | | | | | | | |
FIG. 15C
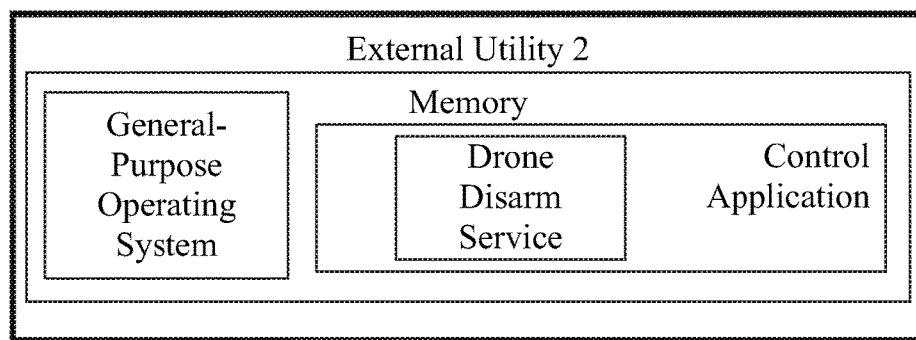
FIG. 15D

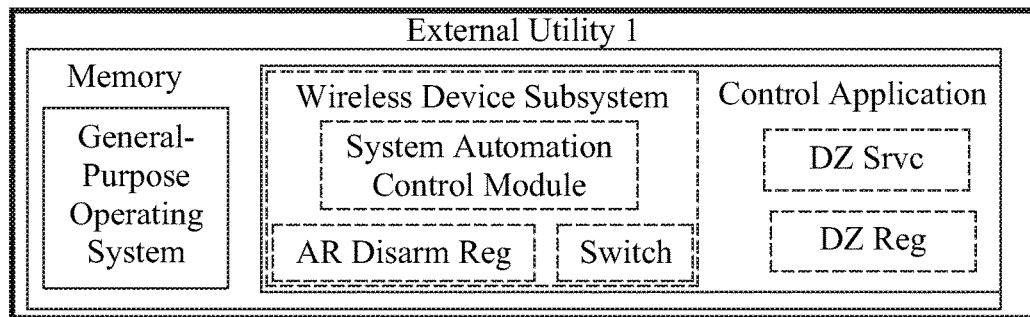
*FIG. 16C*
| AR Application | App Reg. | Reg. Date | Permitted Users | Application Type | Location of Use | Deadzone1 | DeadzoneN | Functionalities Disabled | Other |
|---|---|---|---|---|---|---|---|---|---|
|  |  |  |  |  |  |  |  |  |  |
|  |  |  |  |  |  |  |  |  |  |
*FIG. 16D*
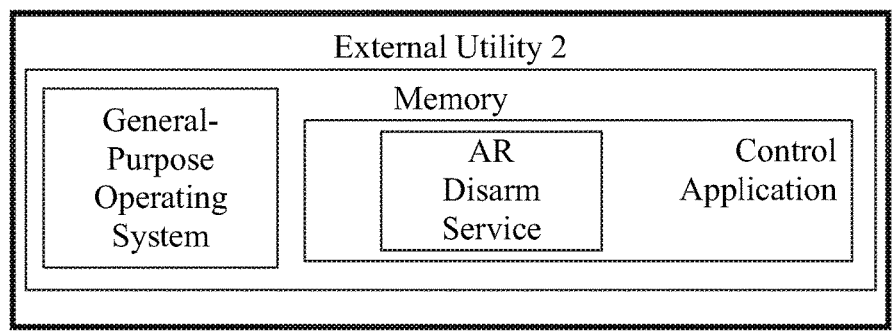
*FIG. 16E*

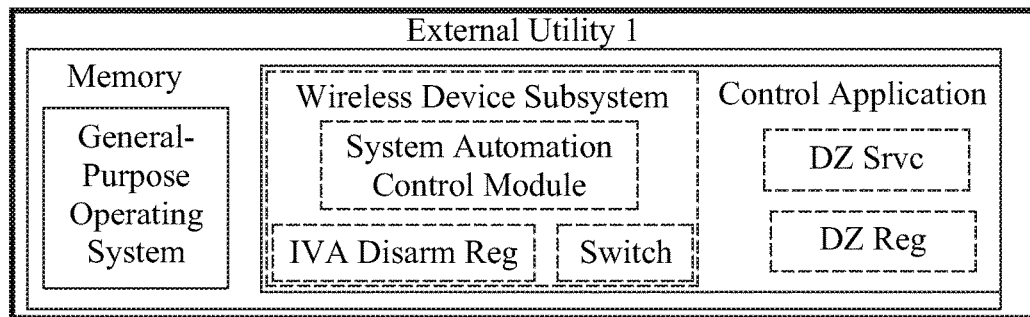
FIG. 17B
| IVA Application | App Reg. | Reg. Date | Permitted Users | Application Type | Location of Use | Deadzone1 | DeadzoneN | Functionalities Disabled | Other |
|---|---|---|---|---|---|---|---|---|---|
| | | | | | | | | | |
| | | | | | | | | | |
FIG. 17C
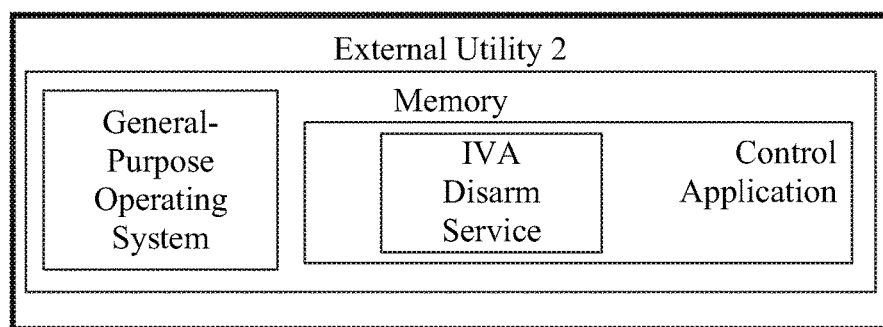
FIG. 17D

|  | Mobile Terminal A | Mobile Terminal B | Mobile Terminal C | Mobile Terminal D | Mobile Terminal E | Mobile Terminal F |
|---|---|---|---|---|---|---|
| Store 1 | | | | | | |
| AP1 | CONFIGURE to link to www.store1.com, store1 sponsored sites, and/or store1/carrier co-sponsored sites | Network Hide or Deny | Network Hide or Deny | Network Hide or Deny | Network Hide or Deny | Network Hide or Deny |
| Subscriber SC Com 6a @1 | Hand-in - - Data-Denied | NA | NA | NA | NA | NA |
| Store 2 | | | | | | |
| AP2 | NA | NA | NA | NA | NA | NA |
| Non-Subscriber SC Com 6a @2 | NA | Hand-in - - Communication Link Denied | NA | NA | NA | NA |
| Art Gallery 3 | | | | | | |
| AP3 | Network Hide or Deny | Network Hide or Deny | CONFIGURE to link to www.artgallery3.com, artgallery3 sponsored sites, and/or artgallery3/carrier co-sponsored sites | Network Hide or Deny | Network Hide or Deny | Network Hide or Deny |
| Subscriber SC Com 6a @3 | NA | NA | Hand-in from SC3b - - Data-Throttled to prevent photo, audio, video, voice | NA | NA | NA |
| Restaurant 4 | | | | | | |
| AP4 | NA | NA | NA | ENABLE AP4 by SC4b to restaurant app for menu and ordering | NA | NA |
| Subscriber SC Com 6a @4 | NA | NA | NA | Hand-in - - Communication Link Denied by SC Com 4b | NA | NA |
| Store 5 | | | | | | |
| AP5 | Network Hide or Deny | Network Hide or Deny | Network Hide or Deny | Network Hide or Deny | Hide or Deny by SC Comm per store 5 request | Network Hide or Deny |
| Subscriber SC Com 6a @5 | NA | NA | NA | NA | Hand-in - - Data-Throttled to www.store5.com, store5 sponsored sites, and/or store5/carrier co-sponsored sites | NA |
| Common Area 6 | | | | | | |
| AP Comm 6 | Network Hide or Deny | Network Hide or Deny | Network Hide or Deny | Network Hide or Deny | Network Hide or Deny | Data-Throttled such as as to non-compete sites |
| Open SC Com 6a @6 | NA | NA | NA | NA | NA | Hand-in - - Data-Throttled such as as to non-compete sites |
| Other Deadzone Restrictions | NA | NA | NA | Voice Denied xc Emergency Calls | NA | NA |
| No Deadzone Location | NA | YES | NA | NA | NA | NA |

FIG. 25B

|  | Mobile Terminal A | Mobile Terminal B | Mobile Terminal C | Mobile Terminal D | Mobile Terminal E | Mobile Terminal F |
|---|---|---|---|---|---|---|
| STORE 1 | | | | | | |
| AP1 | CONFIGURE to link to www.store1.com, store1 sponsored sites, and/or store1/carrier co-sponsored sites | Accessible if non-restricted sufficient signal | Accessible if non-restricted sufficient signal | Accessible if non-restricted sufficient signal | Accessible if non-restricted sufficient signal | Accessible if non-restricted sufficient signal |
| SC1 Com 1a @1 | Hand-in from SC1b - - Data-Throttled to www.store1.com, store1 sponsored sites, and/or store1/carrier co-sponsored sites | Hand-in - - Communication Link Denied by SCb @1 | Hand-in - - Communication Link Denied by SCb @1 | Hand-in - - Communication Link Denied by SCb @1 | Hand-in - - Communication Link Denied by SCb @1 | Hand-in - - Communication Link Denied by SCb @1 |
| Subscriber SC Com 6b @1 | Hand-in - - Denied by SC1b | NA since not in location | NA since not in location | NA since not in location | NA since not in location | NA since not in location |
| STORE 2 | | | | | | |
| AP2 | NA since no AP at location | NA since no AP at location | NA since no AP at location | NA since no AP at location | NA since no AP at location | NA since no AP at location |
| SC2 @2 | NA since no SC at location | NA since no SC at location | NA since no SC at location | NA since no SC at location | NA since no SC at location | NA since no SC at location |
| Subscriber SC Com 6b @2 | NA since not in location | Hand-in - - Communication Link Denied by SC Comm 6 | NA since not in location | NA since not in location | NA since not in location | NA since not in location |
| Art Gallery 3 | | | | | | |
| AP3 | Hide or Deny by SC1b | Accessible if non-restricted sufficient signal | CONFIGURE to link to www.artgallery3.com, artgallery3 sponsored sites, and/or artgallery3/carrier co-sponsored sites | Hide or Deny by SC4b | Hide or Deny by SC4b | Hide or Deny |
| SC3 @3 | NA | Hand-in - - Communication Link Denied by SC @3 | Hand-in from SC3b - - Data-Throttled to prevent photo, audio, video, voice | | | |
| Non-Subscriber SC Com 6b @3 | NA since not in location | NA since not in location | Hand-in - - Communication Link Denied by SC Com 3b | NA since not in location | NA since not in location | NA since not in location |
| Restaurant 4 | | | | | | |
| AP4 | No AP | No AP | No AP | No AP | No AP | No AP |
| SC4 @4 | NA | Hand-in - - Communication Link Denied by SC @4 | Hand-in - - Communication Link Denied by SC Com @4 | ENABLE AP4by SC4b to restaurant app for menu and ordering | Hand-in - - Communication Link Denied by SC @4 | Hand-in - - Communication Link Allowed by SC @4 |
| Non-Subscriber SC Com 6b @4 | NA since not in location | NA since not in location | NA since not in location | Hand-in - - Communication Link Denied by SC Com 4b | NA since not in location | NA since not in location |
| STORE 5 | | | | | | |
| AP5 | Hide or Deny by SC Com1b | Accessible if non-restricted sufficient signal | Hide or Deny by SC Com1b | Hide or Deny by SC Com1b | Hide or Deny by SC Comm per store 5 request | Hide or Deny by SC Com1b |
| SC5 @5 | NA since not in location | NA since not in location | NA since not in location | NA since not in location | NA since not in location | NA since not in location |
| Subscriber SC Com 6b @5 | NA since not in location | NA since not in location | NA since not in location | NA since not in location | Hand-in - - Data-Throttled to www.store5.com, store5 sponsored sites, and/or store5/carrier co-sponsored sites | NA since not in location |
| Common Area 6 | | | | | | |
| AP Com 6 | Hide or Deny by SC1 | Hide or Deny | Hide or Deny | Hide or Deny | Hide or Deny | Data-Throttled such as as to non-compete sites |
| Open SC Com 6b @6 | NA since not in location | Hand-in - - Denied | Hand-in - - Denied | Hand-in - - Denied | Hand-in - - Denied | Hand-in - - Data-Throttled such as as to non-compete sites |
| Other Deadzone Location | NA | NA | NA | Voice Denied xc Emergency Calls | NA | NA |
| No Deadzone Location | NO | YES | NO | NO | NO | NO |

FIG. 26B

|  | Mobile Terminal A | Mobile Terminal B | Mobile Terminal C |
|---|---|---|---|
| Airline Carrier X |  |  |  |
| AP X01 | Hide or Deny by SC Y02 | Hide or Deny by SC X01 Comm to passengers only | Hide or Deny by SC X02 Comm to passengers only |
| AP X02 | Hide or Deny by SC Y02 | Hide or Deny by SC X01 Comm to passengers only | Hide or Deny by SC X02 Comm to passengers only |
| AP XOTHER | Hide or Deny by SC Y02 | NA | NA |
| SC X01 | Hand-in - - Communication Link Denied by SC Y02 | Hand-in from SC X01- Data-Throttled to www.carrier XO.com, carrier XO sponsored sites, and/or carrier XO/carrier co-sponsored sites at gate only | Hand-in - - Communication Link Denied by SC SC X01 |
| SC X02 | Hand-in - - Communication Link Denied by SC Y02 | Hand-in - - Communication Link Denied by SC SC X01 | Hand-in from SC X02- Data-Throttled to www.carrier XO.com, carrier XO sponsored sites, and/or carrier XO/carrier co-sponsored sites at gate only |
| SP XOTHER | NA | NA | NA |
| Airline Carrier Y |  |  |  |
| AP Y01 | NA | NA | NA |
| AP Y02 | CONFIGURE to link to www.carrierYO.com, carrierYO.com sponsored sites, and/or carrierYO.com/carrier co-sponsored sites | Hide or Deny by SC X01 Comm | Hide or Deny by SC X02 Comm |
| AP OTHER | NA | NA | NA |
| SP Y01 |  |  |  |
| SP Y02 | Hand-in - - Communication Link Denied by SC Y02 except at gate | Hand-in - - Communication Link Denied by SC SC X01 | Hand-in - - Communication Link Denied by SC X02 |
| SP XOTHER | NA | DISABLE | DISABLE |
| Airline Carrier Z | NA | NA | NA |
| AP Z01 | NA | NA | NA |
| AP Z02 | NA | NA | NA |
| SP ZOTHER | NA | NA | NA |
| AP ZOTHER | NA | NA | NA |
| Wifi Provider Other |  |  |  |
| AP OTHER01 | Hide or Deny by SC Y02 | Hide or Deny by SC X01 | Hide or Deny by SC X02 |
| AP OTHER02 | Hide or Deny by SC Y02 | Hide or Deny by SC X01 | Hide or Deny by SC X02 |
| AP OTHER03 | Hide or Deny by SC Y02 | Hide or Deny by SC X01 | Hide or Deny by SC X02 |
| AP OTHER OTHER | NA | NA | NA |
| Other Deadzone Location | NA | NA | NA |
| No Deadzone Location | NA | NA | NA |

FIG. 27B

| Controller | Location | No Zone Register NZR 23 Applied by Location Controller | | |
|---|---|---|---|---|
| | | Restriction | | |
| | | 1 | 2 | 3 |
| XO1 | Carrier XO | Hide or Deny by SC XO1 Comm to passengers only | Hand-in from SC XO1-Data-Throttled to www.carrier XO.com, carrier XO sponsored sites, and/or carrier XO/carrier co-sponsored sites at gate only | Others |
| XO2 | Carrier XO | Hide or Deny by SC XO2 Comm to passengers only | Hand-in from SC XO2-Data-Throttled to www.carrier XO.com, carrier XO sponsored sites, and/or carrier XO/carrier co-sponsored sites at gate only | Others |
| ... | Carrier XO | Hide or Deny by SC XO2 Comm to passengers only | Hand-in from SC XO2-Data-Throttled to www.carrier XO.com, carrier XO sponsored sites, and/or carrier XO/carrier co-sponsored sites at gate only | Others |
| SC XOn | Carrier XO | Hide or Deny by SC XO2 Comm to passengers only | Hand-in from SC XO2-Data-Throttled to www.carrier XO.com, carrier XO sponsored sites, and/or carrier XO/carrier co-sponsored sites at gate only | Others |

FIG. 28A

| | No Zone Register NZR 23 Applied by Carrier XO on Airplane SC YO2 | | | |
|---|---|---|---|---|
| | | Restriction | | |
| Controller | Location | 1 | 2 | 3 |
| SC YO2 | Atlanta | CONFIGURE to link to www.carrierYO.com, carrierYO.com sponsored sites, and/or carrierYO.com/carrier co-sponsored sites | Hand-in -- Communication Link Denied by SC YO2 except at gate | Others |
| SC YO2 | Chicago | CONFIGURE to link to www.carrierYO.com, carrierYO.com sponsored sites, and/or carrierYO.com/carrier co-sponsored sites | Hand-in -- Communication Link Denied by SC YO2 except at gate | Others |
| SC YO2 | . . . | CONFIGURE to link to www.carrierYO.com, carrierYO.com sponsored sites, and/or carrierYO.com/carrier co-sponsored sites | Hand-in -- Communication Link Denied by SC YO2 except at gate | Others |
| SC YO2 | Heathrow | CONFIGURE to link to www.carrierYO.com, carrierYO.com sponsored sites, and/or carrierYO.com/carrier co-sponsored sites | Hand-in from SC YOn-Data-Throttled to www.carrier XO.com, carrier XO sponsored sites, and/or carrier XO/carrier co-sponsored sites at gate only | Others |

FIG. 28B

DEAD ZONE IN SMALL CELL APPLICATION

CLAIM TO PRIORITY

This application claims priority to and the benefit of each of the following applications, the contents of which are hereby incorporated by reference in their entirety: the present application claims the benefit of provisional application 62/680,166, filed Jun. 4, 2018; the present application is also a continuation-in-part of non-Provisional application Ser. No. 15/986,339, filed May 22, 2018 and entitled "Dead Zone for Wireless Device;" non-Provisional application Ser. No. 15/985,339 is a continuation-in-part of non-Provisional application Ser. No. 15/663,660 filed Jul. 28, 2017, titled "Safety Disarm for Firearm", which claims priority from Provisional Application Ser. No. 62/368,828 filed Jul. 29, 2016 titled "Safety Disarm for Firearm", Provisional Application Ser. No. 62/368,833 filed Jul. 29, 2016, titled "Dead Zone for Wireless Communication Device", Provisional Application Ser. No. 62/369,620 filed Aug. 1, 2016 titled "Safety Disarm for Firearm", and non-provisional application Ser. No. 15/663,660 is also a continuation-in-part of application Ser. No. 15/620,288, filed Jun. 12, 2017, titled "Dead Zone for Wireless Communication Device", and issued as U.S. Pat. No. 9,913,200; non-provisional application Ser. No. 15/620,288 is a continuation of Non-provisional application Ser. No. 13/462,712, filed May 2, 2012 JL0900.005 and issued as U.S. Pat. No. 9,681,358; non-provisional application Ser. No. 13/462,712 is a continuation of application Ser. No. 12/571,090 filed Sep. 30, 2009, which claims priority from Provisional Application 61/195,016, filed Oct. 2, 2008. Additionally, non-provisional application Ser. No. 15/985,339 claims priority to and the benefit of: U.S. Provisional Application Ser. No. 62/562,880, filed Sep. 25, 2017, and titled "Dead Zone for Wireless Communication", the entirety of which is incorporated herein by reference; and non-provisional application Ser. No. 15/985,339 is also a continuation-in-part of U.S. Non-Provisional application Ser. No. 15/910,190, filed Mar. 2, 2018, and titled "Dead Zone for Wireless Communication Device", the entirety of which is also incorporated herein by reference.

FIELD OF INVENTION

Embodiments of the invention are directed to wireless communication devices and more particularly to a wireless communication device system, a wireless communication device, and a wireless communication method for disabling the use of wireless communication devices in places where they should not be used.

BACKGROUND

The cell phone is a widely used device. These devices allow people to talk, send text messages, emails, etc. The upside of these devices is that they allow people to stay connected anywhere anytime. The downside is that these devices are sometimes used in places or at times when they should not be used. For example, studies have shown that use of a cell phone while driving can increase the risk of an accident. Still a number of people use cell phones while driving a motor vehicle. Despite laws restricting the use of cell phones while operating a motor vehicle in a number of States in the U.S., rampant cell phone use during driving continues through unawareness or disregard of these laws, hence risking injury to the caller and others through an accident. As another example, studies have shown that radio waves transmitted by wireless devices may interfere with medical equipment. Still, a number of people use cell phones while in a hospital. Despite warnings telling callers to silence their cell phones when in the hospital, hospital cell phone use continues through unawareness or disregard of these laws, hence risking interference with medical equipment and the lives of those who depend on them. As yet further examples, there are places where the use of cell phones in places or at times may interfere with the public enjoyment, health, welfare, or safety. For instance, despite requests or common courtesy, a number of people use their cell phones during a movie theater, a performing arts hall, a church, or other places of public gathering, hence causing a distraction that may interfere with the movie, performance, worship or public gathering.

U.S. Pat. No. 6,979,724 is directed to a method for switching a cell phone from audible to silent mode of operation during a concert performance, a play, a conference, a meeting or dinner. An RF transmitter is provided with an omni-directional or directional antenna. The RF transmitter is locally mounted in the area where a cell phone is to be switched to silent mode of operation. The RF transmitter is programmed to broadcast a message containing a code. When in range of the RF transmitter broadcast, a cell phone that has been programmed to recognize the broadcast is automatically programmed by the broadcast to switch itself to silent mode of operation. Japanese laid open patent application H10-42371 is directed to a receiver/transmitter that is locally mounted at a hospital in the area where a cell phone is not to be used. The receiver/transmitter broadcasts a signal and waits for acknowledgement by a cell phone. On acknowledgement, a microcomputer associated with the receiver/transmitter determines whether the phone is set up for use. If the phone is so set up for use, the microcomputer broadcasts a warning over a speaker mounted in the hospital that the phone is not to be used in the hospital. Japanese laid open patent application J11-004190 is directed to a cell phone accessory that monitors engine speed and parking brake activity. The accessory is connected to a cell phone in a car to detect incoming calls to the cell phone. On detection of an incoming call, the accessory suppresses or reduces the volume of the cell phone ring tone and diverts the call for recording on an answering machine residing in the accessory for playback. Neither prior art disables the use of wireless communication devices in places where they should not be used.

There is a need for a communication system, device, and method for disabling the use of wireless communication devices in places where they should not be used.

SUMMARY

Communication system, device, and method are provided that disables the use of wireless communication devices or of particular functions of wireless communications devices in places where they should not be used.

A communication system includes a wireless device capable of performing a function. A network is configured to communicate with the wireless device to provide a network service. A small cell is in a location, the small cell is configured to control a communication link between the wireless device and the network. A register includes a database of restrictions on the function of the wireless device at the location. The system is configured to query whether the wireless device is within the location, and to apply the restrictions to the wireless device when the wireless device is in the location.

A communication method includes: providing radio coverage at a location by a small cell; establishing a database of restrictions on the functions of a wireless device when the wireless device is within the coverage area of the small cell; establishing a communication link between the wireless device and a network; handing off the communication link to the small cell when the wireless device is within the coverage area of the small cell; and applying the restrictions from the database of restrictions to the wireless device to restrict a function of the wireless device when the wireless device is within the coverage area of the small cell.

BRIEF DESCRIPTION OF DRAWINGS

FIG. 7 shows another embodiment of an inventive no zone register.

FIGS. 11A, 11B-1 and 11B-2, and 11C show an illustrative embodiment of this disclosure. (FIGS. 11B-1 and 11B-2 collectively FIG. 11B.)

FIG. 12 shows an illustrative embodiment of FIG. 11 of this disclosure.

FIGS. 13A, 13B, 13C, 13D depict an illustrative embodiment of this disclosure.

FIGS. 14A, 14B, 14C, 14D depict an illustrative embodiment of this disclosure.

FIGS. 15A, 15B, 15C, 15D depict an illustrative embodiment of this disclosure.

FIGS. 16A, 16B, 16C, 16D and 16E depict an illustrative embodiment of this disclosure.

FIGS. 17A, 17B, 17C, 17D depict an illustrative embodiment of this disclosure.

(FIGS. 23A and 23B collectively FIG. 23.)

(FIGS. 24A and 24B collectively FIG. 24.)

FIGS. 25A, 25B is an illustrative small cell method according to this disclosure. (FIGS. 25A and 25B collectively FIG. 25.)

FIGS. 26A, 26B is an illustrative small cell system according to this disclosure. (FIGS. 26A and 26B collectively FIG. 26.)

FIGS. 27A, 27B is an illustrative small cell system according to this disclosure. (FIGS. 27A and 27B collectively FIG. 27.)

FIGS. 28A, 28B illustrative NZR registers for airline carrier according to this disclosure. (FIGS. 28A and 28B collectively FIG. 28.)

DETAILED DESCRIPTION

Figure 1:
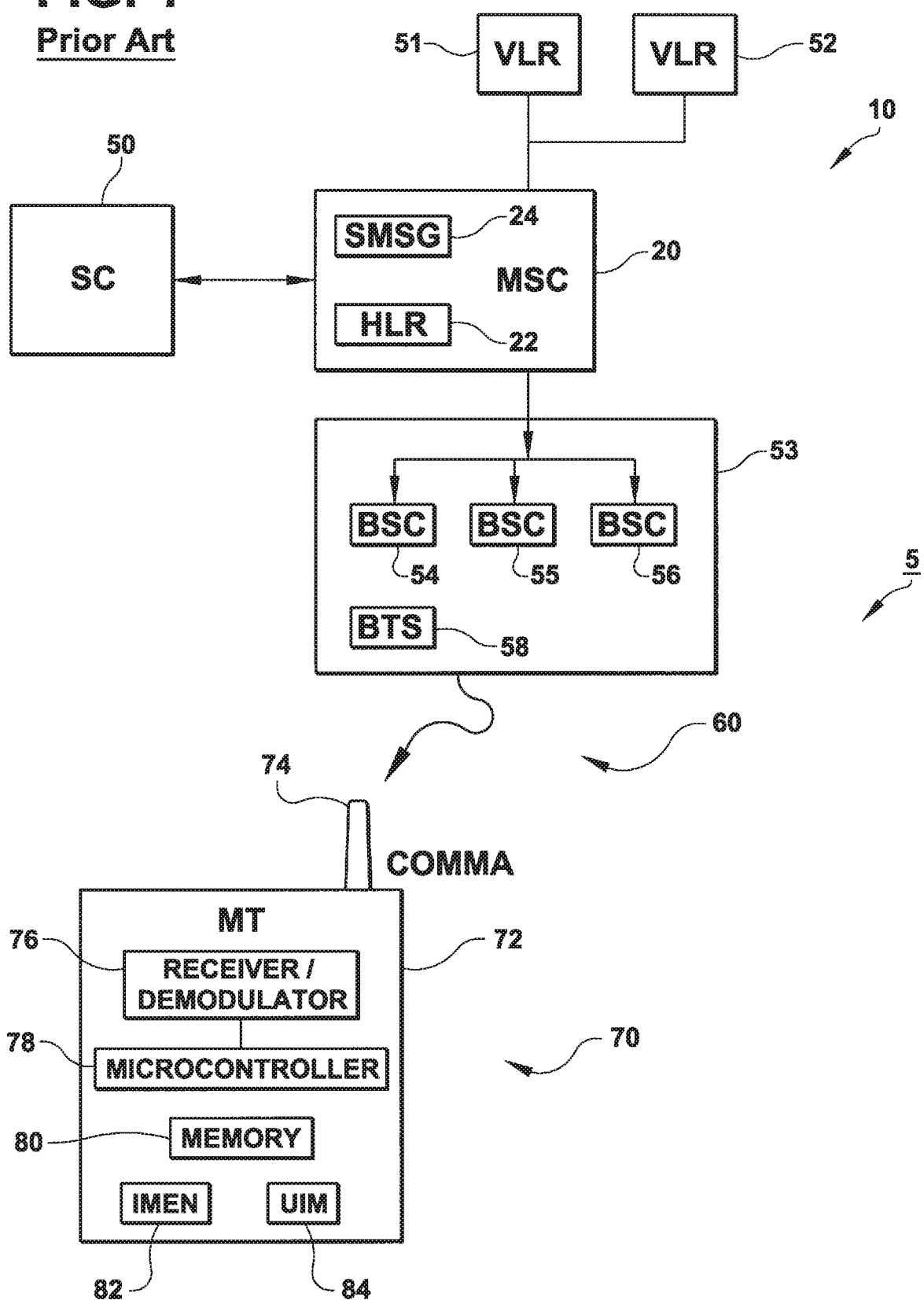
FIG. 1 shows a representative prior art cell phone system.

Prior art FIG. 1 shows a representative prior art cell phone system 5 comprising a network 10, a plurality of mobile terminals 70, such as cell phones, and in between the network and cell phone, an air interface 60. Network 10 typically includes a mobile switching center (MSC) 20, an operational support center (SC) 50, visiting location registers (VLR) 51, 52, and base station controllers 54, 55, 56, and base transceiver station (BTS) 58 which may be collectively referred to as base station subsystem (BSS) 53. In the illustrative system of FIG. 1, mobile terminal (MT) 70 is illustratively based on the Groupe Speciale Mobile (GSM) standard, but may be based on other standards. MT 70 comprises a mobile unit 72 having an antenna 74, a receiver/demodulator 76, a microcontroller 78, memory 80, international mobile equipment number 82, and a user identity module 84 also referred to as a subscriber identify module or SIM. MT 70 communicates with network 10 through air interface 60.

Mobile switching center 20 is a telecommunications switch deployed in network 10 to provide call control, processing and access to the public switched telephone (fixed) network. The home location register (HLR) 22 is a database that is maintained by a user's home carrier or the mobile operator with whom the user has initiated service. HLR 22 stores information about the user, including the user profile (preferences), account status, features and capabilities. VLR 51, 52 is a database used by the serving carrier to manage service requests from mobile users who are away from the home system.

When MT 70 is powered on the IMSI or MIN of the mobile is sent to network 10 via the air interface 60. The mobile request to use the network is picked up by BTS 58. The call is directed to the MSC 20 that oversees the switching in which the mobile was powered on in. MSC 20 determines whether MT 70 is in its "home" area or whether it is a "visitor". MSC 20 makes this determination based on the IMSI or MIN information. If in the home area, HLR 22 provides information for handling both origination of a call and placement of a call. It does so based on service subscription information, service restrictions and supplementary information in HLR 22. If in a visitor area, VLR 51, 52 requests information from the HLR 22 where MT 70 is registered so that the visited system can process the call appropriately. If MSC 20 determines that the mobile is authorized to use network 10, MSC 20 logs the phone onto network 10 and tells the mobile it is logged on.

Once logged on, when a user dials a GSM mobile subscriber's MSISDN or a TIA network MIN, the call is sent to MSN 20 which interrogates HLR 22 of the caller to obtain authorization and routing information stored in the service profile of the user associated with his MSISDN or MIN. MSC 20 illustratively routes the call over a public switching telecommunications network (PSTN) to the HLR of the number called. Based on the IMSI or MIN number, the called HLR looks up the called subscriber profile as well as the current VLR 51, 52 at which the called subscriber is registered. The called HLR 22 generates a response message and sends it back to the calling MSC 20. MSC 20 then attempts to complete the call based on the location of the destination provided by called HLR 22.

Billing tickets for calls made in network 10 are typically produced on MSC 20. MSC 20 provides the billing tickets to the SC 50 which provides the interface to the customer invoices and the bills. SC 50 includes systems for billing the subscribers as well as for subscriber administration, fraud detection, and voice mail. These systems collect billing data generated by MSC in network 10 and manage the subscriber databases in network 10.

Figure 2:
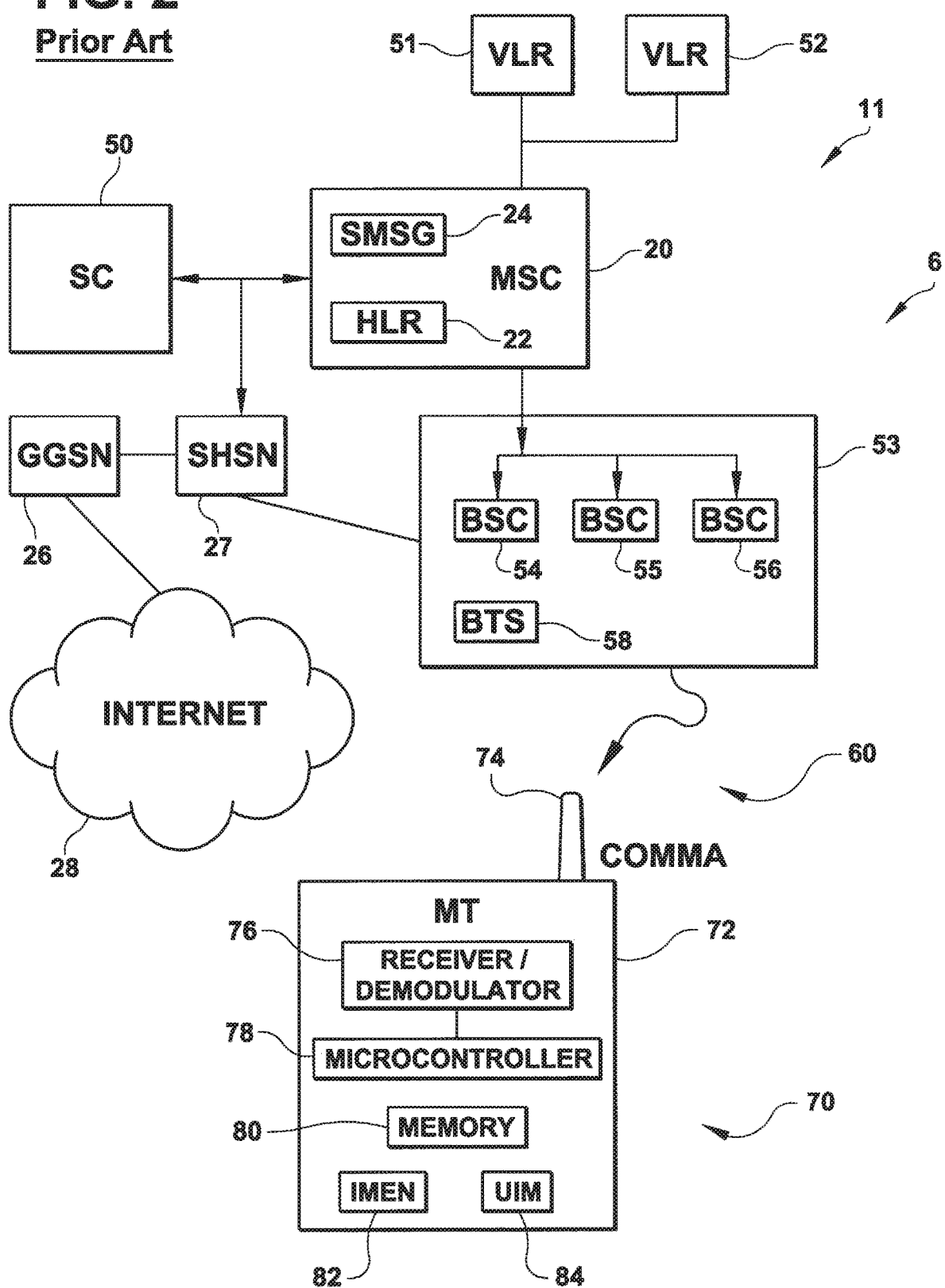
FIG. 2 shows a representative prior art cell phone system of FIG. 1 provided with GPRS service designed for GSM networks.

Prior art FIG. 2 shows the representative prior art cell phone system 5 of FIG. 1 provided with GPRS service designed for GSM networks. GPRS provides an overlay service onto GSM that allows the mobile to access the Internet. GPRS allows a mobile to provide high-speed Internet data communications using the existing GSM air interface. GPRS provides a direct interface to the Internet services for GSM mobile devices and is implemented in an existing GSM network with the addition of two new elements. These elements are a Signaling GPRS Service Node (SGSN) 27 and a Gateway GPRS Service Node (GGSN) 26. Additional modifications to the base station systems to include packet control units may also be required. GPRS allows a mobile to typically have an endless connection to an IP network that may stay open at low cost so that the mobile is connected to the network and enabled to connect to the Internet on initiation of a GDP Context message. Voice calls on GPRS handsets are routed by MSC 20 using the same circuit switched channels and protocols of GSM.

Figure 3:
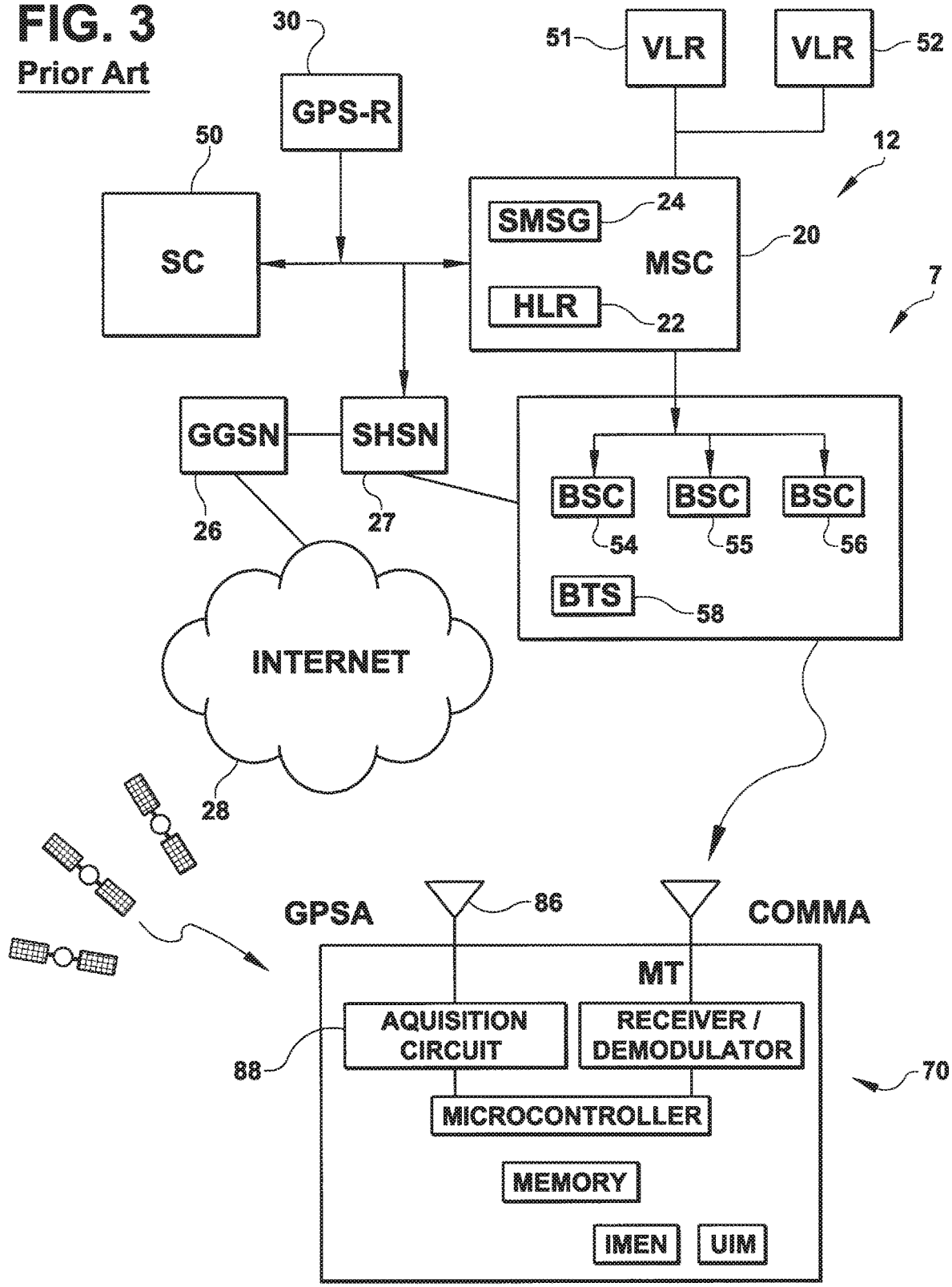
FIG. 3 shows a representative prior art cell phone system of FIG. 2 provided with global positioning system (GPS).

Prior art FIG. 3 shows the representative prior art cell phone system 5 of FIG. 2 provided with global positioning system (GPS). The U.S. Global Positioning System is a constellation of 24 satellites which orbit the earth in 12 hour orbits. The satellites are arranged in six orbital planes each containing four satellites. The constellation provides a user with approximately five to eight satellites visible from any point on earth. These satellites transmit as part of their message both satellite positioning data called "ephemeris" data and clock timing data. The satellites also transmit time-of-week information which allows a receiver to determine accurate time. Many new phones in the U.S., for example, have some GPS receiving capability built in. As shown in FIG. 3, MT 70 further comprises a GPS antenna 86 and GPS acquisition circuitry 88 for capturing satellite messages for use in calculating MT 70 receiver location and other information such as speed and direction. Assisted GPS enhances the performance of the GPS system by helping MT 70 locate satellite signals when MT 70 is surrounded by tall buildings or is indoors or under trees and assist MT 70 in calculating its position. GPRS functionality in MT 70, which allows direct connection to the Internet services for GSM mobile devices using SGSN 27 and GGSN 26, allows MT 70 GPS location information to be provided to network 12 regularly to allow network 12 to provide real time location data on MT 70. GPS location information on MT 70 may be stored in GPS-R register 30. Network 10 may use real time GPS data to track MT 70 through the network or use information derived from GPS data such as speed and direction of travel of MT 70. This information may be stored in GPS-R register 30. In some cases, a service provider may provide MT 70 with GPS functionality that is accessibly by third-party applications. Some companies like Accu-Tracking have developed software for installation on an MT 70 having such third party accessible GPS functionality. For a subscriber, Accu-Tracking tracks GPS data on MT 70 including direction of travel and speed of travel and displays these parameters on a subscriber Website for viewing by the subscriber over a computer. This service allows for example a parent to use an MT 70 of a child to track the movement of the child and if the child is driving a car to track the speed of the car. The service even permits audible alerts to be sent to MT 70 in the event the child is speeding.

All of the foregoing is common knowledge to one skilled in the art.

Figure 4:
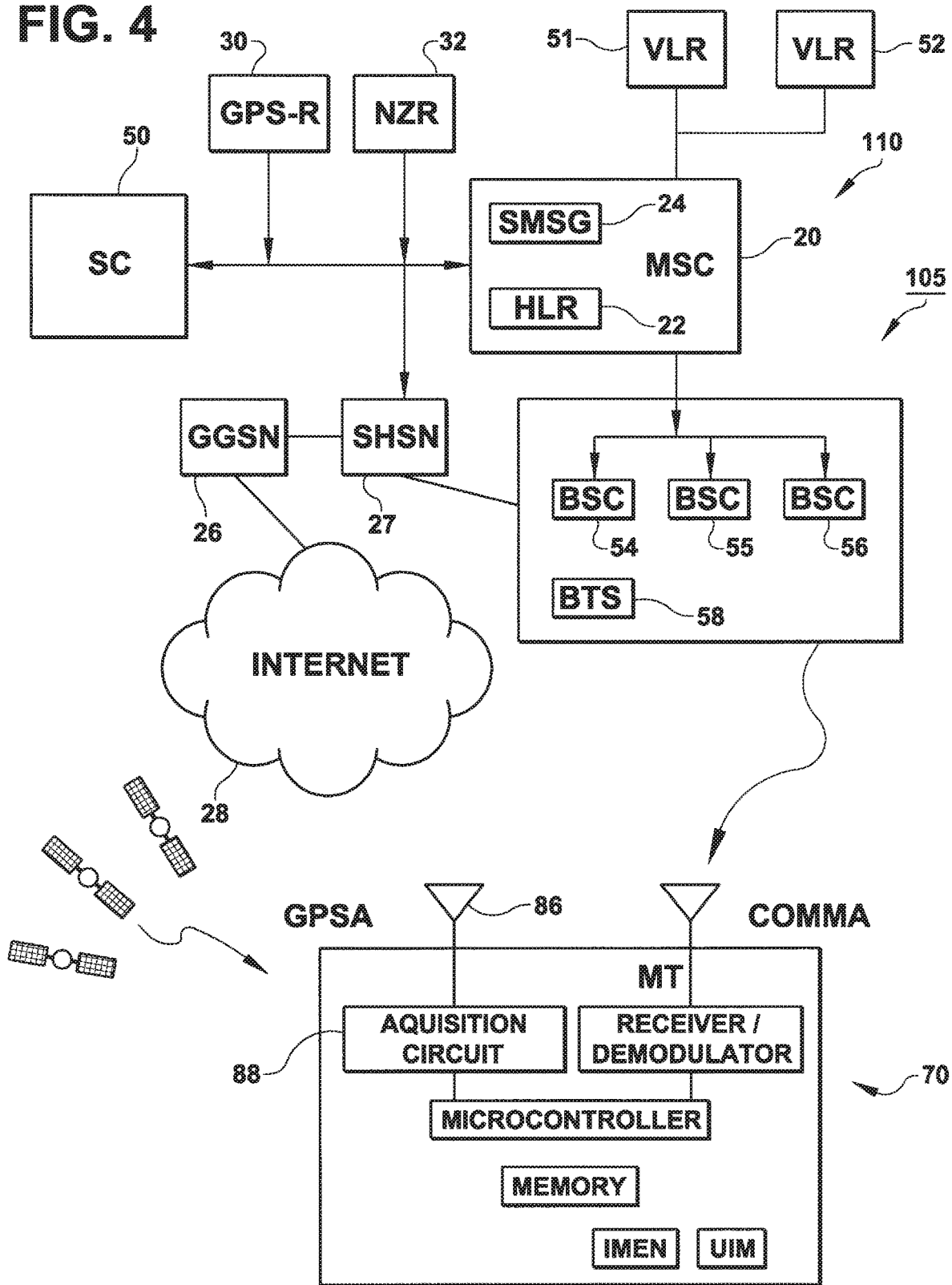
FIG. 4 shows a system embodiment of the invention.
Figure 5:
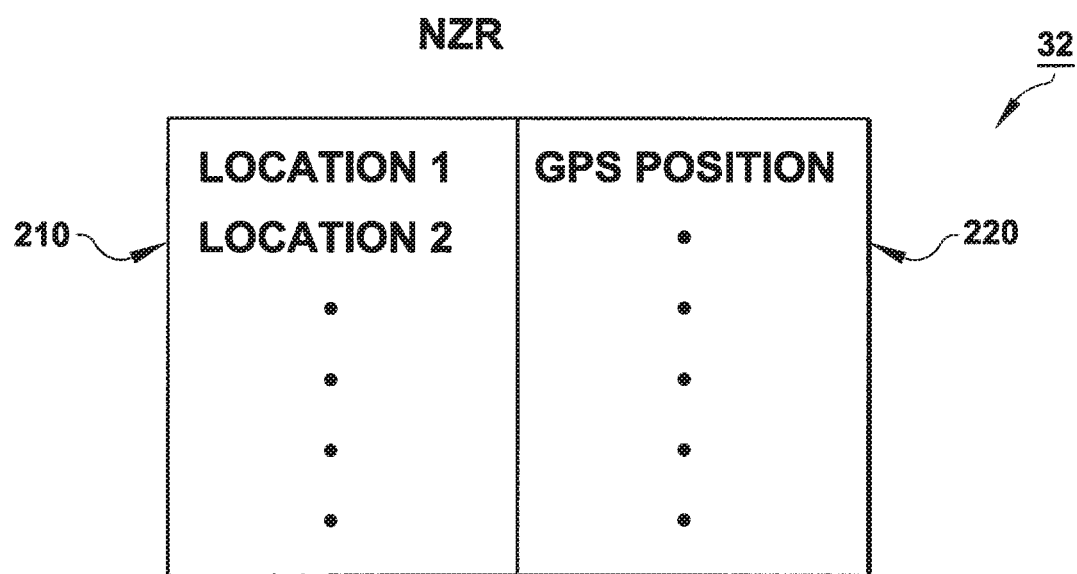
FIG. 5 shows an embodiment of a no zone register.

FIG. 4 shows an embodiment of the present invention. A cell phone system 105 comprises the representative prior art cell phone system 5 of FIG. 3 and a no communication zone register (NZR) 32. The representative elements of the prior art phone system 5 shown in FIG. 3 have been previously described. FIG. 5 shows an embodiment of NZR 32. As shown in FIG. 5, NZR 32 is a register that may include a table of geographical locations 210. Geographical locations 210 are physical locations in network 110 in which communication by or to MT 70 over network 110 is to be disabled and/or functions of the MT 70 are to be disabled, enabled or modified. Geographical locations 210 may be a hospital, a movie theater, a performing arts hall, a church, or other places where the use of cell phones may interfere with the public enjoyment, health, welfare, or safety. GPS positions 220 of the geographical locations 210 are provided for identifying the GPS positions of the locations. For a location that may be identified by an area of GPS positions, these GPS positions would be provided as GPS position 220 in the database of NZR 32.

In operation, GPRS functionality in MT 70 allows MT 70 GPS location information to be provided to network 110 regularly to allow network 110 to have real time location data on MT 70. GPS location information on MT 70 and derivative information such as speed and direction of travel of MT 70 generated by network 110 may be stored in GPS-R register 30. MSC 20 regularly queries whether the GPS location information of MT 70 is within a no communication zone (i.e., dead zone). If NZR 32 indicates MT 70 is not in a dead zone, the communication functionality of MT 70 remains enabled. If NZR 32 indicates MT 70 is in a dead zone, network 110 disables the communication functionality of MT 70 for so long as MT 70 is in the dead zone.

Figure 6:
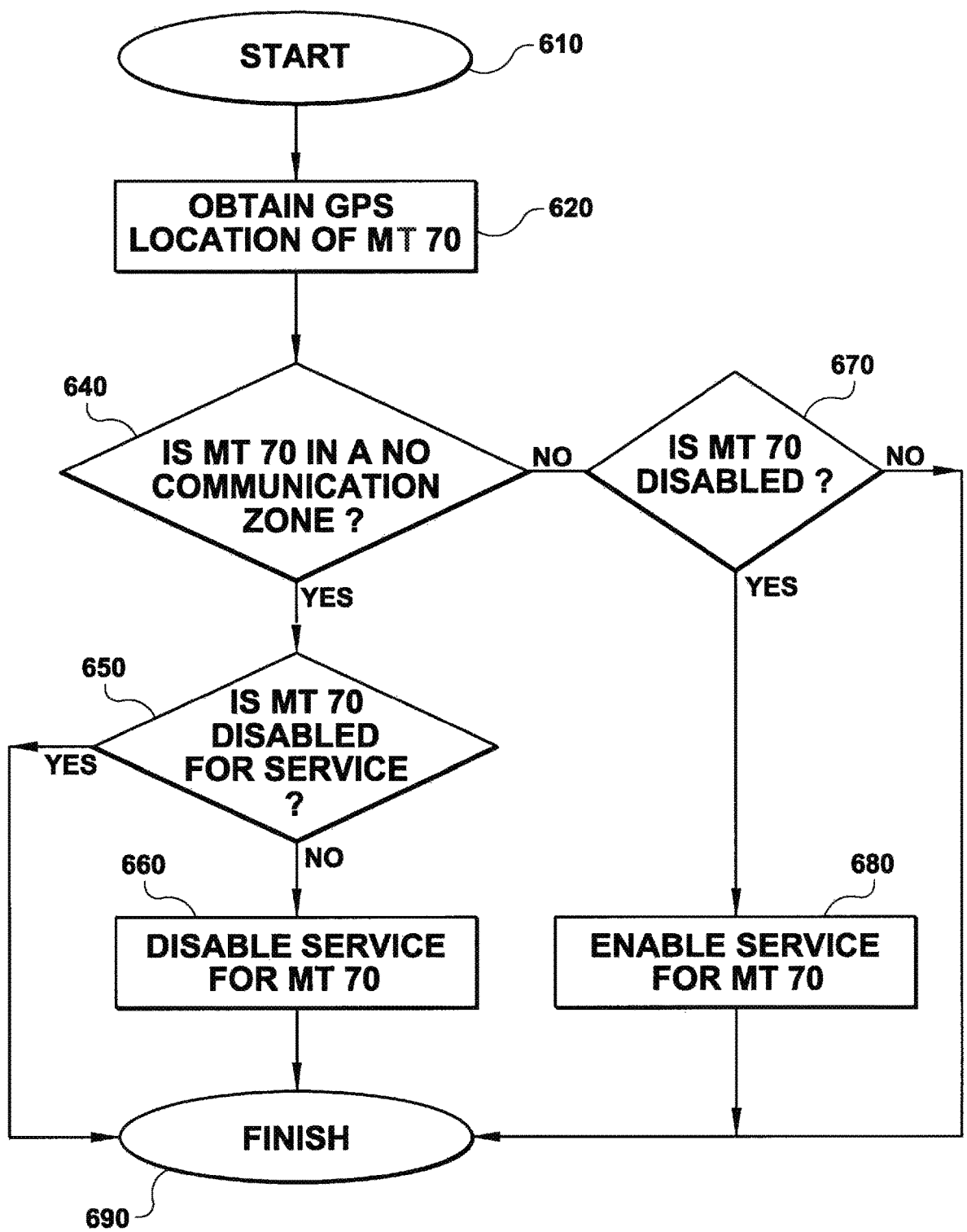
FIG. 6 shows a logic flow for the system embodiment of FIG. 4 implemented with the no zone register of FIG. 5.

FIG. 6 shows a logic flow diagram for an embodiment. As shown, network 110 periodically or continuously employs an embodiment by entering the logic shown in FIG. 6 at the start control block 610. At control block 620, network 110 obtains the present GPS location of MT 70 from GPS-R register 30. At control block 640, network 110 queries whether the present GPS location of MT 70 is within a no communication zone location. This may be done by MSC 20 comparing the present location of MT 70 to the GPS locations contained in NZR 32. A match indicates MT 70 is in a no communication zone whereas a no match indicates that MT 70 lies outside that communication zone. If the query done at control block 640 indicates MT 70 is not in a no communication zone (i.e., dead zone), control branches to control block 670 where MSC 20 queries whether MT 70 is disabled. If MT 70 is not disabled because it was not in a dead zone, MSC 20 flows to control finish block 690 and the process is finished. If MT 70 is disabled because on the last pass through the control logic MT 70 was in a dead zone but on the current pass MT 70 in no longer in a dead zone, MSC 20 enables communication functionality of MT 70 at control block 680 and the process flows to control finish block 690. If the query at control block 640 indicates MT 70 is in a dead zone, control flows to control block 650 where network 110 queries whether the communication functionality of MT 70 is disabled. If the communication functionality is disabled, control flows to control finish block 690. If the control functionality is not disabled, network 110 control flows to control block 660 where the communication functionality of MT 70 is disabled after which the process flows to control finish block 690. Network 110 will keep communication functionality of MT 70 disabled for so long as MT 70 remains in the dead zone.

In the embodiment of FIG. 6, the control block 650 function of flagging off service for MT 70 may be done based on programmed service subscription information, service restrictions and supplementary information provided in HLR 22. For example, service restrictions on MT 70 may include disabling the service of MT 70 when MT 70 is in a dead zone. The same goes for service enablement. Alternatively, MT 70 service may be disabled or enabled using well known over-the-air programming techniques.

Figure 7:
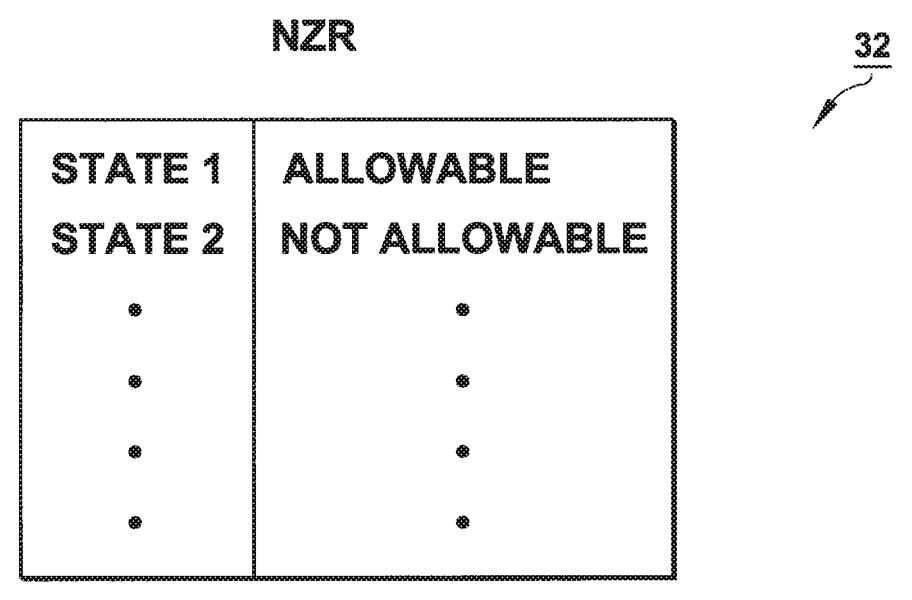
Figure 8:
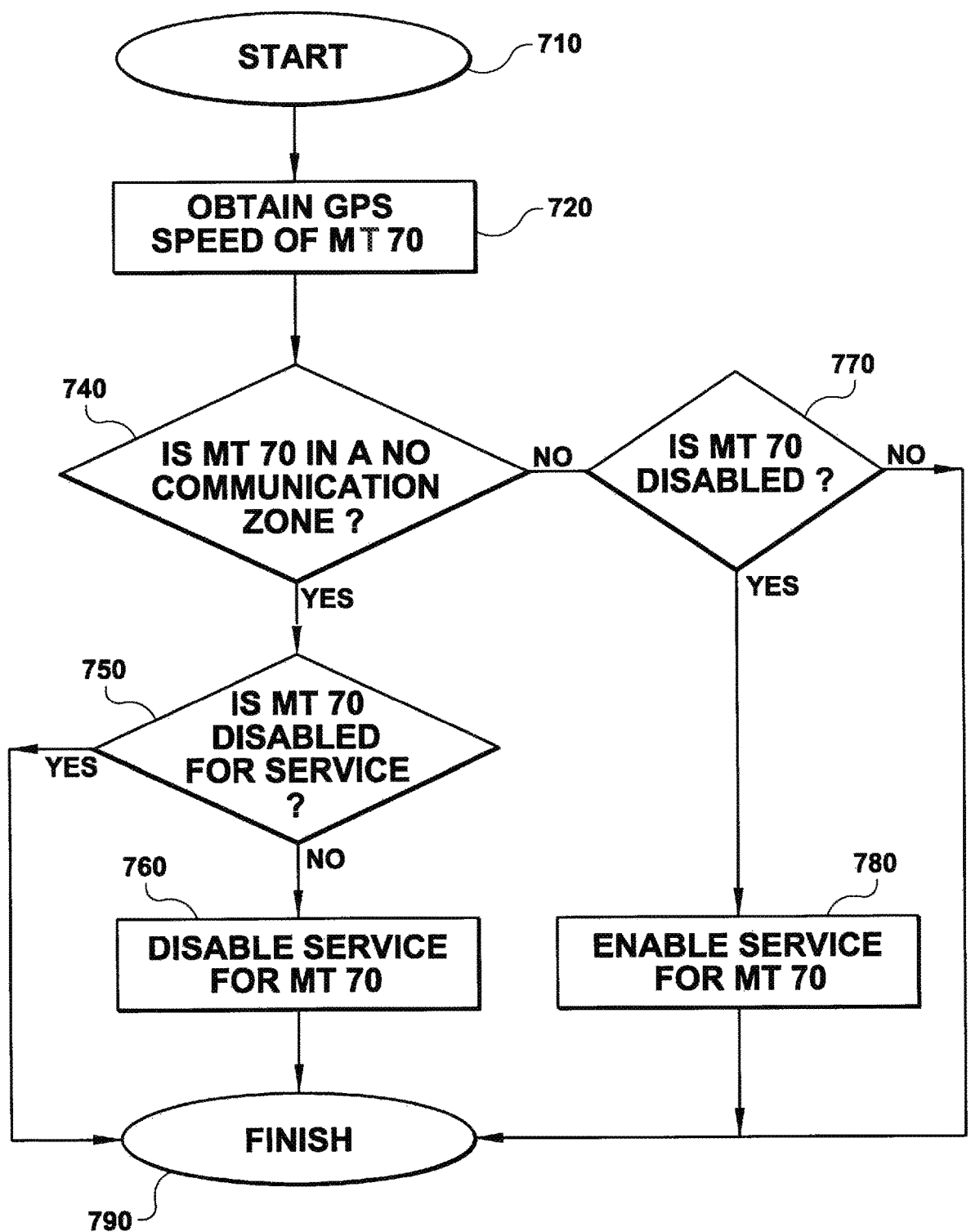
FIG. 8 shows a logic flow for the system embodiment of FIG. 4 implemented with the no zone register of FIG. 7.

FIG. 7 shows another embodiment in which NZR 32 contains a database of states and information on whether the state allows cell phones to be used in a moving vehicle. In this embodiment, the moving vehicle may be a car or truck or motorcycle or bicycle and the allowable speed may be as simple as allowable or not. For example, states that do not allow the use of cell phones while driving would be denoted on the list as not allowable whereas the other states would be denoted as allowable. Referring to the logic flow of this embodiment shown in FIG. 8, after entering the control process at control start block 710 MSC 20 would obtain the GPS speed of MT 70 at control block 720 and at control block 740 query whether the speed of movement of MT 70 is at or above the speed denoted in NZR 32 shown in FIG. 7. If the speed of movement of MT 70 is at or above the speed denoted in NZR 32, then process flows to control block 750 and continues on in a manner similar to the manner described with like process control blocks shown in FIG. 6. If the speed of movement of MT 70 is not at or above the speed denoted in NZR 32, then process flows to control block 770 and continues on in a manner similar to the manner described with like process control blocks shown in FIG. 6.

In the example, the speed denoted in NZR 32 is either allowable which means that MT 70 may be used in vehicles or not allowable which means that MT 70 may not be used while driving. Alternatively, in states where use of a cell phone while driving is not permitted, NZR 32 may be set at a low speed instead of a no speed condition as specified in the prior example in order to allow for the possible use of a cell phone in a moving but non-driving condition, such as, while walking. By trading off a no speed condition in NZR 32 for a speed of, for example, a typical walking speed of a person, such as 5 miles per hour, the cell phone would be useable while walking but not when driving at speeds at or above 5 miles per hour.

Figure 9:
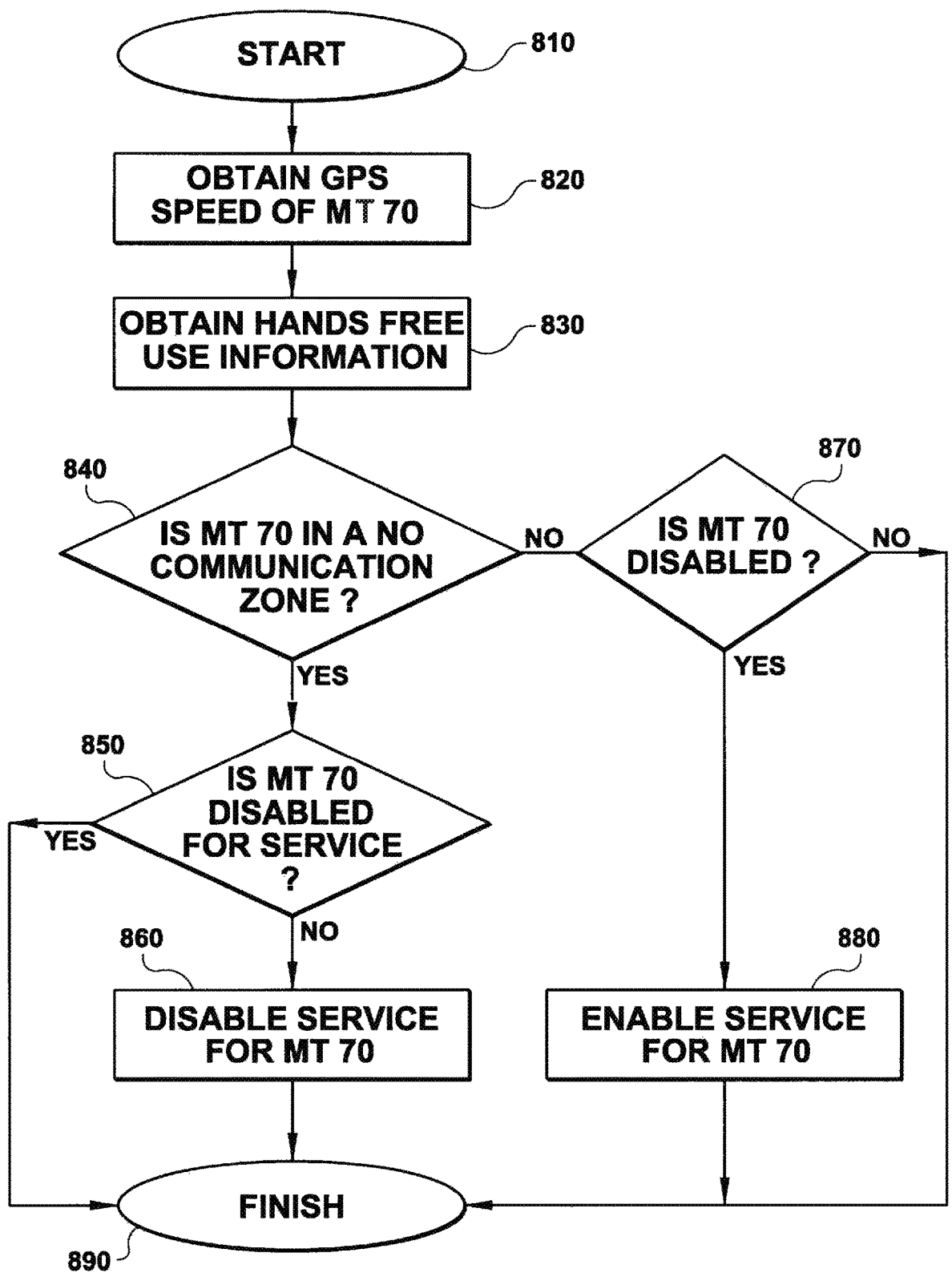
FIG. 9 shows a logic flow for the system of FIG. 4 implemented with the no zone register of FIG. 7 in a network that recognizes whether a mobile terminal in the network is being used in a hands free mode of operation.

In a further embodiment, in some states, cell phone use while driving is permitted so long as done using a hands free device. FIG. 9 shows an illustrative embodiment of a logic flow diagram which recognizes whether MT 70 is being operated in hands free mode of operation. When operated in hands free mode of operation, MT 70 detects the hands free operation and transmits that information to network 110. In this example, NZR 32 in FIG. 7 would further include a designation of allowable with hands free condition in addition to the allowable and not allowable conditions previously described. In the process flow shown in FIG. 9, the network obtains the GPS speed of MT 70 at control block 820 and further obtains the hands free use information of MT 70 at control block 830. At control block 840, a no communication zone condition would occur if, for the state which requires MT 70 to be operated in a hands free mode of operation for MT 70 to be useable while driving, the MT 70 information obtained by network 110 shows MT 70 to have a GPS speed that satisfies the speed condition for disablement of communication and the condition of being used without a hands free. Based on this query at control block 840 network 110 proceeds through the remaining process shown in FIG. 9 in a manner similar to the manner described with like process control blocks shown in FIG. 6.

The foregoing embodiments preferably would not disable the ability of cell phones to place 911 or like calls for emergency purposes. In addition, there may be other instances in which calls may likewise be permitted such as in connection with calls from or to family members.

In another embodiment, the network in either one or more of the foregoing embodiments may be provided with a messaging service for messaging MT 70 that service is interrupted because the communication device is in a no communication zone. For example, messaging may be generated by the network and transmitted to MT 70 via gateway SMSG 24 and illustratively displayed in text form on a display on MT 70. Messaging an MT 70 via SMS gateway SMSG 24 is common knowledge to one skilled in the art.

While the foregoing embodiments illustrate the use of GPS location and derived speed, alternative embodiments may be useable with any GPS direct or derived information. As one example, where acceleration is derived from GPS data, the use of MT 70 could be conditioned on the acceleration of MT 70 in the network. In addition, embodiments may create conditions of dead zone of operation based on a blend of GPS and non-GPS data available to the network. For example, a dead zone may be further conditioned on the time of day of use of MT 70 such that at certain times of day a dead zone would exist to disable use of MT 70 whereas at other times of day the dead zone would be lifted to allow MT 70 to be used in that zone. In previous example further illustrates that embodiments may be used alone or in combination with one or more direct or derived information. As yet another example of the use of embodiments with a combination of information, in the situation where the operation of a communication device is not allowed in a city but allowed outside of a city, embodiments of the invention may track both the location of MT 70 with respect to the city as well as the speed of the MT 70 at its location. Whether MT 70 would be operable would turn on the conditions that MT 70 satisfies where used.

In the previous embodiments, except as to establishments that may be mandated by applicable laws to be included on the dead zone list which would need to be included on the list, the network generates the dead zone list of hospitals, movie theaters, performing arts halls, churches, or other places where the use of cell phones may interfere with the public enjoyment, health, welfare, or safety, possibly based upon publicly available information. In another embodiment, if the establishment is listed on the dead zone list by default, unless it is one of the mandated establishments, the establishment may have the option to elect to be dropped from the list so as to allow MT 70 to be used in its establishment. For example, a restaurant that may be included on the dead zone list by default may elect to be dropped from the list in order to allow its customers to use MT 70 in its establishment. As yet another embodiment, any establishment that may not be included on the default dead zone list may have the option to elect to be included on the dead zone. For example, a store or a football stadium may request to be included on the dead zone list in order to prevent the use of MT 70 from disturbing its patrons. As yet another example, inclusion of an establishment on the dead zone list may be by way of a service offering provided by the service provider. The service may be offered at no charge to an establishment or may offered on a subscription fee basis. With this service, an establishment may elect to have their establishment included on the dead zone list by subscription to the service.

Figure 10:
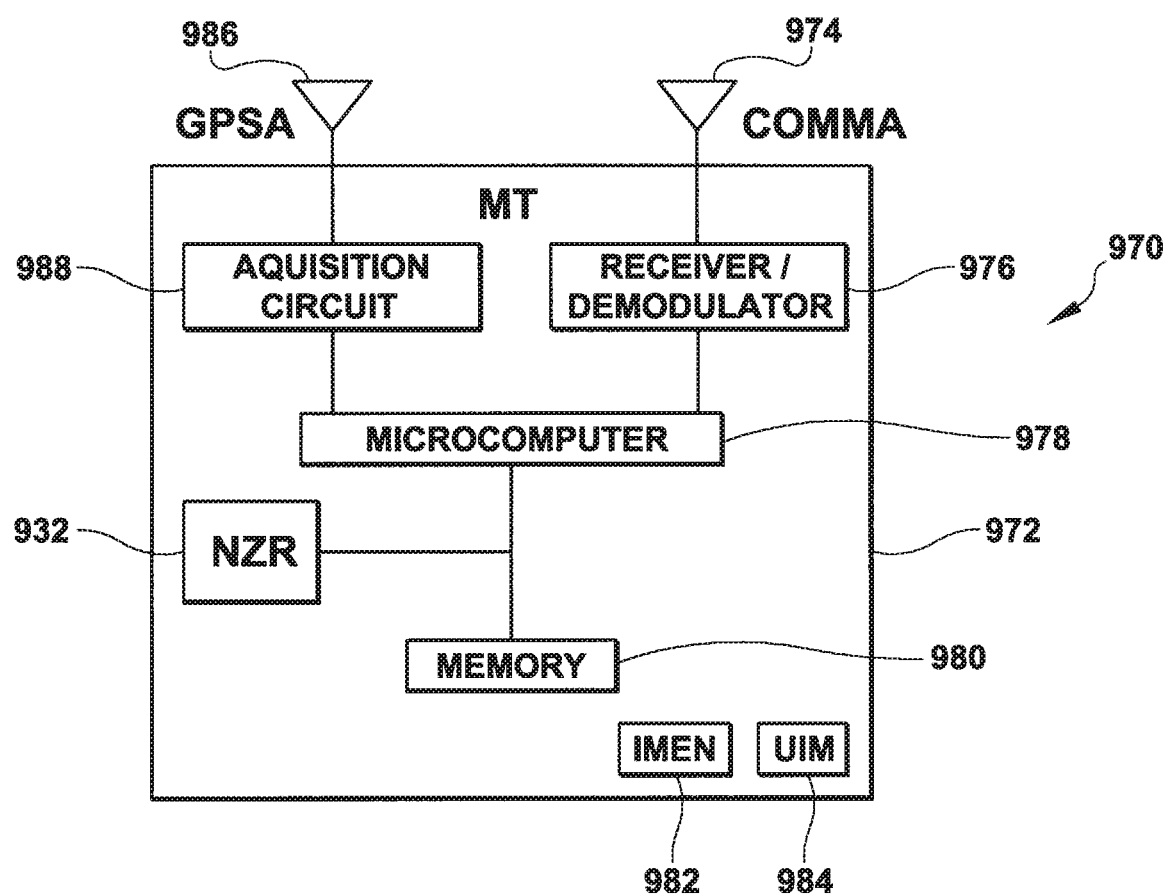
FIG. 10 shows an alternative wireless communication device embodiment of the invention.

FIG. 10 shows another embodiment of the invention in which in the representative prior art cell phone system 7 of FIG. 3 MT 70 includes a no communication zone register (NZR) 932 including a database of predetermined zones in which communication by, to, or by and to MT 970 is to be disabled and/or functions of MT 970 are to be disabled, enabled, or modified. In this embodiment, MT 970 tracks its location based on GPS positioning data (alone or with the aid of AGPS). When MT 970 is in one of the predetermined zones in which certain communication by, to, or by and to MT 970 is not permitted, MT 970 is disabled from handling the certain communication by, to, or by and to MT 970. NZR 932 is a register like shown and discussed in connection with FIG. 5 that may include a table of geographical locations. The listing of geographical locations may be limited by the size of the register. For example, in view of the size constraints of the available semiconductor space in MT 970, the geographical locations could be limited to a limited set of predetermined locations such as movie theaters within a 10 mile radius of the billing address of the mobile user. To be maintained current, NZR 923 could be updated by the network 12 in which MT 970 is authorized to be used by the employment of well-known over the air reprogramming technologies. The logic for the embodiment of the invention shown in FIG. 10 may be similar to the logic shown in FIG. 6 except that control block 620, which is shown to obtains GPS location of MT 70, would be done by MT 970 and not by the network as discussed in connection with FIG. 6.

As an alternative embodiment, NZR 932 may be a register like shown and discussed in connection with FIG. 7 that may include a table of conditions on the speed of MT 70. In this embodiment, MT 970 further comprises software for calculating the speed of MT 970 from GPS positioning data. Since speed is the distance traveled in a specified time, software may, using GPS position data, track the distance traveled by MT 970 in a specified time and calculate the speed. The sophistication of the calculation may be limited by available semiconductor considerations. The logic for this embodiment of the invention may be similar to the logic shown in FIG. 8 or 9 except that control block 720 and 820, which is shown to obtain speed information on MT 70, would be done by MT 970 and not by the network as discussed in connection with FIGS. 8 and 9.

In the embodiment of FIG. 10, the predetermined zone may be a geographical location, and may comprise a GPS position. Alternatively, the predetermined zone may comprise a condition on the speed of the wireless communication device in said network where the speed may be derived from GPS position data. Disabling of communication with respect to the wireless communication device in FIG. 10 may occur by enablement of a flag in the wireless communication device that prevents the wireless communication device to place, receive, or place and receive the certain communication while the communication device is in the no communication zone. The condition on the speed of the wireless device may be taken from the group of no communication allowed, communication allowed, and communication allowed under certain preconditions. The device may recognize that the wireless communication device is operating in a hands free mode of operation. The certain communication disabled may exclude communication under conditions taken from the group of the speed of said wireless communication device is less than a predetermined speed and said wireless is being used in a hands free mode of operation. The certain communication disabled may exclude communication under an emergency call. On interruption of service, the device may display a message indicating that service is interrupted because the communication device is in a no communication zone.

As yet another embodiment, MT 970 may be used in the network shown in FIG. 4. One of the benefits of such a hybrid configuration in which both the network and the terminal contain a no communication zone register is that it may allow for quicker adoption of the technology. This by allowing, for example, legacy mobile terminals, that are without the architecture and/or semiconductor real estate that might allow for over the air reprogramming of the terminal with no zone register communication functionality, to be disabled using no zone communication registers located in the network while newer model terminals are provided with no communication functionality in the terminal.

In an embodiment of a method for disabling predetermined communication by, to, or by and to a wireless communication device, the method comprises: creating a no communication zone of locations wherein the wireless communication device is to be disabled; tracking predetermined positioning data on the wireless communication device; querying whether the predetermined positioning data is within the no communication zone location; and if the wireless communication device is in a no communication zone location, disabling certain communication by, to, or by and to the wireless communication device.

While the foregoing embodiments illustrate the use of GPS location and derived speed, in alternative embodiments the invention may be useable with any GPS direct or derived information. As one example, where acceleration is derived from GPS data, the use of MT 70 could be conditioned on the acceleration of MT 70 in the network. In addition, embodiments of the invention may create conditions of dead zone of operation based on a blend of GPS and non-GPS data. For example, a dead zone may be further conditioned on the time of day of use of MT 70 such that at certain times of day a dead zone would exist to disable use of MT 70 whereas at other times of day the dead zone would be lifted to allow MT 70 to be used in that zone. The previous example further illustrates that embodiments of the invention may be used alone or in combination with one or more direct or derived information. As yet another example of the use of embodiments of the invention with a combination of information, in the situation where the operation of a communication device is not allowed in a city but allowed outside of a city, embodiments may track both the location of MT 70 with respect to the city as well as the speed of the MT 70 at its location. Whether MT 70 would be operable would turn on the conditions that MT 70 satisfies where used.

While the foregoing embodiments for disablement of MT 70 have been disclosed, there are other ways well known to those skilled in the art in which communication by, to, or by and to a wireless communication device may be restricted and these other well-known ways provide yet other embodiments how the communication of MT 70 may be disabled and the implementation of these other ways of restricting the wireless communication of MT 70 are incorporated herein as to these other embodiments that use Applicant's dead zone invention for wireless communication devices. For example, disablement may occur by the network or device flagging on a feature that overrides the password of MT 70 when MT 70 is in a dead zone which prevents a user from unlocking his phone for use while in the dead zone. As yet another example, disablement may occur by the network or device flagging on a feature that disables the send/receive keypad on MT 70.

In the previous embodiments, except as to establishments that may be mandated by applicable laws to be included on the dead zone list which would need to be included on the list, the network may generate the dead zone list of hospitals, movie theaters, performing arts halls, churches, or other places where the use of cell phones may interfere with the public enjoyment, health, welfare, or safety, possibly based upon publicly available information. In another embodiment, if the establishment is listed on the dead zone list by default, unless it is one of the mandated establishments, the establishment may have the option to elect to be dropped from the list so as to allow MT 70 to be used in its establishment. For example, a restaurant that may be included on the dead zone list by default may elect to be dropped from the list in order to allow its customers to use MT 70 in its establishment. As yet another embodiment, any establishment that may not be included on the default dead zone list may have the option to elect to be included on the dead zone. For example, a store or a football stadium may request to be included on the dead zone list in order to prevent the use of MT 70 from disturbing its patrons. As yet another example, inclusion of an establishment on the dead zone list may be by way of a service offering provided by the service provider. The service may be offered at no charge to an establishment or may offered on a subscription fee basis. With this service, an establishment may elect to have their establishment included on the dead zone list by subscription to the service.

Figure 11A:
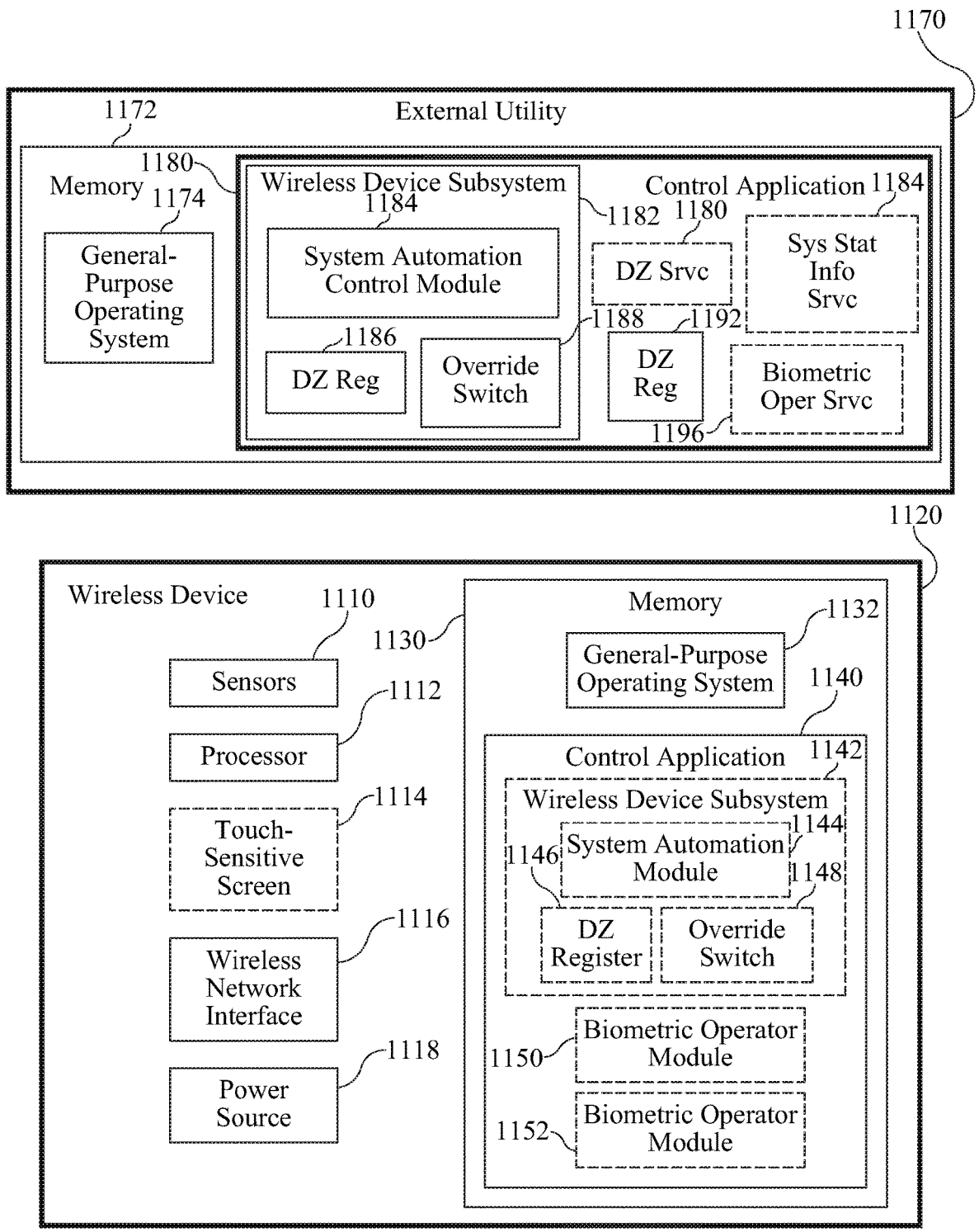

FIG. 11A shows an illustrative embodiment of this disclosure comprising a wireless device 1120 and an external utility 170. Wireless device 1120 comprises a processor 1112 and a memory 1130. External utility comprises a memory 1172 for storing instructions for execution by processor 1112 or by an external processor. A processor (not shown) may be associated with memory 1172 to execute instructions stored in the memory. The instructions may be configured to execute control instructions of general purpose operating system 1174 and control applications 1180.

Processor 1112 may be hardware and software configured to process instructions. The processor may be implemented in any number of ways. Such ways include, by way of example and not of limitation, digital and/or analog processors such as microprocessors and digital-signal processors (DSPs); controllers such as microcontrollers; software running in a machine; programmable circuits such as Field Programmable Gate Arrays (FPGAs), Field-Programmable Analog Arrays (FPAAs), Programmable Logic Devices (PLDs), Application Specific Integrated Circuits (ASICs), any combination of one or more of these, and so on. Processor associated with external utility 1170 may be a server class processor, or other processor configured for executing control instructions associated with general purpose operating system 1174 and control applications 1180.

Memory 1130 may be any physical device capable of storing information temporarily or permanently. Memory may be implemented in any number of ways. Such ways include, by way of example and not of limitation, nonvolatile memories (NVM), read-only memories (ROM), random access memories (RAM), any combination of these, etc. Memory 1130 may include programs containing instructions for execution by processor 1112 or a processor external to the wireless device. The instructions perform the functions described in this disclosure including performing protocols, decision making analytics, and so on. In addition, memory 1130 may store rules, configurations, data, etc. Memory 1172 of external utility 1170 may be a server class memory, or other memory configured for storing control instructions associated with general purpose operating system 1174 and control applications 1180.

At least some of the software and data structures stored in the memory 1130 of the wireless device 1120 implements a general-purpose operating system 1132 that functionally organizes the wireless device 1120. The general-purpose operating system 1132 may be a type of operating system, that is capable of executing a variety of types of software applications, including applications related to wireless device control.

The general purpose operating system 1174 of external utility 1170 may be a type of operating system that is capable of executing a variety of types of software applications, including applications related to wireless device control. It will be understood that a general purpose operating system includes operating systems that, while capable of executing a variety of software applications, may be configured for special-purpose applications in any particular embodiment.

At least another part of the software and data structures in the memory 1130 of the wireless device 1120 stores a control application 1180 that is utilized to control external utility functions as disclosed herein.

At least another part of the software and data structures in the memory 1172 of the external utility stores a control application 1180 that is utilized to control wireless device functions as disclosed herein.

The control application 1140 of wireless device 1120 may include a wireless device subsystem 1142, a biometric operator module 1150, and a system status information module 1152. The wireless device subsystem 1142 of wireless device 1120 may include a system automation module, a dead zone (DZ) register 1146, and an override switch 1148.

The control application 1180 of external utility 1170 may include a wireless device subsystem 1182, a dead zone (DZ) service 1190, a dead zone (DZ) register 1192, a biometric operator service 1196, and a system status information module 1194. The wireless device subsystem 1182 of external utility 1170 may include a system automation control module 1184, a dead zone (DZ) register 1186, and an override switch 1188.

The wireless device subsystem 1142 of wireless device 1120 may be hardware and software configured to monitor and control the wireless device. The wireless device subsystem 1142 of wireless device 1120 is also electrically coupled to, and provides control signals to wireless device subsystems such as sensors 1110 (or other subsystems, e.g., camera operation, scanning operation, texting, emailing, internet connectivity, etc.) that implement image capture, motion, wireless communication, internet browsing, and/or other function control. In one illustrative embodiment, the wireless device subsystem 1142 of wireless device 1120 is electrically coupled to one or more sensors 1110 onboard the wireless device as explained below. Image data, system status data, and/or other data may be detected by sensors or collected, under the direction of wireless device subsystem 1142 of wireless device 1120 for processing by the wireless device subsystem 1142 of wireless device 1120. Illustratively, the wireless device subsystem 1142 of wireless device 1120 may be configured to control the operation of the lower level systems of wireless device as explained below.

Alternatively, control of the lower level systems of wireless device may be by wireless device subsystem 1182 of external utility 1170, or by both the wireless device subsystem 1182 of external utility 1170 and the wireless device subsystem 1142 of wireless device 1120. The wireless device subsystem 1182 of external utility 1170 may be hardware and software configured to monitor and control the wireless device from an external location.

The DZ register 1146 of the wireless device subsystem 1142 of wireless device 1120 may be a portion of memory 1130 that stores locations in which a function of the wireless device should be disabled or modified in order to adapt to the requirements specified for the location. In another illustrative embodiment, the DZ register 1186 of wireless device subsystem 1182 of external utility 1170 may store locations in which a function of the wireless device should be disabled or modified in order to adapt to the requirements specified for the location. In another embodiment, the DZ register 1192 of the external utility 1170 may store locations in which a function of the wireless device should be disabled or modified in order to adapt to the requirements specified for the location. In another embodiment, combinations of DZ registers may be used according to this disclosure. For example, DZ register 1186 may contain dead zone locations on the network level and DZ register 1146 may contain dead zone locations on the wireless device level customized for a particular wireless device or user. DZ register 1192 may contain dead zone locations useable by a DZ service 1190. For example, a communication service provider for the wireless device may customize DZ register 1146 and DZ register 1186 in accordance with restrictions and permissions set by the service provider; while DZ register 1192 may be dead zone locations for which restrictions and permissions are set by a specific DZ service 1190. For instance, if the wireless device is associated with a firearm as per the examples below, a firearm bureau may operate the DZ service 1190 and use the DZ register 1192 for dead zone locations applicable to that service while the provider of the communication service may control the dead zone locations in DZ register 1186.

Dead zone locations may be locations in which the functionality of one or more features of a wireless device may be prohibited. Where, for example, the dead zone is a location in which all voice communications are prohibited, a wireless device in such a dead zone location may by the teachings of this disclosure cause the cellular and voice over IP (VOIP) functions of the wireless device to be disabled. However, the other communication features of a wireless device such as text messaging or emailing or internet browsing may still be enabled and so be allowed. In this example, some but not all communication functionalities of a wireless device may be disabled by the teachings of this disclosure. In another example, all communication functionality of a wireless device may be disabled during the duration of time that the wireless device is in the dead zone. For instance, if the dead zone is a location where a wireless device should not be used, the communication features of the wireless device may be disabled.

The teachings of this disclosure also permit the functionalities of a wireless device to be modified without disablement. For instance, a wireless device that is approaching a dead zone may be modified by the teachings of this disclosure so that the user is aware that he is approaching a dead zone. For instance, the teachings of this disclosure may cause a communication signal to the smart phone to become weaker and weaker the closer the wireless device gets to the dead zone. This may cause the wireless device to change direction to avoid the dead zone to avoid the disablement of functionalities. In another example, a dead zone may permit a wireless device to render displays on a screen of the wireless device but at an intensity level that is less annoying to others on location. The teachings of this disclosure may modify the intensity settings of the wireless device to allow this to happen.

The wireless device subsystem 1142 of wireless device 1120 may include an override switch 1148. The override switch may be hardware and software configured to override the control of the wireless device as explained below. Where, for instance, a wireless device enters a dead zone, a control signal from system automation control module 1184 of wireless device 1120 may be applied to the override switch 1148. The output from the override switch 1148 may override control of the wireless device and disable the functionalities that are not permitted by the wireless device while in a dead zone.

Alternatively, where control of the lower level systems of wireless device may be by wireless device subsystem 1182 of external utility 1170, a control signal from system automation control module 1184 of external utility 1170 may be applied to an override switch 1188. The output from the override switch 1188 may override control of the wireless device and disable the functionalities that are not permitted by the wireless device while in a dead zone.

In operation, image, system status, or other data may be collected by the wireless device, the external utility 1170, or both. And the wireless device subsystem 1142 of wireless device 1120, the wireless device subsystem 1182 of external utility 1170, or both in turn issues appropriate control signals to lower level systems of the wireless device to control their performance (such as disable function of the wireless device).

The biometric operator module 1150 may be hardware and software configured to calculate one or more biometric data or metrics, determine therefrom identity indicia on the operator currently using the wireless device, and based on the identity indicia, enable or disable functionality of the wireless device or services provided to the wireless device as described herein. Biometric data or metrics may include one or more of data samples, models, fingerprints, similarity scores and verification or identification data.

Biometric data or metrics may be used to authenticate a user of the wireless device for purposes such as identification and access control. A biometric operator monitor may employ a biometric identification technique such as face recognition, fingerprint identification, hand geometry biometrics, retina scan, iris scan, signature, voice analysis, and so to authenticate a user and access control. For example, if the biometrics of an operator do not match the biometrics of an authorized wireless device operator encoded in the memory 1130 (e.g., the operator is not the registered user of the wireless device), the biometric operator module may not enable the wireless device or if the wireless device is enabled, the biometric operator module may disable the wireless device.

Alternatively, external utility 1170 may include a biometric operator service 1196. Biometric operator service may be server class hardware and software configured to calculate one or more biometric data or metrics, determine therefrom identity indicia on the operator currently using the wireless device, and based on the identity indicia, enable or disable functionality of the wireless device or services provided to the wireless device as described herein. Alternatively, biometric operator service may be non-server class hardware and software.

Alternatively, if the operator is not the registered user of the wireless device, the biometric operator module may perform one or more other sequences, such as a sequence to determine, notwithstanding the operator not being the registered user of the wireless device, whether the operator is someone otherwise authorized to use the wireless device. For example, in the illustrative embodiment of FIG. 11A, a cloud service may be provided comprising a registry of biometric or other data on law enforcement officers. The biometric operator module may provide to the cloud service the biometric or other data on the person seeking to use the wireless device. The cloud service may then perform a set of instructions to determine whether the provided biometric data of the intended user matches the biometric data of a law enforcement officer. If there is a match, the cloud service may communicate to the biometric operator monitor to provide control instructions to enable the wireless device for use by the intended user. A biometric operator service 1196 in memory 1172 may provide this service of controlling the enable/disable functionality of the wireless device or services provided by the network to the wireless device based upon biometric data.

The system status information module 1152 may be hardware and software configured to provide system status information that may include data on why a wireless device remains disabled or functions of the wireless device remain disabled notwithstanding the desire of the operator to use the wireless device, information on the condition of the wireless device, instructions on what an operator may do in order to enable the firearm, and so on. For example, the status data may indicate that the biometric recognition failed; try again. Or the status data may indicate that the wireless device is in a dead zone; move to another location. The status data may also indicate that the power source is low; recharge or change battery. Other information may also be provided.

To provide feedback to an operator on the system status information, the electronic control system may also include a speaker, to issue voice prompts, etc. The electronic control system may also include visual gauges like a gauge to indicate the amount of power left and a gauge that changes in a condition such as changing a color, such as green, when a function of a wireless device is enabled according to this disclosure, and another color, such as red, when a function of the wireless device is enabled.

As depicted in FIG. 11B, touch-sensitive screen 1114 may display a dashboard of one or more functions of the wireless device that are controlled by the system automation module 1144 of the wireless device 1120, the system automation control module 1184 of the external utility 1170, or both. The dashboard provides enablement/disablement/modified indicia along with a script. The script may be a program that operates on the external utility and wireless device, as the case may be. Illustrative functions of the wireless device controlled by this disclosure illustrated on the dashboard are elements 1125, 1123, and 1127 associated with disablement by the wireless device, disablement by the external utility, and a modification of the functionality by both wireless device and external utility according to this disclosure. In the case of element 1127, a script would modify the performance of the GPS navigation system. Since in this example, a script from both external device and wireless device would apply, the script with the higher priority would apply to control the modification of the indicated function.

Figures 11C, 12:
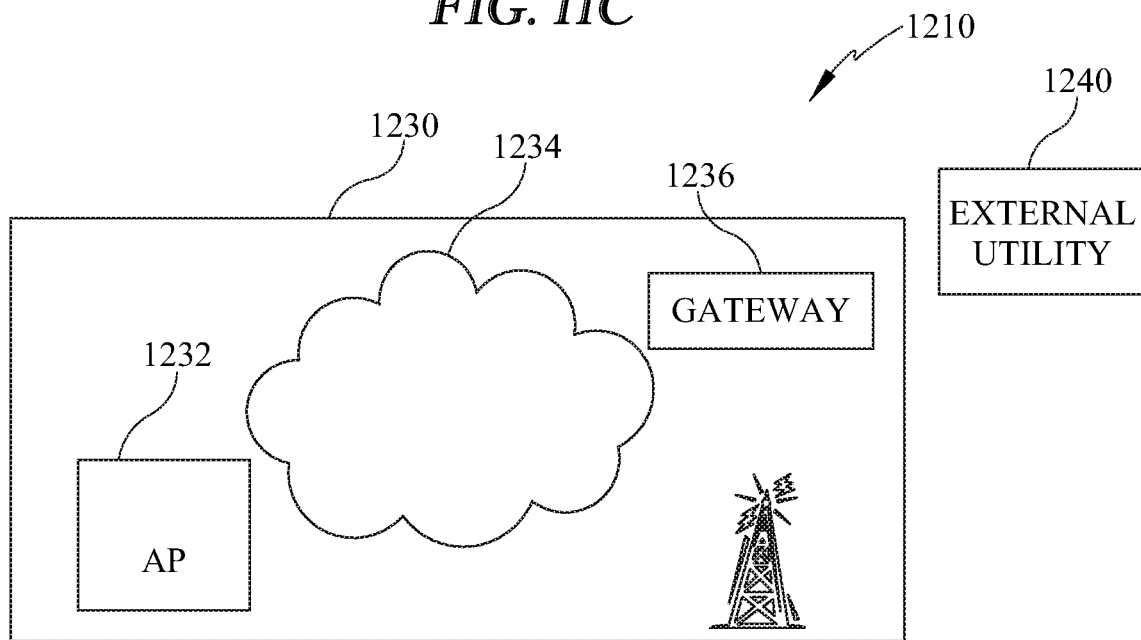

FIG. 11C depicts a logic map for enablement/disablement/modification of a wireless device by wireless device subsystem 1182 and wireless device subsystem 1142 (e.g., a logic map distributed across the wireless device 1120 and external utility 1170). As indicated, if both network and wireless device enable a function of the wireless device, the function will be enabled. If any one or both network and wireless device disable a function of the wireless device, the function will be disabled. If either network or wireless device is enabled and the other of network and wireless device is configured to run a script or to modify the functionality of the wireless device, the script will execute and provide control signals for controlling or modifying the function. If both network and wireless device invoke scripts or modification, then the script or modification that has been ascribed the higher priority will execute and provide control signals for controlling or modifying the function.

A system status information service 1194 in external utility 1170 may provide system status information to the wireless device for controlling the enable/disable functionality of the wireless device or services provided by the network to the wireless device.

A dead zone (DZ) service 1190 in external utility 1170 may provide dead zone services to the wireless device for controlling the enable/disable functionality of the wireless device or services provided by the network to the wireless device. For example, a third party may set up a dead zone subscription service whereby churches, restaurants, and so on may subscribe to have control signals sent to control functionality in wireless devices that are on the premises of the subscriber.

The wireless device may include a touch-sensitive screen 1114 to allow a wireless device operator to interface with the wireless device. The touch-sensitive screen may be a computer display screen that is also an input device. Illustratively, the touch-screen may be integrated with the electronic control system of the wireless device to allow an operator of the wireless device to provide input commands to the wireless device and to scroll, navigate, and zoom image, system status, and other data rendered on the touch-sensitive screen. Alternatively, any enable/disable control interface may be used in place of the touch-screen.

The screens may be sensitive to pressure. A user may interact with the wireless device by touching pictures or words on the screen. The touch-sensitive screen 1114 may be configured to visually display information and to received input, including touches and gestures entered by an operator. Alternatively, the touch-sensitive screen 1114 may be provided by the display of a wireless mobile device. Illustrative examples of wireless mobile devices include tablet computers, smartphones, and certain portable media players that execute general-purpose operating systems. Alternatively, the touch-sensitive screen 1114 may be provided by the display of an external utility configured to wirelessly communicate with the wireless device of this disclosure. The wireless communication of the wireless mobile device or external utility with the wireless device may be over a wireless network 1230 described below in connection with FIG. 12 below. Alternatively, the wireless mobile devices, external utility, or other enable/disable control interface, such as a monitor, may be hardwire tethered to the wireless device of this disclosure through communication ports.

As described above, the touch-sensitive screen may allow the image, system status, or other data to be displayed on a user interface (UI) on the touch-sensitive screen 1114 (FIG.

11A), and may receive control input indicating desired motion and/or other function control via the UI, such as when firearm operator control is permitted in the embodiment described below. The desired motion may be scrolling, navigating, and zooming image, system, and other data rendered on the touch-sensitive screen. This control input may be passed to the network 1230 for transmission back to the external utility 1170 (FIG. 11A) (which may be a server 1240) where permitted. The network 1230 may be a public or private network, or combination of both.

The touch-sensitive screen may also enable an operator of the wireless device to pass data to the network through wireless network interface 1116 for transmission back to an external utility 1170 (FIG. 11A) over a wireless network, when permitted. The touch-sensitive screen may also render on the display of the touch-sensitive screen data received over the wireless network from a cloud service or other external utilities over the network. For instance, data streamed into the wireless device for rendering on the touch-sensitive screen (or for broadcast audibly) may include data on why one or more features of a wireless device remains disabled, data requiring the operator to perform certain steps before enabling the wireless device, data resulting from a biometric check done by a cloud server as previously described, and so on.

The external utility may provide a control signal to wireless network interface 1116 for use by wireless device in controlling the firearm as disclosed herein.

An operator may be permitted to access data, such as image, system status, other data, update data, and/or confirm data, and so on. For example, an operator may have permission to access system status data in order to understand why a wireless device functionality has been disabled. The dashboard depicted in FIG. 11B illustrates one way in which such information may be made available to an operator.

A service provider may have permission to update status data over a network as disclosed herein. In one illustrative example, the service provider may be a bureau, such as a government entity enabled with permissions to update status information. A law enforcement officer may have permission enable a wireless device that is not his own. Permission may be illustratively granted using a cloud service including a registry on biometric data as previously explained.

Permission may be given to a user of the wireless device in other situations after a condition has triggered the functionality of the wireless device to be disabled. For example, a user may have permission to make a 911 call even in a location where calling is prohibited or restricted. In another example, a law enforcement officer entering a dead zone in hot pursuit of armed robbers may, for example, using permissions, over-ride the disabling of the wireless device to allow one or more functionalities to be used. Permissions may be encoded in the memory of the wireless device or stored in a cloud service which may include a registry of persons with permission to operate the wireless device.

The wireless device may also include an enable/disable control interface through which a remote operator or service may monitor and control the wireless device as described herein. For example, the wireless device subsystem 1142 of the wireless device may include an interface through which a remote operator or service may monitor and control the wireless device as described herein.

The wireless device may be provided with a microphone for the electronic control system to receive voice commands, such as by an operator, like "try again" or "reboot", and so on.

In another embodiment, a plurality of wireless devices may be tethered or wirelessly connected to an off boarded computing device. The computing device may serve the plurality of wireless devices in one or more ways, such as by validating the operator, providing services, and so forth. A plurality of wireless devices may be wirelessly connected to a remote computing device for purposes of monitoring and controlling the wireless device in the dead zone area, such as by disabling a functionality of the wireless device when an operator is entering a dead zone.

FIG. 11A shows a wireless device may that further include sensors 1110. Sensors 1110 may comprise an image capture sensor, another sensor, or a combination of both. The image capture sensor may be hardware and software configured to capture an image. Image capture sensors typically include one or more light sensors. A light source may also be included to emit light to be reflected off an object. The light sensors capture and translate the reflected light into electrical signals. The image captured may be a photo image. For example, the light sensors may be a high-pixel resolution CCD (charge coupled device) chip and it and associated hardware may be used for generating digital images. The software for processing the captured images may reside in the memory 1130 or a section of memory. Alternatively, the image capture sensors may be provided with a processor and a memory for storing and executing this image processing software.

Other sensors may include heat, location accelerometer, a gyroscope, a magnetometer, a proximity sensor, a gravity sensor, a linear accelerometer, and so on. Additional sensors may include light sensor, camera sensors, microphone sensors, touch sensors, pressure sensor, temperature sensor, humidity sensor, and so on.

Illustratively, the wireless network interface 1116 may comprise transceiver circuitry and software for sending and receiving packets over a wireless network (e.g., an IEEE 802.11 WLAN). Alternatively, the transceiver may be hardware and software configured to transmit data to and from the electronic control system and a network or an external device including Wi-Fi, blue tooth CDMA, and so on, that enables a wireless communication link for between the electronic control system and an external device.

In an alternative embodiment, the wireless network interface 1116 may be combined with or replaced by a hardwire connect for electrically connecting the electronic control system to the network by wire, such as one or more ports and associated circuitry and software that allow wired communication between the electronic control system and an external device (e.g., an Ethernet connector, an RS232 connector, a USB or other wire connector.)

A hardwire connect may be used, for example, to tether a wireless device to another wireless device to enable the functionality of the wireless device to assist, augment, enhance, or complement functionality that is provided by the wireless device. In one example, the tether permits the wireless network interface of the smart phone to be used by the electronic control system to communicate with external devices or a network. For example, a smart phone received and held in a pocket of a garment worn by the operator may be tethered to the wireless device so as to allow the smart phone to communicate with the wireless device to perform the functionalities of this disclosure. For example, the touch-screen of the display of the mobile device may provide the touch-sensitive screen 1114 of the wireless device. In another example, the wireless network interface of the smart phone may provide the hardware and software to establish a wireless communication link with a network.

The wireless network interface 1116, hardwire connect, or both may enable any computing device to be electrically connected to the wireless device of this disclosure. By computing device is meant servers, intermediary servers, personal computers, cellular phones, smart phones, wireless computers, wireless lap-top computers, mobile devices such as tablet computers, pad computers, personal digital assistant, wireless sensors or networks of sensors, such as mesh network sensors, and so on may be in electrical communication with to provide functionality to the electronic control system.

In another illustrative embodiment, a wireless mobile device such as a smartphone or other computing device may be the wireless device of this disclosure. In this embodiment, the smartphone may provide the processor, memory, and wireless network interface functionalities of the electronic control system according to this disclosure. The battery of the smartphone may provide power for the firearm subsystem or enhance a power system provided the firearm for operating the firearm subsystem.

FIG. 12 shows an illustrative embodiment system 1210 implementation of FIG. 11 of this disclosure comprising a wireless device 1220, a network 1230, and an external utility 1240.

Wireless device 1220 has been previously described. Network illustratively may include access point 1232, base station 1238, a cloud 1234, and a gateway 1236. Network may include an access point or base station or both. Networking may also occur on a peer-to-peer basis where possible.

Access point 1232 is a station that transmits and receives data (sometimes referred to as a transceiver). An access point connects users to other users within the network and also can serve as the point of interconnection between the WLAN and a fixed wire network. A base station is a fixed point of communication for customer cellular phones on a carrier network. A cloud is a network of computers through which data passes between two end points. A gateway 1236 is a network node that connects two networks using different protocols together.

External utility 1240 comprises one or more programmed computers that may be connected to the wireless device 1220 wirelessly or by wired connection in order to allow for the exchange of data and control signals between the electronic control system and the external utility through wireless network interface 1116 and/or hardware connection as previously explained. The external utility of this disclosure may be a cloud server. A server may be any computer configured to serve the requests of client programs running on the same or other computers on a network. The computer of the external utility may be a host computer configured to serve the requests of one or more client programs residing in the safety disarm module. Alternatively, the computer of the external utility may serve a client residing on the external utility or on some other computer to which the external utility may be connected. Depending on the computing service that the server is configured to offer, the server may include one or more of a file server for storing and making files accessible for reading and writing to the client, a print server that manages one or more printers, a network server that manages network traffic, a mail server that manages mail on a network, a database server that allows clients to interact with a database, a firearm server for managing firearm records, and so on. The server may also be in communication with one or more other servers that may include one or more of the foregoing or other servers. The foregoing and servers may provide a service to the firearm operator. For instance, the print server may enable a firearm operator to print an image of a target or print information on why the firearm was not armed, or information on the use of the firearm such as day and time of use, time of firing, number of firings, location, and so on. Sensors associated with the firearm may track movement of the firearm for printing by the print server for investigative, historical, archival, or other purposes.

The computer of the external utility may be any computer (e.g., end user device or server) including servers, intermediary servers, personal computers, cellular phones, smart phones, wireless computers, wireless lap-top computers, mobile devices such as tablet computers, pad computers, personal digital assistant, and wireless sensors or networks of sensors, such as mesh network sensors. These examples are not intended to be limiting, and the present disclosure is not limited to these examples of computing device. In one illustrative embodiment, the computing device may be a user equipment such as a cellular phone, a smart phone, or other device, such as a tablet or a personal digital assistant containing a multi applications processor configured to execute a mobile application. In other embodiments, any computing device configured to execute an application to provide a data service according to this disclosure may be used as the computing device of this disclosure.

The external utility 1240 in FIG. 12 may be configured to serve the control application in controlling the operation of the wireless device and in supporting the operator of the wireless device. In one example, the illustrative memory map on dead zones may reside in the wireless device. Alternatively, the map may reside on an external utility, such as a cloud server. Alternatively, a first map may reside on the external utility and a second map on the wireless device. The maps may be identical, similar, complementary, and so on.

The cloud server may allow for dead zone services at a level more complicated and sophisticated than possible on the wireless device to take place in order to make the enable/disable of this disclosure. Control application of this disclosure, for example as illustrated in FIG. 11A may comprise software configured to create a communication link between the wireless device and the cloud server so as to allow the electronic control system and the service to communicate. The control application may be downloadable software, embedded software, and so on. In another example, the cloud server may allow for complex biometric metrics to be generated for use by the biometric operator monitor of the wireless device of this disclosure. This may make the enabling of a wireless device in a dead zone, for example, according to this disclosure based on the biometric identity of the operator more robust and effective.

In another example, the cloud server may allow for system status data to be generated for use by the system status information module 1152. This may make the feeding of system status data to the wireless device of this disclosure more robust and effective.

In another embodiment, as shown in FIG. 11A, an illustrative memory map for operation of the wireless device may reside on a cloud server. Data on the wireless device, wireless device registrant, registration data, permitted wireless operators, wireless operator recognition, date of use, location of use, dead zone restrictions, and so on may be managed by way of a service on a cloud server and used to arm or disarm a firearm, stream data, provide guidance or coaching to an operator, and so on.

Figure 13A:
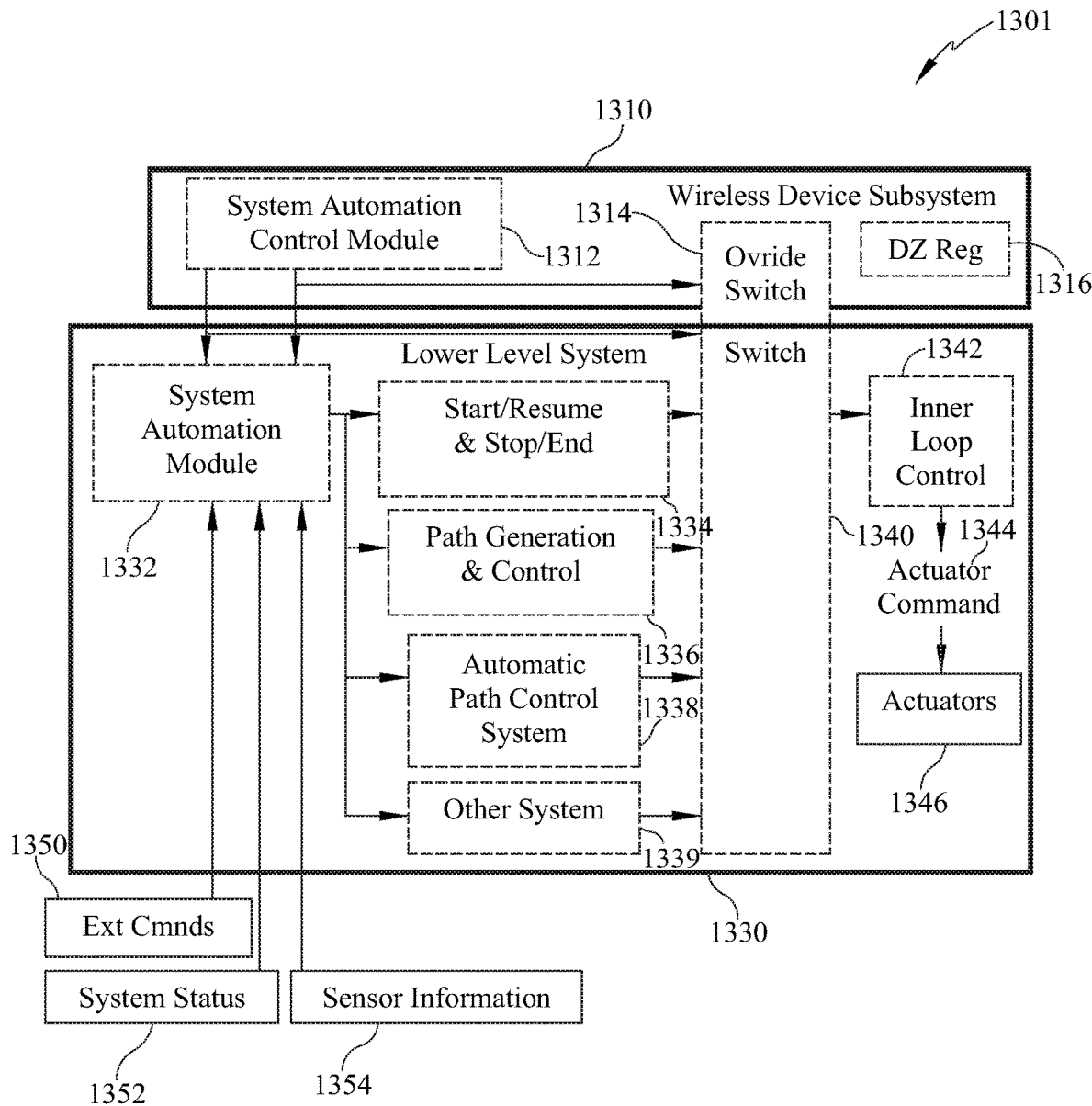

FIG. 13A depicts an illustrative dead zone control architecture 1301 for wireless device. In wireless devices, there may be many controllers which are responsible for different functions of a wireless device or for controlling the wireless device on different levels. To perform a given wireless function the wireless device controllers (e.g. Start/Resume & Stop/End 1334. Path Generation & Control 1336. Automatic Path Control System 1338, Other System 1339) are activated and connected in a certain way. A system automation module 1332 provides control signals to the device controllers responsive to external commands 1350, system status 1352, and sensor information 1354. The specific ways system automation module 1332 does this are known in art and a matter of design choice.

A wireless device subsystem 1310 of this disclosure (either wireless device subsystem 1142 in wireless device 1120, or wireless device subsystem 1182 in external utility 1170, or both) applies control signals to system automation module 1332 in order to enable, disable, or modify one or more functionalities of the wireless device in accordance with this disclosure. Control signals may be generated by the wireless device subsystem 1310 responsive to the wireless device approaching a dead zone, entering a dead zone, and so on. The outputs of the controllers are illustratively applied to a switch 1340 for generating an actuator command 1344 which may be under the influence of an inner loop control that controls actuators 1346. Actuators 1346 may be an electro-mechanical, electrical, or software configuration that generates an actuator response in response to the actuator command 1344. An electromechanical actuator may be the mechanism that causes a camera lens to zoom and out and to focus and take a picture. An electrical actuator may be light sensor that flashes in response to the actuator command 1344. A software actuator may be a switch that turns a function of a wireless device on or off. For instance, the software actuator may turn off wireless network interface 1116. Alternatively, it may turn off email, text, or sms messaging. Other illustrative functions of the wireless device are depicted in FIG. 11B.

Wireless device subsystem 1310 may also include an override switch 1314 to generate a control signal to override control signals that are otherwise generated by switch 1340.

A DMZ register may be used by the system automation control module 1312 to determine whether or not the wireless device is approaching or entering or leaving a dead zone location.

In operation, the system automation control module 1312 monitors the location of the wireless device. As a wireless device approaches a dead zone location, the system automation control module 1312 may generate control signals for modifying the wireless device controllers (e.g. Start/Resume & Stop/End 1334, Path Generation & Control 1336, Automatic Path Control System 1338. Other System 1339) are activated and connected in a certain way. For example, the system automation control module may generate scripts as shown in FIG. 11B to change the performance of the wireless device controllers. For example, the script may cause the signal of the voice call to become weak, or cause the internet signal to become weak, or cause the illumination of the display of the wireless device to become dimmer. The closer the wireless device is to the dead zone location, the more the control signals generated by the system automation control module 1312 may cause the performance of the actuators to change. In this way, the operator of the wireless device may change course to steer clear of a dead zone location or become aware that he is approaching a location where one or more functionalities of his wireless device may be disabled.

When the system automation control module 1312 detects that a wireless device is entering a dead zone, the system automation control module 1312 may disable a functionality of the wireless device. The disable control signal may be generated by override switch 1314 or by control signals that the system automation control module 1312 applies to the system automation module 1332.

FIG. 13B shows illustrative dead zone control architecture for wireless device of FIG. 13A incorporated in an external utility. The elements shown are generally as described in FIG. 11A adapted for use with wireless device of FIG. 13A according to the teachings of this disclosure. FIG. 13D shows illustrative dead zone service in a separate external utility. Alternatively, a single external utility may integrate the functions illustrated in FIGS. 13B and 13D or the functionalities may be distributed across a plurality of external utilities. FIG. 13C illustrates a memory map that may be stored in DZ register depicted in FIG. 13B. The memory map may include indicia such as wireless device, device registration, registration date, permitted users, user recognition, location of use, dead zone areas, and functionalities to be disabled. These functionalities may be the actuators 1346 in FIG. 1A and depicted in FIG. 11B.

The specific functionality to be disabled may be set by rules programed into the system automation control module 1312. For instance, the rules may cause system automation control module 131 to disable all communication functionality or just voice calling.

The modification of the behavior of the wireless device may in accordance to rules such as depicted in FIG. 11C.

Figure 14A:
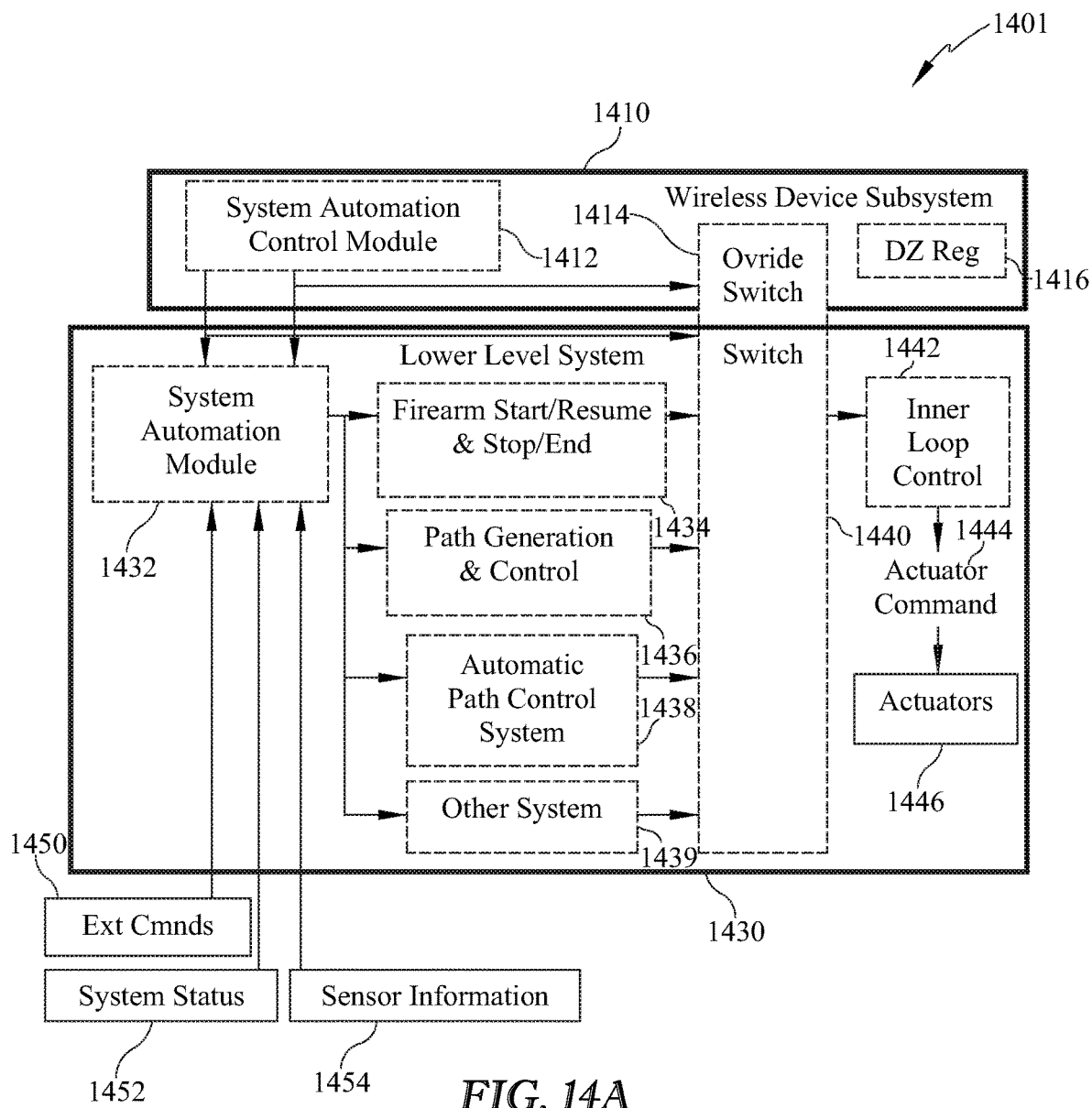

FIG. 14A depicts an illustrative dead zone control architecture 1401 for wireless device for a firearm. In this wireless devices for a firearm, one or more controllers may be provided, the controllers being responsible for different functions of the wireless device or for controlling the wireless device on different levels. In this embodiment, the firearm is controlled by the wireless device by wireless device controllers (e.g. Firearm Start/Resume & Stop/End 1434, Path Generation & Control 1436. Automatic Path Control System 1438. Other System 1439) are activated and connected in a certain way. A system automation module 1432 provides control signals to the device controllers responsive to external commands 1450, system status 1452, and sensor information 1454.

A wireless device subsystem 1410 of this disclosure (either wireless device subsystem 1142 in wireless device 1120 or wireless device subsystem 1182 in external utility 1170, or both) applies control signals to system automation module 1432 in order to enable, disable, or modify one or more functionalities of the wireless device in accordance with this disclosure. Control signals may be generated by the wireless device subsystem 1410 responsive to the wireless device approaching a dead zone, entering a dead zone, and so on. The outputs of the controllers are illustratively applied to a switch 1440 for generating an actuator command 1444 which may be under the influence of an inner loop control that controls actuators 1446. Actuators 1446 may be an electro-mechanical, electrical, or software configuration that generates an actuator response in response to the actuator command 1444. An electromechanical actuator may be a firearm subsystem (e.g., firearm subsystems, such as firearm latch controllers, transmission controllers, latch actuators, etc.) that implement motion and/or other function control as taught in Non-Provisional application Ser. No. 15/663,660 filed Jul. 28, 2017, titled "Safety Disarm for Firearm", which is also herein incorporated by reference. An electrical actuator may be light sensor that flashes in response to the actuator command 14f44. A software actuator may be a switch that turns a function of a wireless device on or off.

For instance, the software actuator may turn off wireless network interface 1116. Alternatively, it may turn off email, text, or sms messaging. Other illustrative functions of the wireless device are depicted in FIG. 11B.

Wireless device subsystem 1310 may also include an override switch 1414 to generate a control signal to override control signals that are otherwise generated by switch 1440.

A DMZ register may be used by the system automation control module 1412 to determine whether or not the wireless device is approaching or entering or leaving a dead zone location.

In operation, the system automation control module 1412 monitors the location of the wireless device. As a wireless device approaches a dead zone location, the system automation control module 1312 may generate control signals for modifying the wireless device controllers (e.g. Firearm Start/Resume & Stop/End 1434, Path Generation & Control 1436, Automatic Path Control System 1438, Other System 1439) are activated and connected in a certain way. For example, the system automation control module may generate scripts as shown in FIG. 11B to change the performance of the wireless device controllers. For example, the script may cause the signal of the voice call to become weak, or cause the internet signal to become weak, or cause the illumination of the display of the wireless device to become dimmer. The closer the wireless device is to the dead zone location, the more the control signals generated by the system automation control module 1412 may cause the performance of the actuators to change. In this way, the operator of the wireless device may change course to steer clear of a dead zone location or become aware that he is approaching a location where one or more functionalities of his wireless device may be disabled.

When the system automation control module 1412 detects that a wireless device is entering a dead zone, the system automation control module 1412 may disable a functionality of the wireless device. The disable control signal may be generated by override switch 1414 or by control signals that the system automation control module 1412 applies to the system automation module 1432.

FIG. 14B shows illustrative dead zone control architecture for wireless device of FIG. 14A incorporated in an external utility. The elements shown are generally as described in FIG. 11A adapted for use with wireless device of FIG. 14A according to the teachings of this disclosure. FIG. 14D shows illustrative dead zone service in a separate external utility. Alternatively, a single external utility may integrate the functions illustrated in FIGS. 14B and 143D or the functionalities may be distributed across a plurality of external utilities. FIG. 14C illustrates a memory map that may be stored in DZ register depicted in FIG. 14B. The memory map may include indicia such as firearm, device registration, registration date, permitted users, user recognition, location of use, dead zone areas, and functionalities to be disabled, other. These functionalities may be the actuators 1346 in FIG. 11A and depicted in FIG. 11B.

The specific functionality to be disabled may be set by rules programed into the system automation control module 1412. For instance, the rules may cause system automation control module 1412 to disable all communication functionality or just voice calling.

The modification of the behavior of the wireless device may in accordance to rules such as depicted in FIG. 11C.

Figure 15A:
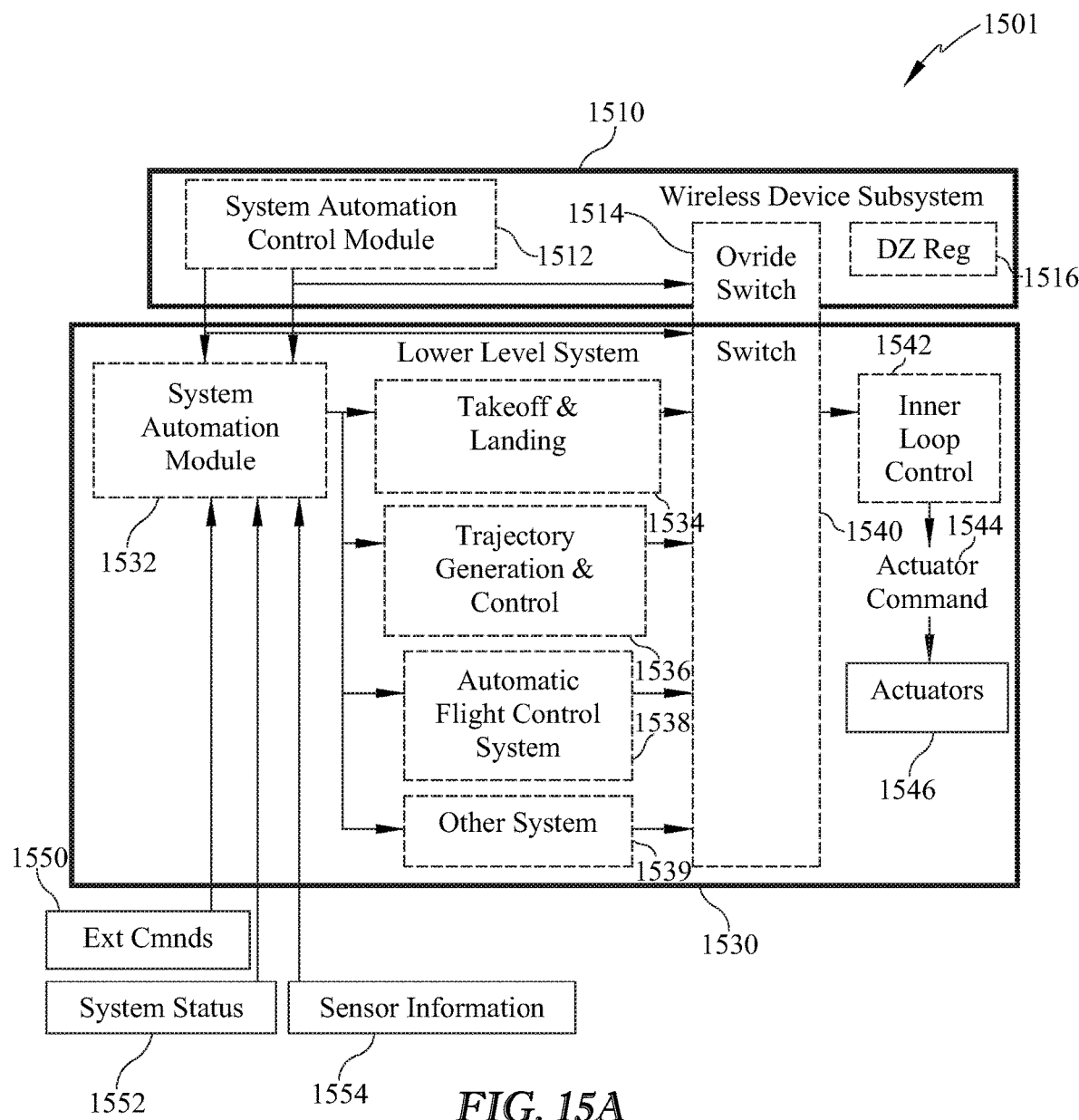

FIG. 15A depicts an illustrative dead zone control architecture for wireless device, such as a drone. In unmanned aerial systems, there are many controllers which are responsible for different parts of a flight mission or for controlling the aircraft on different levels. To perform a given flight mission the flight controllers (e.g. Takeoff & Landing 1534. Trajectory Generation & Control 1536, Automatic Flight Control System 1538, and Other System 1539) may have to be activated and connected in a certain way. To ensure the correct switching a superior system automation logic may be needed. A system automation module 1532 provides control signals to the device controllers responsive to external commands 1550, system status 1552, and sensor information 1554.

A wireless device subsystem 1510 of this disclosure (either wireless device subsystem 1142 in wireless device 1120 or wireless device subsystem 1182 in external utility 1170, or both) applies control signals to system automation module 1532 in order to enable, disable, or modify one or more functionalities of the wireless device in accordance with this disclosure. Control signals may be generated by the wireless device subsystem 1510 responsive to the wireless device approaching a dead zone, entering a dead zone, and so on. The outputs of the controllers are illustratively applied to a switch 1540 for generating an actuator command 1544 which may be under the influence of an inner loop control that controls actuators 15446. Actuators 1546 may be an electro-mechanical, electrical, or software configuration that generates an actuator response in response to the actuator command 1544. An electromechanical actuator may implement motion and/or other function control, e.g. the flaps or gear. These actuators have a direct influence on the aircraft's envelope, which can be based on aerodynamic or structural limits. An electrical actuator may be light sensor that flashes in response to the actuator command 1544. A software actuator may be a switch that turns a function of the wireless device on or off. For instance, the software actuator may turn off wireless network interface 1116. Alternatively, it may turn off camera taking. Other illustrative functions of the wireless device are depicted in FIG. 11B.

Wireless device subsystem 1510 may also include an override switch 1514 to generate a control signal to override control signals that are otherwise generated by switch 1540.

A DMZ register may be used by the system automation control module 1512 to determine whether or not the wireless device is approaching or entering or leaving a dead zone location.

In operation, the system automation control module 1512 monitors the location of the wireless device. As a wireless device approaches a dead zone location, the system automation control module 1512 may generate control signals for modifying the wireless device controllers (e.g. Takeoff & Landing 1534, Trajectory Generation & Control 1536. Automatic Flight Control System 1538. Other System 1539) are activated and connected in a certain way. For example, the system automation control module may generate scripts as shown in FIG. 11B to change the performance of the wireless device controllers. For example, the script may cause operation of the aircraft in the specified envelope, it may adjust certain limits within the flight controllers to steer the wireless device away from the dead zone.

The closer the wireless device is to the dead zone location, the more the control signals generated by the system automation control module 1512 may cause the performance of the actuators to change. In this way, the wireless device may change course to steer clear of a dead zone location or become aware that he is approaching a location where one or more functionalities of his wireless device may be disabled.

When the system automation control module 1512 detects that a wireless device is entering a dead zone, the system automation control module 1512 may disable a functionality of the wireless device, such as a camera. This may prohibit, for example, a drone from taking pictures of people in the privacy of their properties. Some camera functionality may still be permitted such as line of site in order to enable the drone to continue flight unhindered. The disable control signal may be generated by override switch 1514 or by control signals that the system automation control module 1512 applies to the system automation module 1532.

FIG. 15B shows illustrative dead zone control architecture for wireless device of FIG. 15A incorporated in an external utility. The elements shown are generally as described in FIG. 11A adapted for use with wireless device of FIG. 15A according to the teachings of this disclosure. FIG. 15D shows illustrative dead zone service in a separate external utility. Alternatively, a single external utility may integrate the functions illustrated in FIGS. 15B and 153D or the functionalities may be distributed across a plurality of external utilities. FIG. 15C illustrates a memory map that may be stored in DZ register depicted in FIG. 15B. The memory map may include indicia such as firearm, device registration, registration date, permitted users, user recognition, location of use, dead zone areas, and functionalities to be disabled, other. These functionalities may be the actuators 1156 in FIG. 11A and depicted in FIG. 11B.

The specific functionality to be disabled may be set by rules programed into the system automation control module 1512. For instance, the rules may cause system automation control module 1512 to disable all communication functionality or just voice calling.

The modification of the behavior of the wireless device may in accordance to rules such as depicted in FIG. 11C.

Figure 16A:
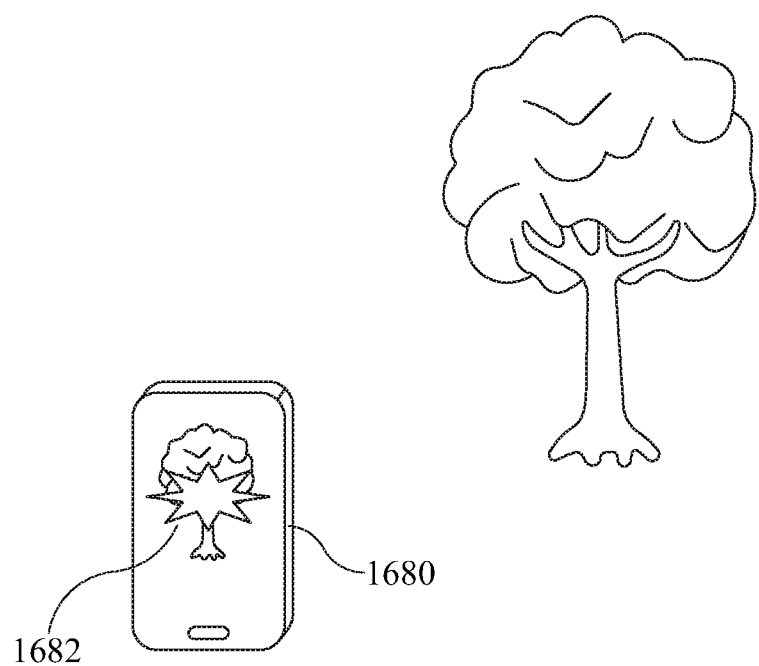

FIG. 16A depicts a wireless device 1680 that is executing an augmented reality (AR) application 1682. Generally, augmented reality provides a live view of a physical, real-world environment whose elements are "augmented" by computer-generated information, such as visual, audial, and/or haptic information. The computer-generated information can be added to the live view or may mask portions of the live view. Additionally, the computer-generated information is typically spatially aligned with the real-world environment such that it is perceived as a part of the real-world environment.

The AR application 1682 may use input from a camera (not shown), microphone (not shown) or other input devices or sensors (not shown), to produce computer-augmented perceptual output, based on the data collected by such input devices or sensors. For example, video input taken by a camera can be displayed on a screen 1684 of the wireless device 1680 with additional computer-generated images added to the video in real time, to provide a "real world" image from the camera, augmented with the computer-generated images. Input from other sensors (not shown), such as magnetic field sensors, orientation sensors, and accelerometers can also be used to provide information on, e.g., the direction that a user is facing or moving, to help to generate an augmented reality scene.

Other forms of input, such as audio, may also be augmented through enhancement or addition of computer-generated content. Additionally, although the wireless device 1680 shown in FIG. 16A is depicted as being a mobile "smart phone", other wireless devices, such as eyeglasses, headsets, headphones, haptic devices, or other output devices or combinations of such devices may be used in augmented reality applications.

While augmented reality shows great promise in a wide range of applications, including education, medicine, architecture, design, art, entertainment, and other fields, there are occasions where use of certain forms of augmented reality may be inappropriate. For example, a recently popular entertainment AR application called POKÉMON GO, published by Niantic, Inc. of San Francisco, Calif., encourages players to search real-world locations for AR characters that are displayed on a smart phone as being in the player's real-world location. These characters may then be battled, captured, trained, etc., in real-world locations, using AR to depict the characters in the player's real-world location. While the game has been very popular, and encourages physical activity (since players are encouraged to travel, generally by foot, to locations where certain of the AR characters can be found), there are real-world locations where playing the game would be inappropriate. For example, the game could be disruptive in places like classrooms, museums, theaters, or restaurants. The game could be disrespectful if AR creatures were depicted in places like cemeteries, places of worship, or places of great cultural significance. While some (e.g., educational) AR applications may be appropriate in some of these settings, others (e.g., entertainment AR applications) would be inappropriate, disruptive, and/or disrespectful. There may be settings (e.g., memorials) where no AR application should be used.

Figure 16B:
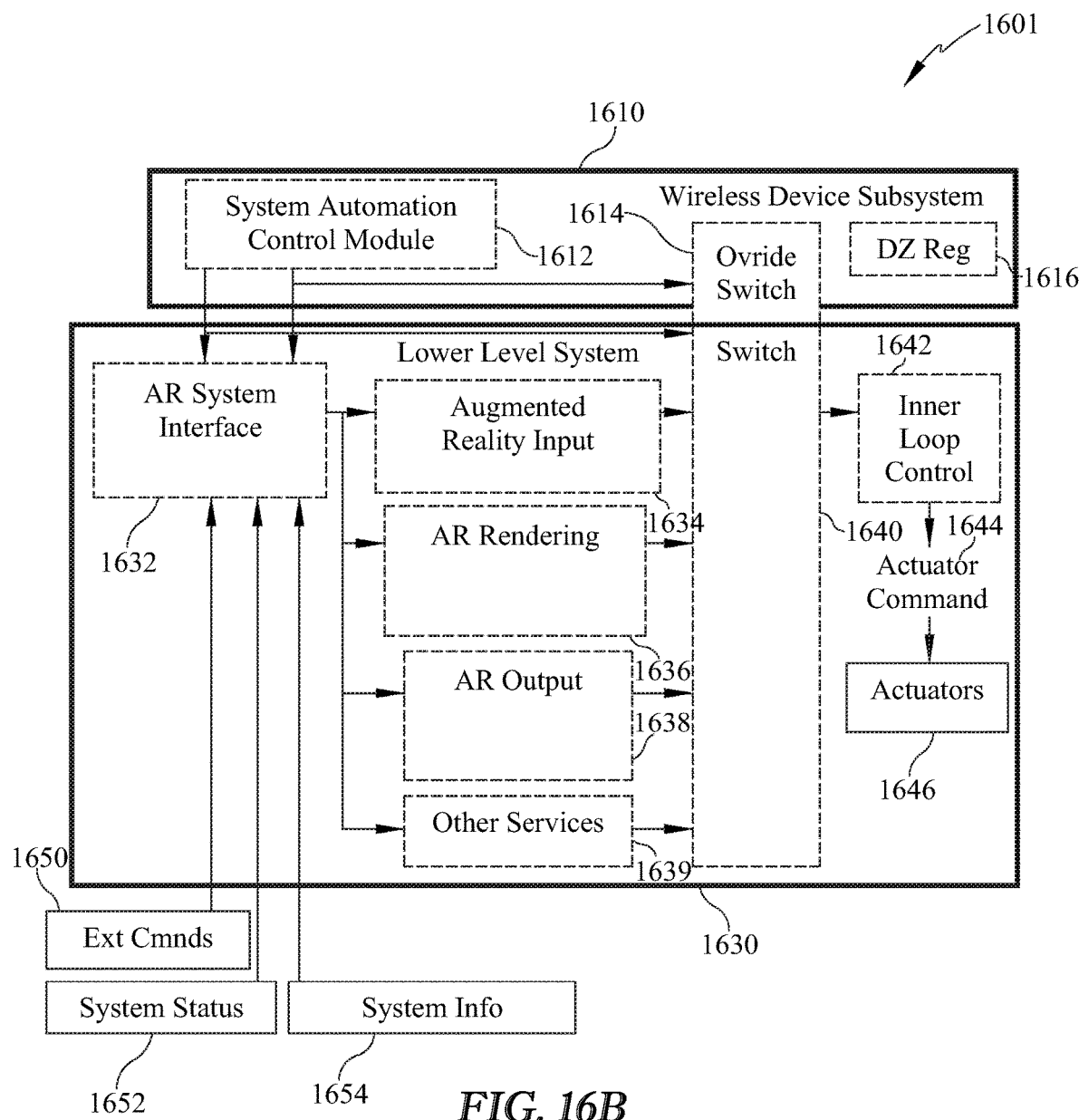

FIG. 16B depicts an illustrative dead zone control architecture for a wireless device that can use dead zone control to enable, disable, or modify access to AR functions. Because there may be a variety of AR-related functions that can be activated, deactivated, or modified, and it may be desirable to control these functions based on both the location and type of AR application (e.g., educational AR applications may be appropriate in schools, while entertainment AR applications might not be), complex system automation logic may be used. AR services, including AR input services 1634. AR rendering services 1636, AR output services 1638, and other services 1639 may be provided as a set of components for use by AR applications. For example, the AR input services 1634 may control cameras and motion sensors, as well as providing complex scene and lighting understanding to provide visual scene input for use by an AR application. The AR rendering services 1636 may provide the ability to combine computer-generated visual content with visual content derived from the camera and other sensors, and the AR output services 1638 may provide access to devices such as a screen, headset, eyeglasses, etc. to output visual AR content. Further, similar services may be available for other sensory modalities (e.g., auditory, haptic, olfactory). An AR system interface 1632 provides control signals to the AR services responsive to external commands 1650 (e.g., from AR applications), system status 1652, and system information 1654. The specific ways in which the AR system interface 1632 does this are known in art and a matter of design choice.

A wireless device subsystem 1610 of this disclosure (either wireless device subsystem 1142 in wireless device 1120 or wireless device subsystem 1182 in external utility 1170, or both, as shown in FIG. 11A) applies control signals to AR system interface 1632 in order to enable, disable, or modify one or more functionalities of the wireless device in accordance with this disclosure. Control signals may be generated by the wireless device subsystem 1610 responsive to the wireless device approaching a dead zone, entering a dead zone, and so on. The outputs of the controllers are illustratively applied to a switch 1640 for generating an actuator command 1644 which may, in some embodiments, be under the influence of an inner loop control 1642 that controls actuators 1646. Actuators 1646 may be an electromechanical, electrical, or software configuration that generates a response to the actuator command 1644. An electromechanical actuator may be the mechanism that, for example, causes a camera lens to zoom and out and to focus and take a picture. An electrical actuator may be light sensor that flashes in response to the actuator command 1644. A software actuator may be a switch that turns a function of a wireless device on or off, or that modifies a function of a wireless device. For instance, in the context of an AR system, a software actuator may send commands that cause the AR rendering services 1636 to reject requests to render AR objects in a real-world scene, cause the AR input services 1634 to reject requests to access a video stream, or cause the AR output services 1638 to output only to eyeglasses or headsets, and not to mobile phone screens. Additionally, in some embodiments, the actuators 1646 may be able to disable, enable, or modify communications functions, such as voice communications, email, text, or sms messaging, or other functions of the wireless device. Other illustrative functions of the wireless device are depicted in FIG. 11B.

Wireless device subsystem 1610 may also include an override switch 1614 to generate a control signal to override control signals that are otherwise generated by switch 1640.

A DMZ register may be used by the system automation control module 1612 to determine whether or not the wireless device is approaching or entering or leaving a dead zone location.

In operation, the system automation control module 1612 monitors the location of the wireless device. As a wireless device approaches a dead zone location, the system automation control module 1612 may generate control signals for modifying the AR services (e.g. AR input services 1634. AR rendering services 1636. AR output services 1638, other services 1639) are activated and connected in a certain way. For example, the system automation control module may generate scripts, similar to those shown in FIG. 11B, to change the performance of the AR services. For example, the script may cause rendered AR objects in a scene to become increasingly transparent, cause a video stream from a device camera to be output with decreasing focus or detail, cause certain types of AR applications (e.g., entertainment applications) to have decreased access to AR services, etc. In some embodiments, the closer the wireless device is to the dead zone location, the more the control signals generated by the system automation control module 1612 may cause the performance of the actuators to change. In this way, the operator of the wireless device may become aware that he is approaching a location where one or more functionalities of his wireless device may be disabled, and may decide to avoid the dead zone location.

When the system automation control module 1612 detects that a wireless device is entering a dead zone, the system automation control module 1612 may disable or modify an AR-related functionality of the wireless device. The disable control signal may be generated by override switch 1614 or by control signals that the system automation control module 1612 applies to the AR system interface 1632.

FIG. 16C shows the illustrative dead zone control architecture 1601 for the wireless device of FIG. 16B, incorporated into an external utility 1661. The elements shown are generally as described in FIG. 11A adapted for use with wireless device of FIG. 16A according to the teachings of this disclosure. Similarly, FIG. 16E shows an illustrative dead zone service 1665, which provides dead zone services related to augmented reality in a separate external utility 1663. The dead zone service 1665 may be similar to the dead zone service discussed above as DZ service 1190, with reference to FIG. 11A. Alternatively, a single external utility may integrate the functions illustrated in FIGS. 16C and 16E or the functionalities may be distributed across a plurality of external utilities.

FIG. 16D illustrates a memory map that may be stored in DZ register 1616 depicted in FIG. 16B. The memory map may include indicia such as AR application, application registration, registration date, permitted users, application type, location of use, dead zone areas, and functionalities to be disabled (or enabled or modified), and other. These functionalities may, for example, correspond to the actuators 1646 in FIG. 16B.

The specific functionality to be disabled, enabled, or modified may be set by rules programed into the system automation control module 1612. For instance, the rules may cause system automation control module 1612 to disable AR rendering, to modify scene understanding in AR input services, or to modify other AR-related services. Additionally, the rules may cause the system automation control module 1612 to disable, enable, or modify communication functionality and/or voice calling.

The modification of the behavior of the wireless device may in accordance to rules such as those depicted in FIG. 11C.

In accordance with some embodiments of the invention, augmented reality may be combined with other functions or embodiments that are described above. For example, augmented reality functions may be used with drone embodiments to automatically cover over, defocus, or pixelate views through residential windows, or views of sensitive private or government property, even when a drone is not actually flying over such property. Such residential or sensitive properties may, for example, be defined in the DZ registers of the various embodiments that are discussed herein. Similarly, augmented reality can be used in conjunction with firearm-related embodiments to highlight permitted targets, or to indicate as forbidden or to obscure forbidden targets.

Figure 17A:
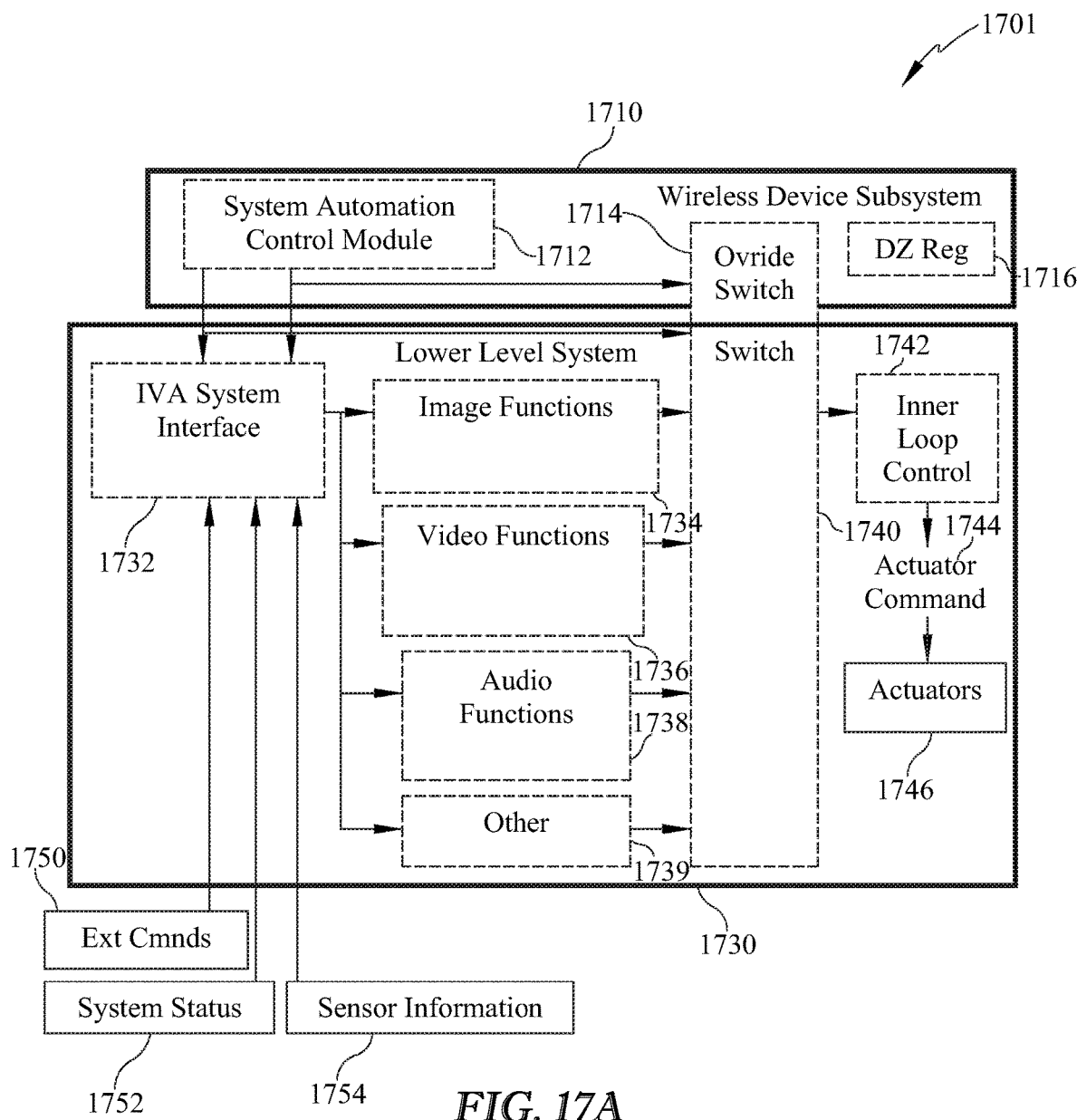

FIG. 17A depicts an illustrative dead zone control architecture 1701 for a wireless device that can use dead zone control to enable, disable, or modify access to a variety of image, video, and/or audio (IVA) functions. Modernly, most mobile phones, for example, have sophisticated audio and video recording capabilities, as well as high-resolution cameras, many of which can take good images, even in low light. Controlling access to these functions may, for example, permit audio and video recording to be disabled within a concert venue, while allowing still photos to be taken. As another example, still images and video could be disabled in private areas, such as dressing rooms, locker rooms, or restrooms. As yet another example, flash capabilities of a camera on a mobile device may be disabled within museums, places of worship, or other locations where flash photography may be inappropriate. There may be a variety of locations or conditions in which some or all IVA functions of a mobile device should be disabled or modified.

IVA functions, including image functions 1734, video functions 1736, audio functions 1738, and other functions 1739 may be available on mobile devices, and may be used by a variety of applications that are available on mobile devices. For example, the image functions 1734 may provide access to still-camera input (and, in some embodiments, output) functions, such as taking pictures, adjusting zoom, lighting and exposure control, flash control, and so on. The video functions 1736 may control recording and playback of video, and the audio functions 1738 may control recording and playback of audio. An IVA system interface 1732 provides control signals to the IVA functions responsive to external commands 1750, system status 1752, and sensor information 1754. The specific ways in which the IVA system interface 1732 does this are known in art and a matter of design choice.

A wireless device subsystem 1710 of this disclosure (either wireless device subsystem 1142 in wireless device 1120 or wireless device subsystem 1182 in external utility 1170, or both, as shown in FIG. 11A) applies control signals to IVA system interface 1732 in order to enable, disable, or modify one or more functionalities of the wireless device in accordance with this disclosure. Control signals may be generated by the wireless device subsystem 1710 responsive to the wireless device approaching a dead zone, entering a dead zone, and so on. The outputs of the controllers are illustratively applied to a switch 1740 for generating an actuator command 1744 which may, in some embodiments, be under the influence of an inner loop control 1742 that controls actuators 1746. Actuators 1746 may be an electro-mechanical, electrical, or software configuration that generates a response to the actuator command 1744. An electro-mechanical actuator may be the mechanism that, for example, causes a camera lens to zoom and out and to focus and take a picture. An electrical actuator may be light sensor that flashes in response to the actuator command 1744. A software actuator may be a switch that turns a function of a wireless device on or off, or that modifies a function of a wireless device. For instance, in the context of an IVA system, a software actuator may send commands that cause the video functions 1736 to reject requests to record or display video, cause the image functions 1734 to defocus the camera lens, or cause the audio functions 1738 record only snippets of audio that are 5 seconds or shorter. Additionally, in some embodiments, the actuators 1746 may be able to disable, enable, or modify communications functions, such as voice communications, email, text, or sms messaging, or other functions of the wireless device. Other illustrative functions of the wireless device are depicted in FIG. 11B.

Wireless device subsystem 1710 may also include an override switch 1714 to generate a control signal to override control signals that are otherwise generated by switch 1740.

A DMZ register may be used by the system automation control module 1712 to determine whether or not the wireless device is approaching or entering or leaving a dead zone location.

In operation, the system automation control module 1712 monitors the location of the wireless device. As a wireless device approaches a dead zone location, the system automation control module 1712 may generate control signals for modifying the IVA functions (e.g. image functions 1734, video functions 1736, audio functions 1738, other functions 1739) so that the IVA functions are activated and connected in a certain way. For example, the system automation control module 1712 may generate scripts, similar to those shown in FIG. 11B, to change the performance of the IVA functions. For example, the script may cause video recorded by a device to become increasingly defocused, cause audio recorded and/or played by a device to decrease in volume, or cause certain types of IVA applications (e.g., entertainment applications) to have decreased access to IVA functions, etc. In some embodiments, the closer the wireless device is to the dead zone location, the more the control signals generated by the system automation control module 1712 may cause the performance of the actuators to change. In this way, the operator of the wireless device may become aware that he is approaching a location where one or more functionalities of his wireless device may be disabled, and may decide to avoid the dead zone location.

When the system automation control module 1712 detects that a wireless device is entering a dead zone, the system automation control module 1712 may disable or modify an IVA-related functionality of the wireless device. The disable control signal may be generated by override switch 1714 or by control signals that the system automation control module 1712 applies to the IVA system interface 1632.

FIG. 17B shows the illustrative dead zone control architecture 1701 for the wireless device of FIG. 17A, incorporated into an external utility 1761. The elements shown are generally as described in FIG. 11A adapted for use with wireless device of FIG. 13A according to the teachings of this disclosure. Similarly, FIG. 17D shows an illustrative dead zone service which provides dead zone services related to IVA functions in a separate external utility. The dead zone service may be similar to the dead zone service discussed above as DZ service 1190, with reference to FIG. 11A. Alternatively, a single external utility may integrate the functions illustrated in FIGS. 17B and 17D or the functionalities may be distributed across a plurality of external utilities.

FIG. 17C illustrates a memory map that may be stored in DZ register 1716 depicted in FIG. 17A. The memory map may include indicia such as IVA application, application registration, registration date, permitted users, application type, location of use, dead zone areas, and functionalities to be disabled (or enabled or modified), and other. These functionalities may, for example, correspond to the actuators 1746 in FIG. 17A.

The specific functionality to be disabled, enabled, or modified may be set by rules programed into the system automation control module 1712. For instance, the rules may cause system automation control module 1712 to disable video or audio recording, to limit audio playback volume, or to modify other IVA-related functions. Additionally, the rules may cause the system automation control module 1712 to disable, enable, or modify communication functionality and/or voice calling.

The modification of the behavior of the wireless device may be in accordance to rules such as those depicted in FIG. 11C.

Figure 18:
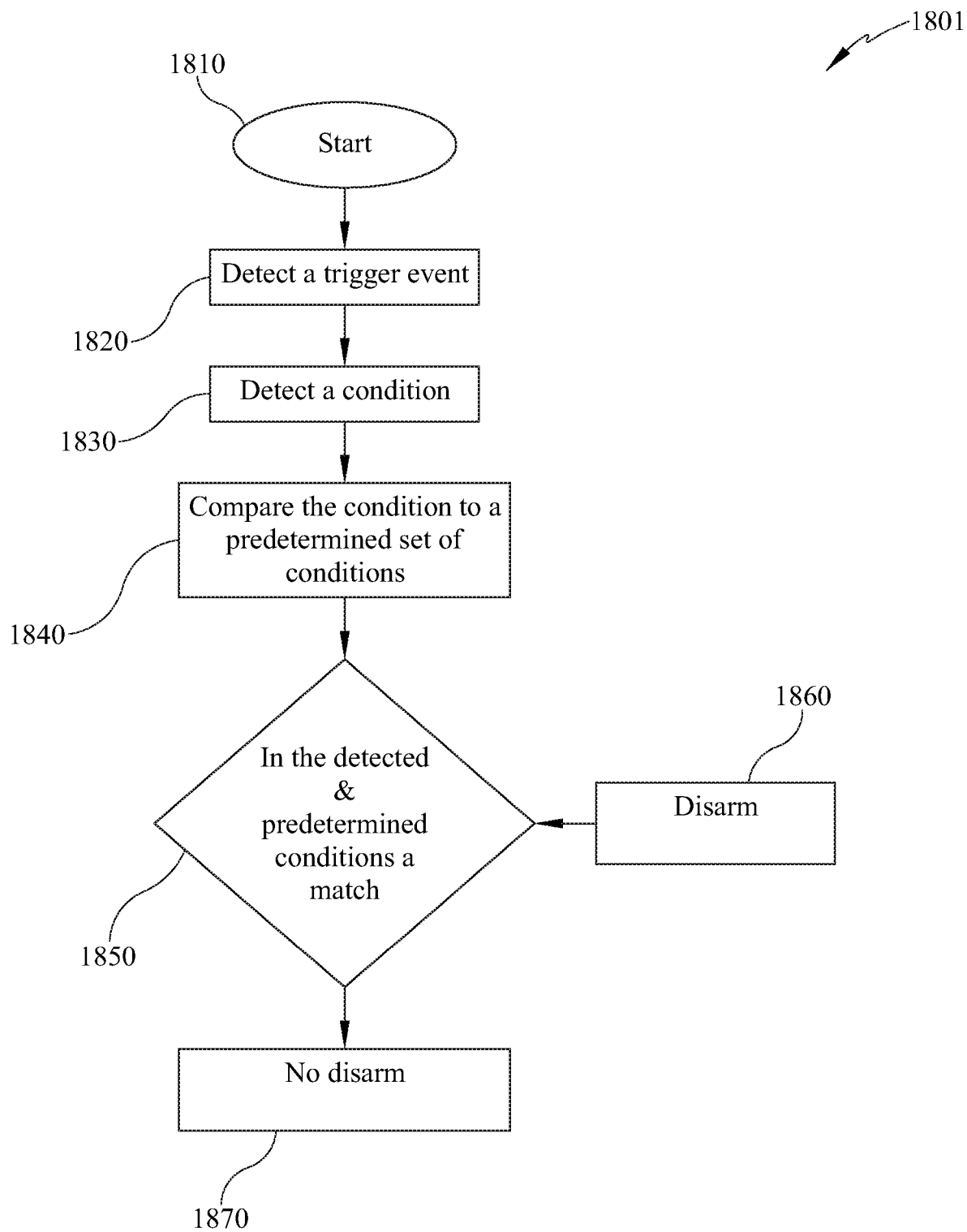
FIG. 18 shows a method of this disclosure.

FIG. 18 shows an illustrative method of this disclosure. The method advances from start 1810 to detecting a trigger event 1820. For example, a location. If a trigger event is detected, the method detects a condition 1830. For example, a dead zone location. In step 1840, the method compares the detected condition to a predetermined set of conditions. For example, the detected location would be compared to a predetermined set of dead zone locations. At step 1850, the method determines whether the comparison yields a match. If comparison yields a match, a wireless function is disarmed 1860. If the comparison yields no match, the firearm is armed for firing.

An illustrative computer readable medium according to this disclosure contains program instructions for causing a computer to perform the method of detecting a trigger event; detecting a condition; comparing the condition to a predetermined condition; disabling a function of the wireless device if the condition matches the predetermined condition. The predetermined condition may be a shape (e.g., in the shape of a human), a location (e.g., in a dead zone), the identity of the operator, whether or not the wireless device has been tampered with (e.g., electronic control system or sensors have been tampered with), and so on.

Figure 19:
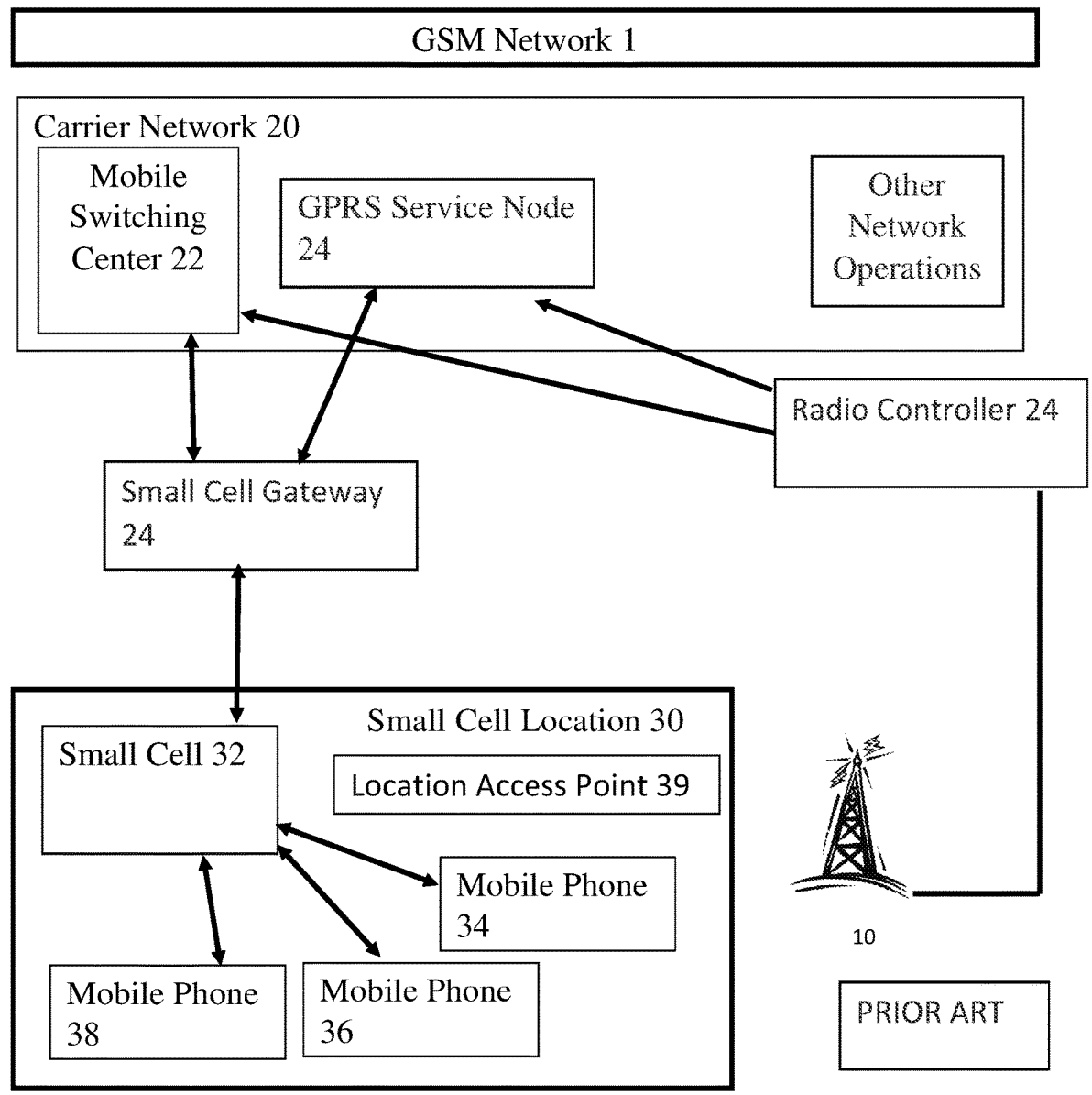
FIG. 19 is a representative prior art small cell system.

FIG. 19 shows a prior art small cell network.

Small cells are short range mobile phone base stations used to complement mobile phone service from larger macro cell towers. In one aspect, small cells may be compact residential femtocells, the size of a paperback book and connected using standard domestic internet broadband. In another aspect, small cells may be larger equipment used inside commercial offices or outdoor public spaces. Small cells offer excellent mobile phone coverage and data speeds at home, in the office and public areas for both voice and data. Small cells have been developed for both 3G and the newer radio technologies such as 4G/LTE, and 5G. Small cells are small cellular base stations designed specifically to add additional capacity over small coverage areas.

Small cells provide a small radio footprint. Small cells are available for a wide range of air interfaces including GSM, CDMA2000, TD-SCDMA, W-CDMA, LTE and WiMax. In 3GPP terminology, for example, a Home Node B (HNB) is a 3G femtocell. A Home eNode B (HeNB) is an LTE femtocell. Small cells play an important role in the evolution of cellular standards, such as 4G and 5G, since small cells provide an effective way to increase capacity and coverage. This allows these standards to support the growing number of devices requiring communication access, and particularly internet access.

Wi-Fi is a small cell too. Wi-Fi is standard equipment on most mobile devices. A Wi-Fi hotspot for Internet access is built into the wireless router commonly used at home or in a small office (see wireless router and Wi-Fi extender). Wi-Fi hotspots may also be available free or for a charge in public areas such as coffee shops, lounges, airports, on the street, and other venues. However, Wi-Fi does not operate in licensed spectrum. As a result, it may not be managed as effectively as small cells utilizing licensed spectrum.

For this and other reasons, small cells provide carriers with an effective radio footprint for controlling network traffic.

Small cell deployments vary according to the use case and radio technology employed. Generally, there are three types of small cells. They are femtocells, picocells and microcells. While the usage of these small cells may overlap, there are some generally understood differences between them.

Femtocells are small cells that have the shortest range of small-cell types. They are usually installed in homes or small businesses. These small cells are router-like devices installed on the premise. The small cell generally accommodates coverage for few users at a time. Femtocells may also generally have a maximum range of less than about 10 meters.

Picocells are small cells that are typically installed in larger indoor areas like shopping malls, offices or train stations. These small cells generally accommodates coverage for up to about 100 users at a time. Picocells may also generally have a range of under 200 meters.

Microcells or metrocells are the largest and most powerful small cell. They are usually installed outdoors on traffic lights or signs. They may also be used for large events. Microcells may also generally have a range of under about two kilometers.

The term small cell may be used to cover these and other wider applications.

These small cells provide the foregoing described small radio footprints. This is in contrast to macrocell towers which may have a range of up to about 20 miles.

The network operators install the macrocell towers. They also may typically install microcells and picocells are usually installed by network operators.

While typically, femtocell, picocell, and metrocell/microcell describe different product solutions, the term small cell may be used to cover these and other product solutions. For example, a femtocell is typically used to describe residential products. A picocell is typically used to describe enterprise/business premise products. The term small cell may be used to cover all aspects as the underlying femtocell technology has expanded to cover these and other wider applications.

In some applications of a mobile terminal use, there may be a need for the internet connection of the mobile terminal to be controlled. For example, one problem brick and mortar stores face is losing a customer who has entered the store to do some shopping on account of better pricing available to the customer over the internet. For instance, many customers may come to the brick and mortar store to learn enough about the products to decide which, of the many products that meet the customer need, the customer should buy. Once decided, or to help the customer make the decision, thanks to the internet, while using the brick and mortar store experience to help decide which product to buy, customers may connect to and surf the internet for comparative pricing or product offering on like products on the fly and while taking in the whole brick and mortar experience. In so doing, the customers bring the internet showrooms of virtual online stores into the brick and mortar store that is educating the customer on which product to buy. In trying to make the sale, the brick and mortar store finds itself competing with online stores. Since the online stores are without the show room, sales team, and other overhead value, the brick and mortar store may lose the sale of the product to an online store offering the same product at a reduced price even though the sale might not have been made at all had the customer not experienced the product at the brick and mortar store.

It could help the shopping experience of the customer at the brick and mortar store and lead to more sales if the brick and mortar store could control the entire shopping experience of the customer while the customer is on the brick and mortar premise. A brick and mortar experience without interruption by online stores or with controlled access to internet content while in the brick and mortar store may help the shopping experience. This has been a challenge since customers may access the internet through a WiFi access point or over a cellular network. The store may be able to restrict access to a WiFi access point it has installed on the premises; but not access to WiFi access points in nearby locations. If the radio coverage or footprint of the nearby WiFi access point overlaps the radio coverage or WiFi access point located at the brick and mortar store, the store may be unable to restrict access of customers at the store to those nearby WiFi access points. In addition, customers may access the internet over a cellular network. So regardless of available WiFi, a customer may still access the internet over the cellular network.

There are other examples where the customer experience at a location may be improved by controlled access of the customer to the internet while at the location. For example, a restaurant may want all voice and data communication from the cellular network and access point prevented in order to enable a more quiet dining experience. Alternatively, the restaurant may want to allow diners limited internet access over the cellular network and the restaurant's WiFi to the content provided by the restaurant through its website or sponsored site. For instance, a diner whether in the restaurant or not may access content on the restaurant through the restaurant or sponsored website. As another example, the restaurant may allow menu and ordering apps on mobile terminals of diners to access a restaurant website for browsing the menu and ordering. In another example, a location may want to allow predetermined apps and not others.

There are also many examples where the customer experience at a location may be improved by network control of functions of the mobile terminal. For example, an art gallery may want to prevent a mobile terminal from taking a photo, audio, video, making a voice call, texting, emailing, or internet browsing within the art gallery. Control of any function of the mobile terminal by an establishment at a location may be a desirable way to improve the experience of a visitor to the location as well as advancing the mission of the establishment such as avoiding flash image capture in an art gallery which may degrade the characteristic of paintings or an image capture with or without flash to avoid violating copyright laws, avoiding calls in a restaurant designed for quiet dining, avoiding browsing of competitor online stores in a brick and mortar store to help drive sales, controlled WiFi and cellular access at airports to avoid interference with signaled control of airplanes as well as interference with communication systems, turning off audio and/or video at concerts or theaters to avoid violating copyright laws, and so on.

Controlled WiFi and cellular access may serve many other purposes including administering, managing customer experiences, as well as store activities and the conduct within the stores by store personnel, customers or others. For instance, a team of shoplifters communicating by cellular network in a store for the purpose of stealing products may be thwarted by restrictions placed by the store on cellular communications while in the store such as a restriction preventing messaging while in the store. As another example, an establishment may minimize legal exposure by employment of more control over the type of communication permitted at the location. For instance, an air carrier may better manage litigation risk by controlled communication access allowed passengers while on the carrier. Controlled communication access may also allow an establishment to protect the privacy of its customers.

This disclosure addresses the foregoing needs by providing a dead zone in a small cell application.

Referring still to FIG. 19, in this illustrative embodiment, the small cell network includes a network 1, illustratively GSM but may be based on any cellular technology. GSM network 1 includes a carrier network 20 and a small cell location 30. The carrier network includes a mobile switching center 22, a GPRS Service Node 24, other network operations 25, a radio controller 26, and a small cell gateway 27.

The small cell location 30 includes a small cell 32, a location access point 39 and mobile phones 34, 36, 38.

The carrier network 20 may be operated by a separate network operator for providing telecommunication services to terminal devices.

Base station 10 is a fixed point of communication for customer cellular phones on a carrier network as previously explained as BTS in for example, FIG. 1. Radio controller 26, or base station controller (BSC) is a network element that controls and monitors a number of base stations and provides the interface between the cell sites and the mobile switching center (MSC). as previously explained as BSC 54 in for example, FIG. 1.

In this embodiment, a GSM network 1 is illustrated. Alternatively, the network may be based on other cellular technologies such as GSM, CDMA and so on. Carrier network 20 includes mobile switching center 22, GPRS Service Node 24 as previously explained.

The small cell (SAP) 32 is a hardware device located at a small cell location 30, e.g., a customer's premises that interfaces with mobile devices over-the air radio interface. The SAP appears to a mobile device as an outdoor macro-cell; however, it emits less power. The SAP interfaces with the core mobile network via a broadband interface such as DSL, fiber, cable, Using a SAP to gain access to the mobile network improves indoor coverage and bandwidth availability for mobile devices. SAP may be either of the small cell types previously explained. According to the cellular technologies used, SAP can be classified into UMTS FAP, GSM FAP, WiMAX FAP, and so on.

The small cell gateway (SCG) 24 is responsible for the radio resource control, the overall load control and the handover control. The SCG interfaces with the SAP over the broadband access network. The SCG performs signaling protocol conversion and in some implementations bearer (voice, video . . . ) channel conversions. The SCG gateway also performs the function of a security gateway by protecting the mobile network operator (MNO) from attack attempts over the public broadband access. The SCG interfaces with the different MNO network segments that have been defined as reference points. There generally is a reference point between the SCG and the MNO's circuit-switch network for transporting real-time applications such as voice and video. There generally is a reference point between the SCG and the MNO's packet-switch network for routing user data such as text messages and e-mail. There generally is also an interface for the SCG to communicate to the core IMS network.

Mobile phones 34, 36, 38 refer to an electronic device used to communicate voice and/or data via a telecommunications system, such as (but not limited to) a small cell network or other cellular network. Other terminology used to refer to terminal devices and non-limiting examples of such devices can include mobile stations, mobile devices, access terminals, subscriber stations, terminal mobile terminals, remote stations, user terminals, terminals, subscriber units, cellular phones, smart phones, personal digital assistants ("PDAs"), laptop computers, netbooks, e-readers, wireless modems, etc.

Location Access Point 39 is an access point connects users to other users within the network and also can serve as the point of interconnection between the WLAN and a fixed wire network as previously explained. An access point may be integrated into the small cell to create a bundled cellular Wi-Fi solution.

In operation, when in range of the small cell, the mobile phone will automatically detect the small cell and use the small cell in preference to the larger macrocell cell sites. Once a mobile phone is connected to a small cell, calls from the mobile phone are made and received in a similar way as previously disclosed in prior priority applications, except that the signals from the cell phone are sent to the small cell which typically encrypts and passes the signals via the public or private broadband IP network to one of the mobile operators main switching centers. Making and receiving calls uses procedures and telephone numbers as disclosed in the priority applications again except that the voice call passes through the small cell. Similarly accessing and receiving the GPRS Service Node for internet communication uses procedures as disclosed in the priority applications again except that the data call passes through the small cell.

Figure 20:
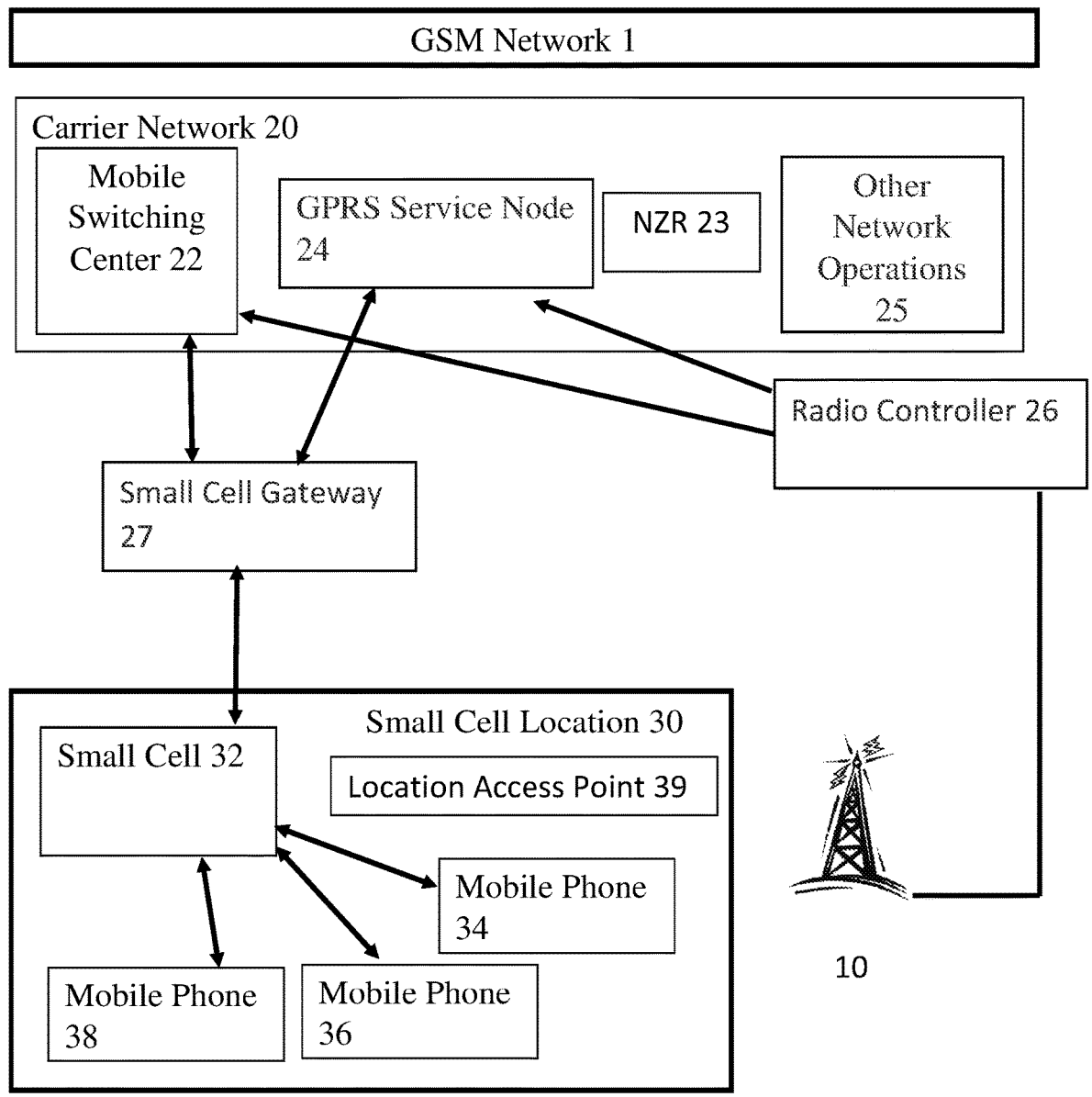
FIG. 20 is an illustrative system embodiment of a small cell system according to this disclosure.

FIG. 20 depicts the small cell network of this disclosure. It may include all of elements described in connection with FIG. 19 and further includes a No Zone Register (NZR) 23 located on the carrier network 20. In one illustrative embodiment above of FIG. 5 above, an illustrative NZR was disclosed as a register that may include a table of geographical locations 210. Geographical locations 210 are physical locations in network 110 in which communication by or to MT 70 over network 110 is to be disabled and/or functions of the MT 70 are to be disabled, enabled or modified. Geographical locations 210 may be a hospital, a movie theater, a performing arts hall, a church, or other places where the use of cell phones may interfere with the public enjoyment, health, welfare, or safety. GPS positions 220 of the geographical locations 210 are provided for identifying the GPS positions of the locations. For a location that may be identified by an area of GPS positions, these GPS positions would be provided as GPS position 220 in the database of NZR 23.

As disclosed throughout this specification, NZR may contain any restriction on that disables a function of the wireless device when it is in the one of the physical locations defined in the NZR. Restrictions may include restrictions on voice communication, text messages, emails, and data communication. Restrictions may include disabling the camera; disabling audio recording; cease rendering augmented reality content; start/resume, stop/end, path generation, path control, automatic path control system and other system override control; and so on; as disclosed throughout this specification.

NZR 23 may include any of the illustrative restrictions on a function of the phone including the illustrative examples disclosed herein, including in the memory maps explained below. In the small cell network of this disclosure, the small cell network.

Figure 21:
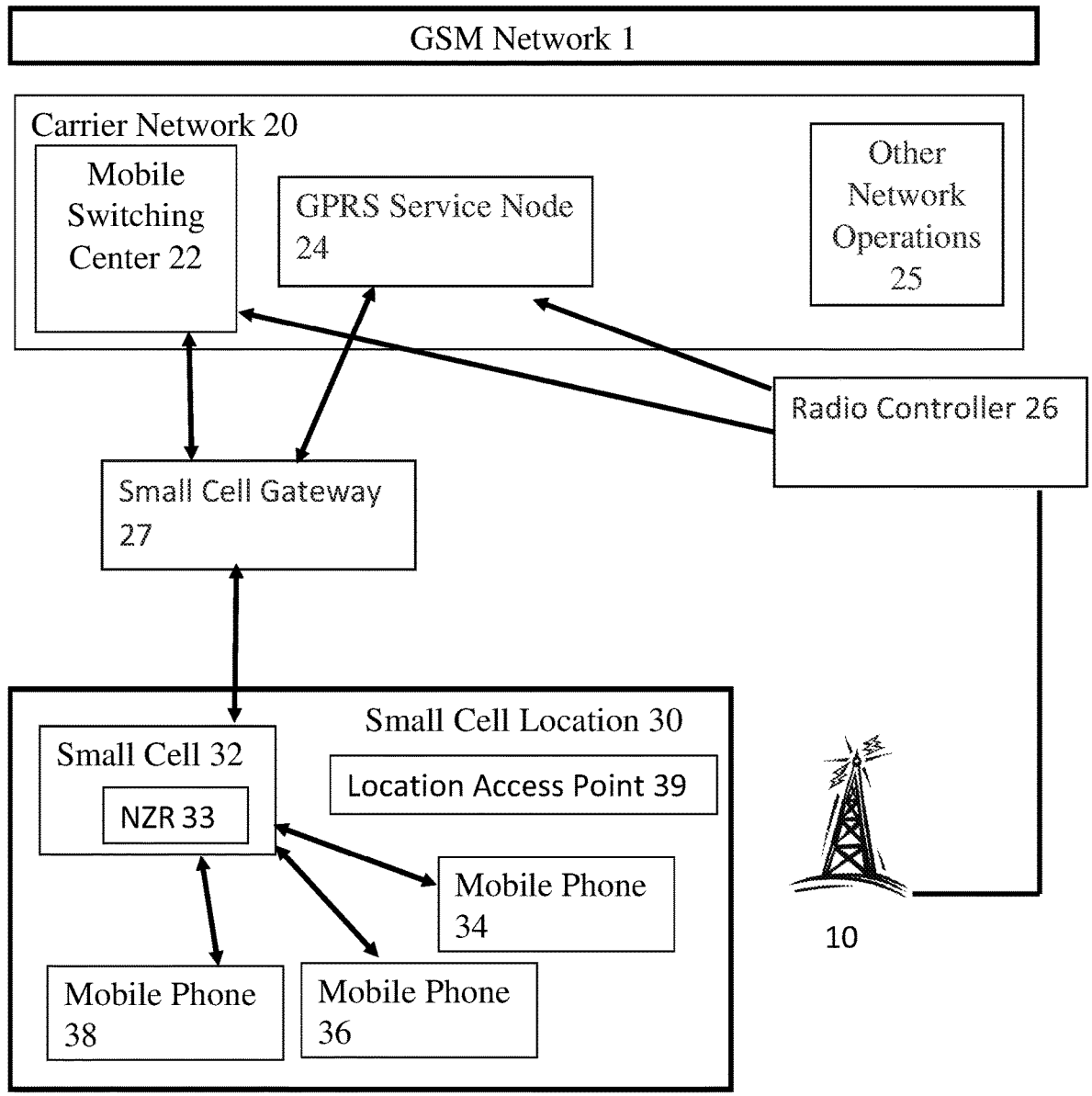
FIG. 21 is an illustrative system alternative embodiment of a small cell system according to this disclosure.

Small cell 32 is configured to permit mobile terminal to establish a communication link with tower 10 through small cell 32 under restricted conditions as disclosed herein. In one illustrative example, small cell 32 limits the digital data throughput to the mobile terminal to digital data associated with small cell location 30. In one illustrative example, data throughput to mobile terminal A is limited by small cell 32 to digital data from the website of the store occupying the premise (e.g., www.store1.com) or from a sponsored or co-sponsored site of store 1. The website of the store (e.g., www.store1.com) or from a sponsored or co-sponsored site of store 1 may be stored according to a memory map as disclosed herein in NZR 23 of network as depicted in FIGS. 20, 21, for example. Alternatively, the memory map may be stored in NZR 33 of small cell 32. In other embodiments a memory map may be stored in either or both NZR of network and small cell, or portions of the memory may be located in the NZR of the network with remaining portions located in the NZR of the small cell.

Figure 22:
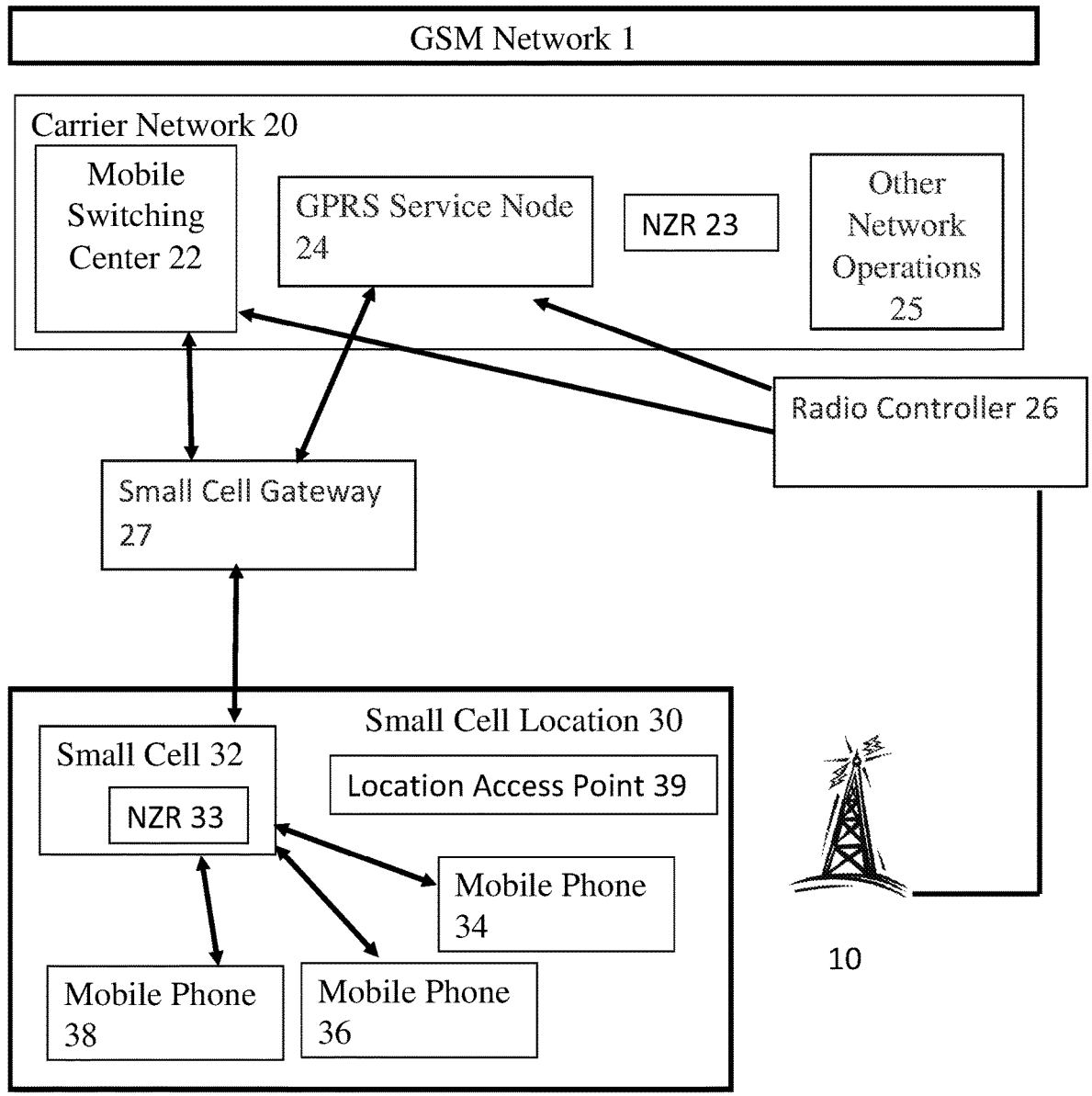
FIG. 22 is an illustrative system alternative embodiment of a small cell system according to this disclosure.

FIG. 21 is an alternative small cell network of this disclosure. It may include all of elements described in connection with FIG. 19 and further includes a No Zone Register (NZR) 33 located in the small cell. FIG. 22 is an alternative small cell network of this disclosure. It may include all of elements described in connection with FIG. 19 and further includes a No Zone Register (NZR) 23 located in the carrier network 20 and a No Zone Register (NZR) 33 in the small cell. The embodiments of FIG. 20, FIGS. 21 and 22 operate with the restrictions imposed on the communication link between the mobile terminal and the network. These restrictions are stored in an NZR located in the small cell or both smart cell and network.

Figure 23A:
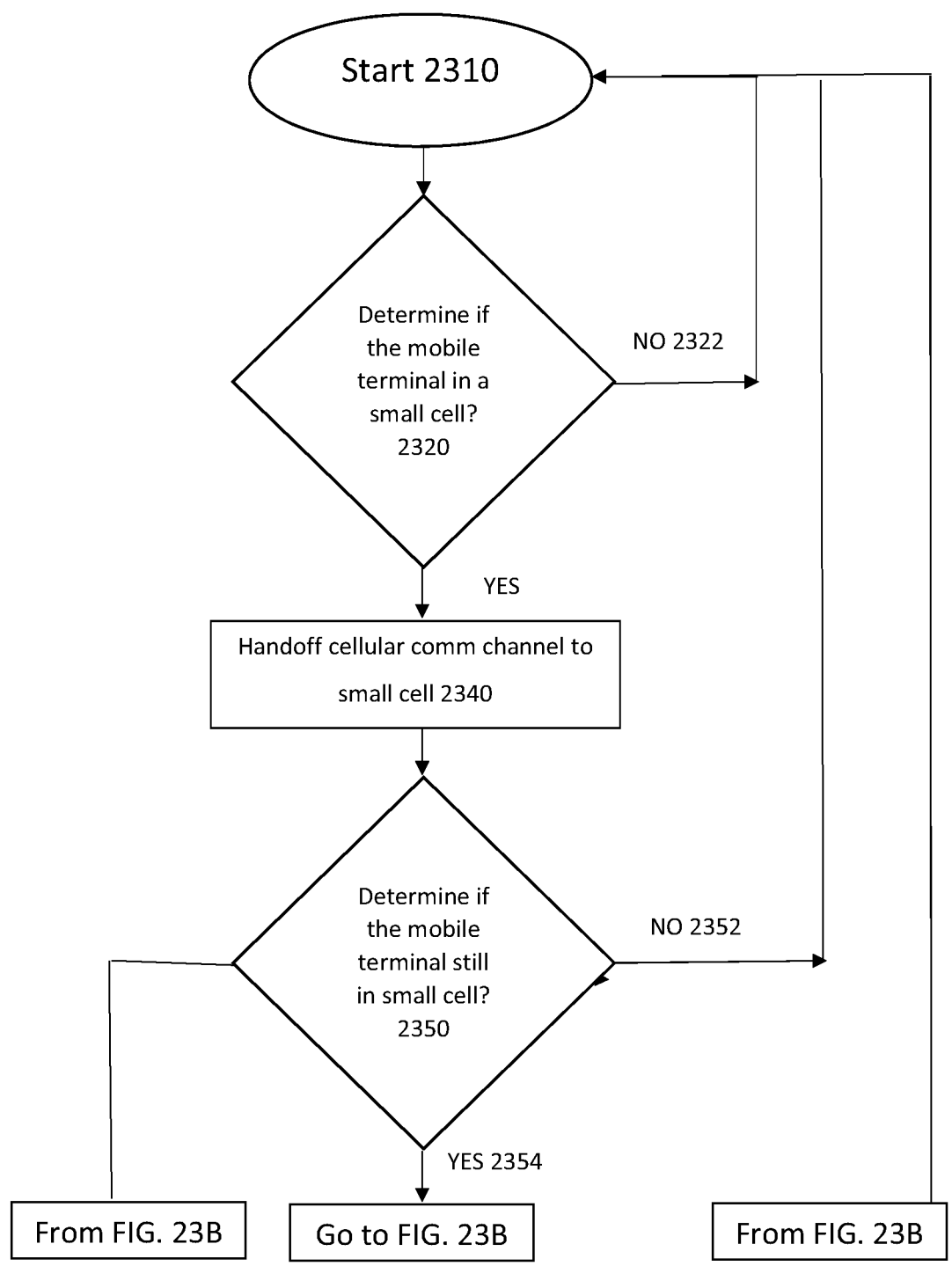
FIGS. 23A, 23B is an illustrative small cell method according to this disclosure.
Figure 23B:
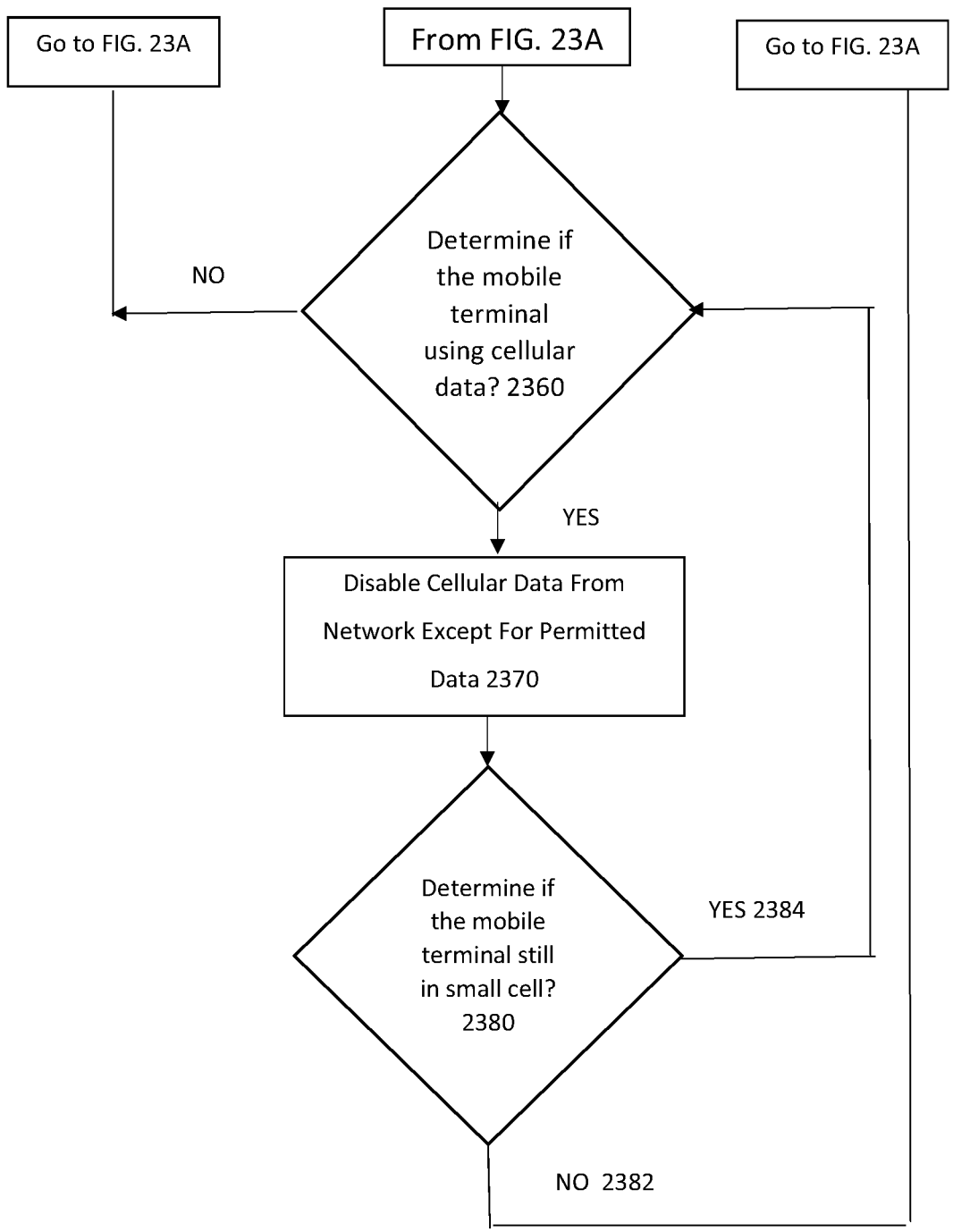

FIG. 23 discloses an embodiment of a method for dead zone in small cell application. The method begins at Start 2310. At step 2320, the NETWORK determines whether mobile terminal is in a small cell. If NO 2322, the method is returned by the NETWORK to Start 2320. If YES, the method is advanced by the NETWORK to step 2340. At step 2340, the NETWORK hands-off the cellular communication channel to small cell. At step 2350, the SMALL CELL determines if the mobile terminal is still in the small cell. If NO 2352, the NETWORK takes over the communication channel and returns the method to Start 2320. If YES 2354, control remains with small cell and the method advances to step 2360.

At step 2360, the SMALL CELL determines if the mobile terminal is using cellular data. If NO, the method is returned by the SMALL CELL to step 2350 where the small cell determines if the mobile terminal is still in the small cell. If YES, the method advances to step 2370 where the cellular data from the network is disabled by the small cell or by the network at the direction of the small cell except for cellular data permitted to be accessed by the mobile terminal at the small cell location. The method advances to step 2380 where the SMALL CELL determines if the mobile terminal is still in the small cell. If NO 2382, the NETWORK takes over the communication channel and returns the method to Start 2320. If YES 2354, control remains with small cell and the method advances to step 2360 where the small cell determines if the mobile terminal is using cellular data.

While the forgoing embodiment of the method involves disabling cellular data from network except for permitted cellular data (e.g., throttling), in other embodiments, the method may disable voice communication or another one or more functions of the mobile terminal by for example control signals by the small cell or by the network at the direction of the small cell. For example, an art gallery may want to prevent the function of a mobile terminal of taking a photo, audio, video, making a voice call, texting, emailing, or internet browsing within the art gallery. The method may control any function of the mobile terminal that an establishment at the small cell location may find desirable to improve the experience of a visitor as well as advancing the mission of the establishment such as avoiding flash image capture in an art gallery which may degrade the characteristic of paintings, avoiding calls in a restaurant designed for quiet dining, avoiding browsing of competitor online stores in a brick and mortar store to help drive sales, controlled WiFi and cellular access at airports to avoid interference with signaled control of airplanes as well as interference with communication systems, and so on.

Figure 24A:
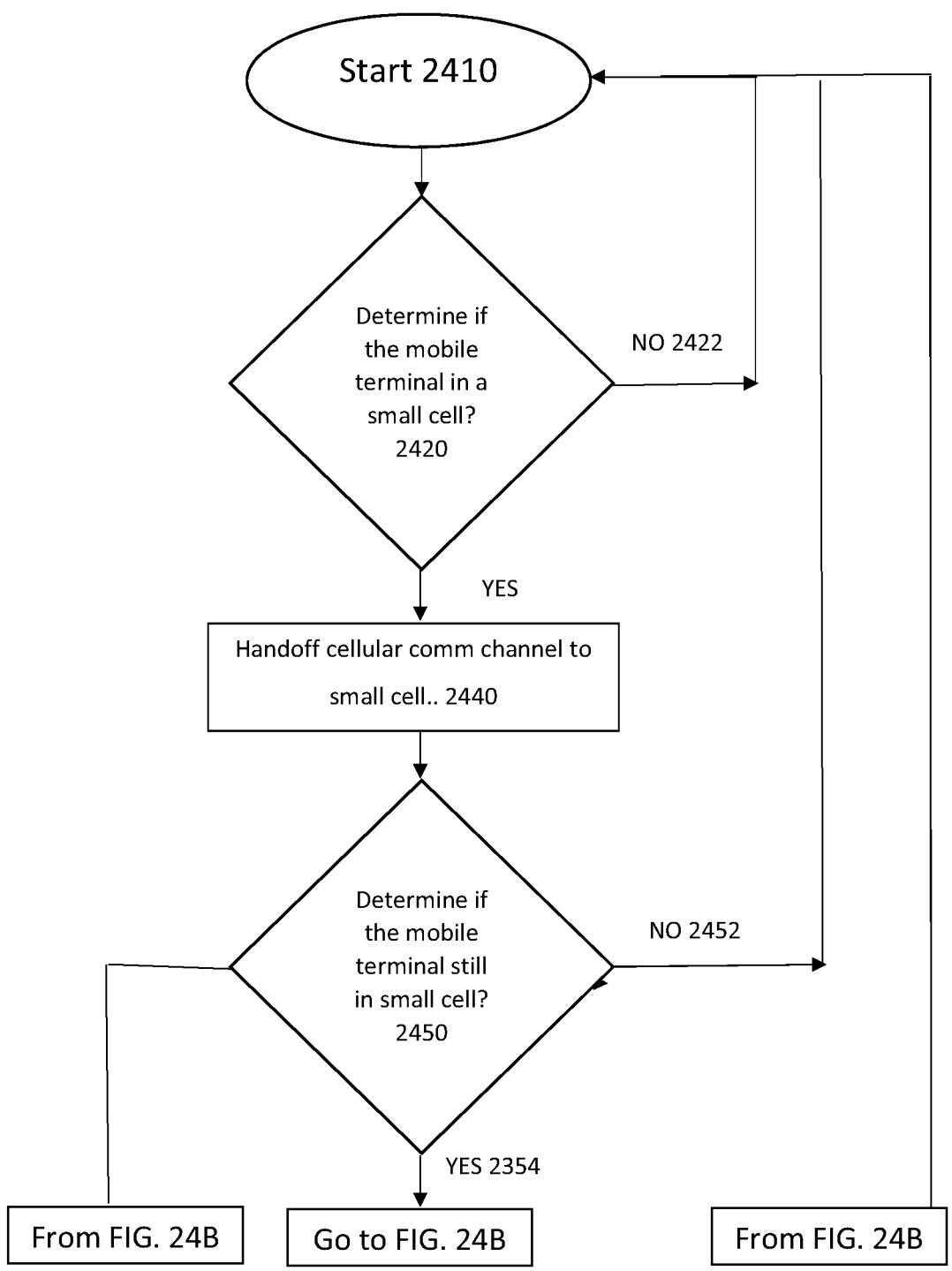
FIGS. 24A, 24B is an illustrative alternative small cell method according to this disclosure.
Figure 24B:
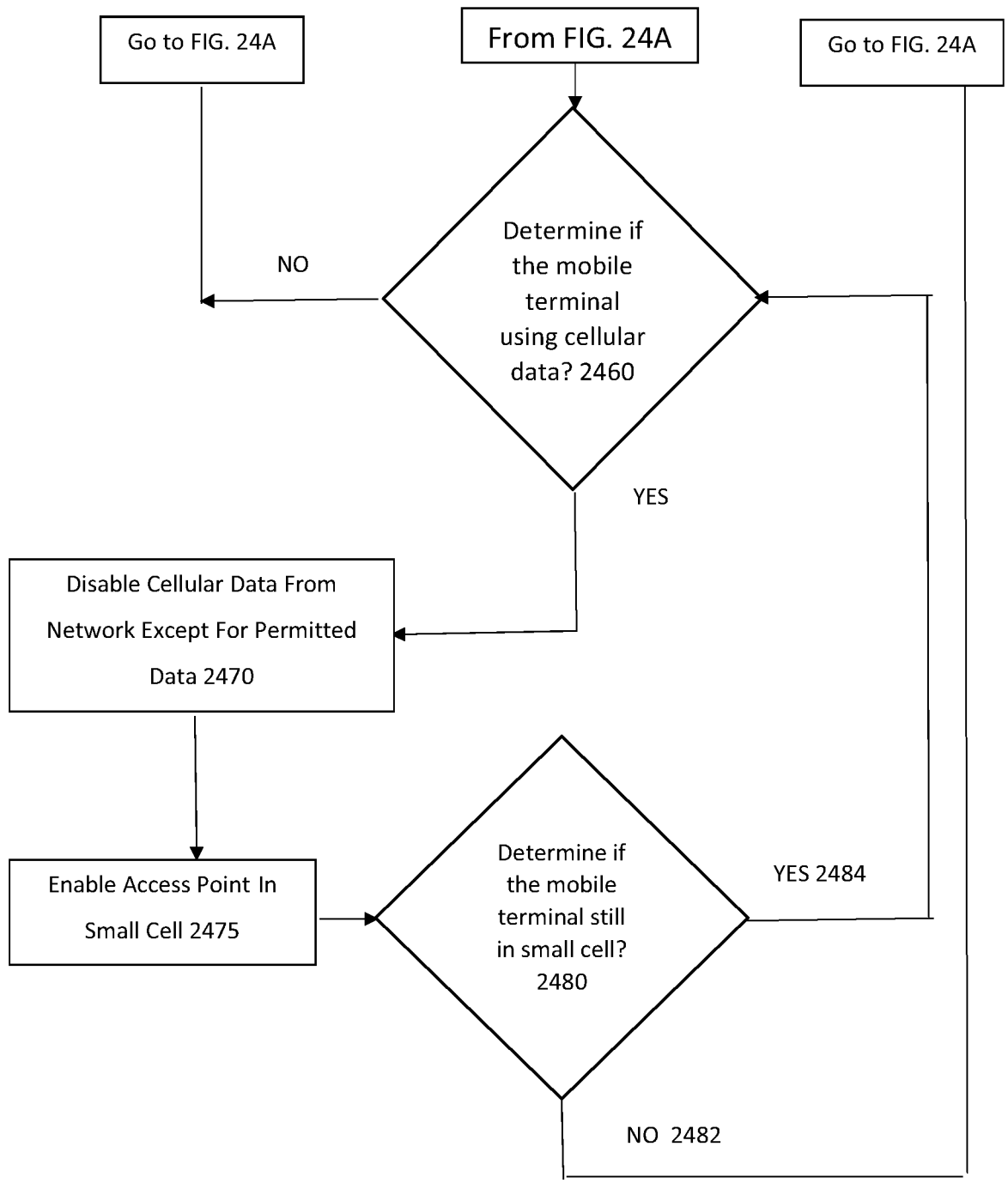

FIG. 24 discloses an embodiment of a method for dead zone in small cell application. The method begins at Start 2410. At step 2420, the NETWORK determines whether mobile terminal is in a small cell. If NO 2422, the method is returned by the NETWORK to Start 2420. If YES, the method is advanced by the NETWORK to step 2440. At step 2440, the NETWORK hands-off the cellular communication channel to small cell. At step 2450, the SMALL CELL determines if the mobile terminal is still in the small cell. If NO 2452, the NETWORK takes over the communication channel and returns the method to Start 2420. If YES 2454, control remains with small cell and the method advances to step 2460.

At step 2460, the SMALL CELL determines if the mobile terminal is using cellular data. If NO, the method is returned by the SMALL CELL to step 2450 where the small cell determines if the mobile terminal is still in the small cell. If YES, the method advances to step 2470 where the cellular data from the network is disabled by the small cell or by the network at the direction of the small cell except for cellular data permitted to be accessed by the mobile terminal at the small cell location. The method advances to step 2475 where the access point of the small cell location is enabled by the small cell or by the network at the direction of the small cell for subscriber access by the mobile terminal at the small cell location according to the permissions applied at the location.

The method advances to step 2480 where the SMALL CELL determines if the mobile terminal is still in the small cell. If NO 2482, the NETWORK takes over the communication channel and returns the method to Start 2420. If YES 2454, control remains with small cell and the method advances to step 2460 where the small cell determines if the mobile terminal is using cellular data.

While the forgoing embodiment of the method involves disabling cellular data from network except for permitted cellular data (e.g., throttling), in other embodiments, the method may disable voice communication or another one or more functions of the mobile terminal by for example control signals by the small cell or by the network at the direction of the small cell. For example, an art gallery may want to prevent the function of a mobile terminal of taking a photo, audio, video, making a voice call, texting, emailing, or internet browsing within the art gallery. The method may control any function of the mobile terminal that an establishment at the small cell location may find desirable to improve the experience of a visitor as well as advancing the mission of the establishment such as avoiding flash image capture in an art gallery which may degrade the characteristic of paintings, avoiding calls in a restaurant designed for quiet dining, avoiding browsing of competitor online stores in a brick and mortar store to help drive sales, controlled WiFi and cellular access at airports to avoid interference with signaled control of airplanes as well as interference with communication systems, and so on.

While the access point of the small cell location is enabled in this location, it may be disabled. Alternatively, the AP may be restricted. For example, for a store 1, the AP may be enabled to www.store1.com, store1 sponsored sites, and/or store1/carrier co-sponsored sites. For a restaurant, the AP may be enabled to restaurant app for menu and ordering. For a common location in a mall, for example, the AP sites may be throttled. For example, a common area in a mall may limit channel access over the internet to websites that do not compete with any of the stores at the mall in order to prevent patrons of the stores from accessing competitive stores for pricing and product comparisons while in the middle of a sales experience at a brick and mortar store.

FIG. 25 depicts illustrative dead zone application to small cell.

Figure 25A:
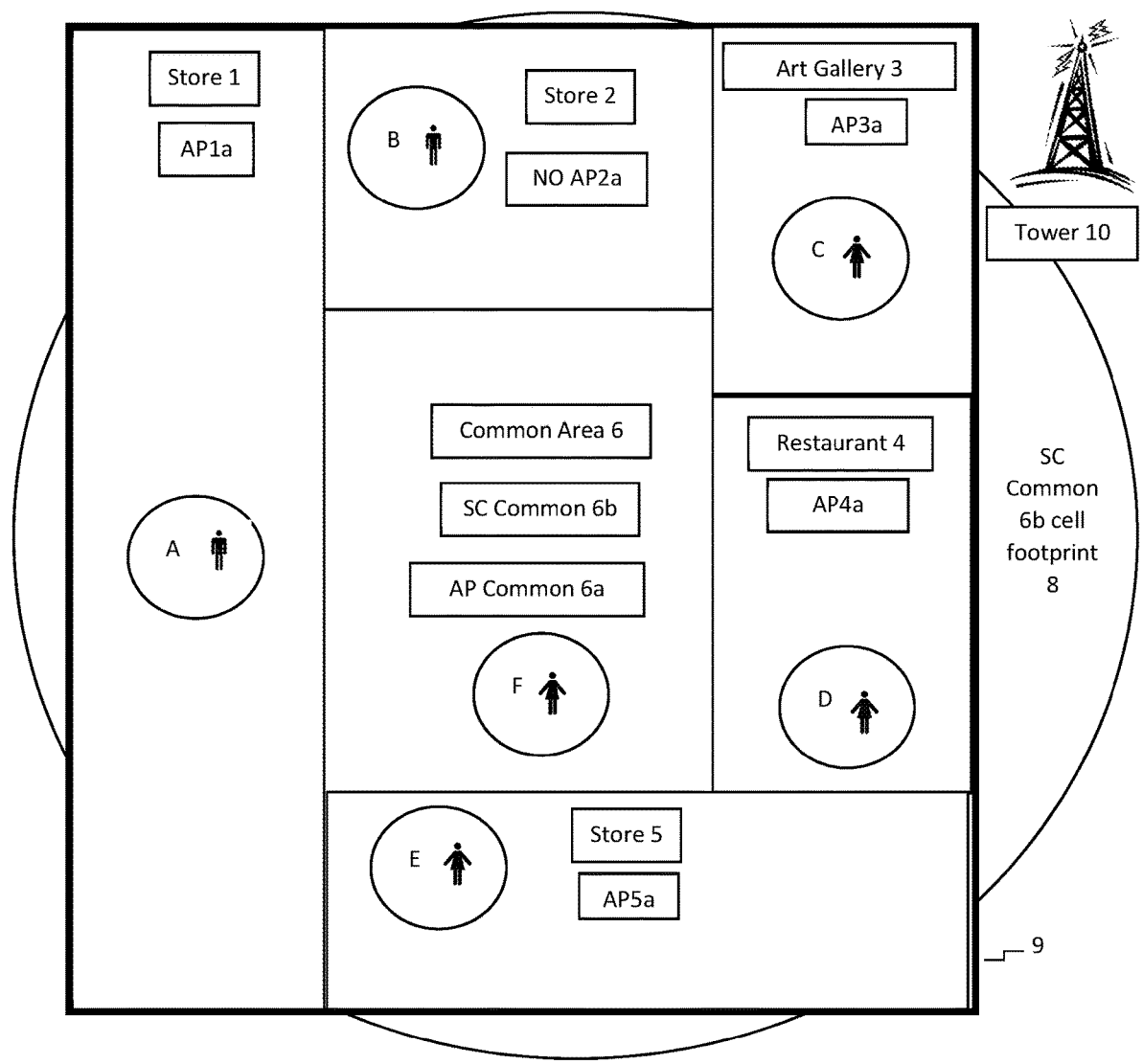

FIG. 25A shows a mall 9 with store1, store 2, art gallery 3, restaurant 4, store 5, and a common area 6.

Store 1 includes an access point ("AP") denoted AP 1a. Store 2 includes no access point (i.e., No AP 2a. Art gallery 3 includes an access point AP 3a. Restaurant 4 includes an access point AP 4a. Store 5 includes access point. Common area 6 includes an access point AP 6a and a small cell SC Com 6b which forms a cellular footprint SC Com 6 cell 6.

A person with mobile terminal A is visiting store 1, a person with mobile terminal B is visiting store 2, a person with mobile terminal C is visiting art gallery 3, a person with mobile terminal D is visiting restaurant 4, a person with mobile terminal E is visiting store 5, and a person with mobile terminal F is in common area 6.

As depicted in the NZR memory map shown in FIG. 25B applicable to mall 9 shown in FIG. 25A, as mobile terminals A, B, C, D, E, F enter mall 9 from the outside, the network hands off the signal from tower 10 to SC common 6b. For example, if mobile terminal A is entering store 1 from outside the mall, the hand-off may be from tower 10. If the mobile terminal A is entering store A from common area 6, there is no hand-off since common area 6 and store 1 both use SC common 6b to control the communication link between the mobile terminal A and the network. After the handoff to SC Com 6b, SC Com 6b controls the communication link between mobile terminals A-F and the network, and all control signals that may be imposed on the mobile terminals A-F by the network for the purpose of controlling functions of the mobile terminals that may be controlled by the network. Should the signal of tower 10 try to effect a handover of the communication link with mobile terminals A-F from SC Com 6b because the signal of tower 10 may become stronger than the signal of SC Com 6b or for some other reason, SC Com 6b will deny hand-over of the communication signal to tower 10 except as disclosed herein.

In this illustrative embodiment, SC Com 6b configures mobile terminals A-F to establish a communication link with tower 10 through SC Com 6b under restricted conditions as disclosed herein.

In one illustrative example, SC Com 6b limits the digital data throughput to the mobile terminal A to digital data associated with store 1. In one illustrative example, data throughput to mobile terminal A is limited by SC Com 6b to digital data from the website of the store (e.g., www.store1.com) or from a sponsored or co-sponsored site of store 1. The website of the store (e.g., www.store1.com) or from a sponsored or co-sponsored site of store 1 may be stored according to a memory map as depicted in FIG. 25B in NZR 23 of network as depicted in FIG. 20 for example. Alternatively, the memory map may be stored in NZR 33 of small cell 32 as depicted in FIG. 21. In another embodiment, the memory map may be stored in NZR 23 of network and NZR 33 of small cell 32 as depicted in FIG. 22. In other embodiments portions of the memory map may be located in the NZR of the network with remaining portions located in the NZR of the small cell.

This NZ or dead zone condition applies when mobile terminal A enters store 1. On entry of store 1, the communication link between the mobile terminal A and the network is handed off to SC Com 6b. Once the handoff is complete, the network knows that mobile terminal A is connected to the network through SC Com 6b. The network also knows that when mobile terminal A is connected at location store 1 to the network through SC Com 6b, the restrictions set forth in the memory map associated with SC Com 6b @ 1 apply. As explained, the map may be in an NZR register in the network, on the SC Com 6b, or both.

The network then applies the restrictions found in the memory map to the communication link between the mobile terminal A and the network. In this example, those restrictions would cause SC Com 6b to configure mobile terminal A to LINK to AP1 which would be tuned to the channel of the internet that broadcasts data on store 1. For example, the channel may be www.store1.com, store1 sponsored sites, and/or store1/carrier co-sponsored sites. SC Com 6b would also tune the cellular data on the communication link to the channel of the internet that broadcasts data on store 1. For example, the channel may be www.store1.com, store1 sponsored sites, and/or store1/carrier co-sponsored sites. With these restrictions applied to mobile terminal A, the internet browsing possible by the mobile terminal A is limited to data on the channel. In this way, the internet browsing capability of mobile terminal A has been throttled to cellular data to content from www.store1.com, store1 sponsored sites, and/or store1/carrier co-sponsored sites.

SC Com 6b also configures mobile terminal A so as to hide all but the AP1 of store 1.

The operation of mobile terminals B-F at store 2, art gallery 3, restaurant 4, store 5, and common area 6 are similar to the operation of mobile terminal A at store 1 with sc comm 6b controlling the communication link between these mobile terminals and the network except imposing the restrictions noted in the memory map depicted in FIG. X that for each location is different. Alternatively, all the restrictions may be the same or substantially similar.

For example, and as depicted on the memory map of FIG. 25B, mobile terminal B will have no internet access from an AP at store 2 since there is no AP at store 2. However, mobile terminal B may have access to AP1 of store 1, AP3 of art gallery 3, and AP 4 of restaurant 4 if access to those APs is unrestricted and the signal strength is sufficient. Each of these APs may allow access to drive traffic to the respective outlets. For example, AP4 of restaurant 4 may be configured to allow mobile terminal B to access AP4 only on the channel of the internet that broadcasts data on store 1 such as www.restaurant4.com, restaurant 4 sponsored sites, and/or restaurant 4/carrier co-sponsored sites. AP1 and AP3 may likewise be configured to allow mobile terminal B to tune to one or more limited channels of content associated with store 1 or art gallery 3, as the case may be.

As another example, the internet browsing possible by the mobile terminal C is limited to data from AP3 on the art gallery predetermined channel. Mobile terminal C would not be able to access cellular data or place a voice call. In addition, photo, audio, video functionality of mobile terminal C would be disabled so as to prevent photos, audio, and/or video functionality while in the art gallery.

With restrictions applied to mobile terminal D, the internet browsing possible by the mobile terminal D is limited to data through the app for menu and ordering. Mobile terminal D would not be able to access AP or cellular data or place a voice call.

The operation of mobile terminals E and F would be similar to the operation of mobile terminal A in store 1 except that sc comm 6b is controlling the communication link between the mobile terminal E and F and the network by imposing the restrictions noted in the memory map depicted in FIG. 25B. For example, with mobile terminal E, AP5 access would be denied cellular data would be throttled to www.store5.com, store5 sponsored sites, and/or store5/carrier co-sponsored sites. For mobile terminal F, both AP6 data and cellular data over SC Com 6 would be throttled such as to non-compete sites.

Figure 26A:
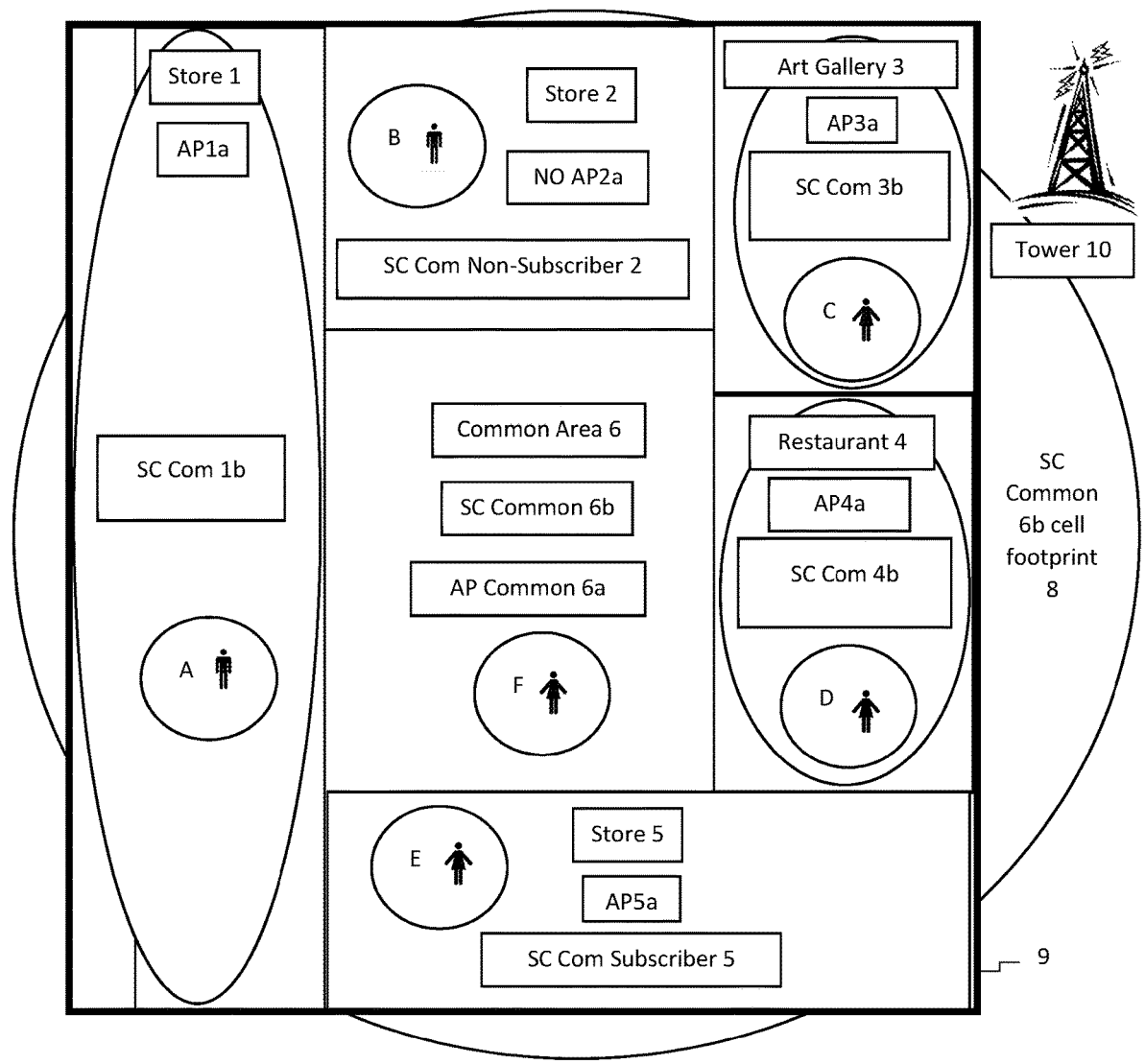

FIG. 26A shows a mall 9 with store1, store 2, art gallery 3, restaurant 4, store 5, and a common area 6.

Store 1 includes an access point ("AP") denoted AP 1a, a small cell ("SC Com") denoted SC Com 1b which forms a cellular footprint ("SC Common Cell") denoted SC Com 1 cell 1.

Store 2 includes no access point (i.e., No AP 2a, has no small cell, and does not subscribe to SC com 6a (i.e., SC Common 6 cell 6).

Art gallery 3 includes an access point AP 3a, a small cell SC Com 3b which forms a cellular footprint SC Com 3 cell 3.

Restaurant 4 includes an access point AP 4a, a small cell SC Com 4b which forms a cellular footprint SC Com 4 cell 4.

Store 5 includes access point (i.e., AP 5a), has no small cell, but subscribes to SC com 6a (i.e., SC Common 6 cell 6).

Common area 6 includes an access point AP 6a, a small cell SC Com 6b which forms a cellular footprint SC Com 6 cell 6.

A person with mobile terminal A is visiting store 1, a person with mobile terminal B is visiting store 2, a person with mobile terminal C is visiting art gallery 3, a person with mobile terminal D is visiting restaurant 4, a person with mobile terminal E is visiting store 5, and a person with mobile terminal F is in common area 6.

As depicted in the NZR memory map shown in FIG. 26B applicable to mall 9 shown in FIG. 26A, as mobile terminal A enters store 1, the network hands off the signal from either tower 10 or SC common 6b, as the case may be, to SC Com 1b. For example, if mobile terminal A is entering store 1 from outside the mall, the hand-off may be from tower 10. If the mobile terminal A is entering store A from common area 6, the hand-off may be from SC common 6b. In either case, after the handoff to SC Com 1b, SC Com 1b controls the communication link between mobile terminal A and the network, and all control signals that may be imposed on the mobile terminal A by the network for the purpose of controlling functions of the mobile terminal A that may be controlled by the network. Should the signal of SC Com 6b at common area 6 try to effect a handover of the communication link with mobile terminal A from SC Com 1b because the signal of SC Com 6b may become stronger than the signal of SC1 Com 1b or for some other reason, SC Com 1 will deny hand-over of the communication signal to SC Com 6b. Similarly, should the signal of tower 10 try to effect a handover of the communication link with mobile terminal A from SC Com 1b because the signal of tower 10 may become stronger than the signal of SC Com 1b or for some other reason, SC Com 1b will deny hand-over of the communication signal to tower 10 except as disclosed herein.

In this illustrative embodiment, store 1 configures its SC Com 1b to permit mobile terminal A to establish a communication link with tower 10 through SC Com 1b under restricted conditions as disclosed herein. In one illustrative example, SC Com 1b limits the digital data throughput to the mobile terminal A to digital data associated with store 1. In one illustrative example, data throughput to mobile terminal A is limited by SC Com 1b to digital data from the website of the store (e.g., www.store1.com) or from a sponsored or co-sponsored site of store 1. The website of the store (e.g., www.store1.com) or from a sponsored or co-sponsored site of store 1 may be stored according to a memory map as depicted in FIG. 26B in NZR 23 of network as depicted in FIG. 20 for example. Alternatively, the memory map may be stored in NZR 33 of small cell 32 as depicted in FIG. 21. In another embodiment, the memory map may be stored in NZR 23 of network and NZR 33 of small cell 32 as depicted in FIG. 22. In other embodiments portions of the memory map may be located in the NZR of the network with remaining portions located in the NZR of the small cell.

This NZ or dead zone condition applies when mobile terminal A enters store 1. On entry of store 1, the communication link between the mobile terminal A and the network is handed off to SC Com 1b. Once the handoff is complete, the network knows that mobile terminal A is connected to the network through SC Com 1b. The network also knows that when mobile terminal A is connected to the network through SC Com 1b, the restrictions set forth in the memory map associated with SC Com 1b apply. As explained, the map may be in an NZR register in the network, on the SC Com 1b, or both.

The network then applies the restrictions found in the memory map to the communication link between the mobile terminal A and the network. In this example, those restrictions would cause SC Com 1b to configure mobile terminal A to LINK to AP1 which would be tuned to the channel of the internet that broadcasts data on store 1. For example, the channel may be www.store1.com, store1 sponsored sites, and/or store1/carrier co-sponsored sites. SC Com 1b would also tune the cellular data on the communication link to the channel of the internet that broadcasts data on store 1. For example, the channel may be www.store1.com, store1 sponsored sites, and/or store1/carrier co-sponsored sites. With these restrictions applied to mobile terminal A, the internet browsing possible by the mobile terminal A is limited to data on the channel. In this way, the internet browsing capability of mobile terminal A has been throttled to cellular data to content from www.store1.com, store1 sponsored sites, and/or store1/carrier co-sponsored sites.

Mobile terminal A would not be able to establish a communication link with small cells located elsewhere since SC Com 1b prevents it. SC Com 1b also configures mobile terminal A so as to hide all but the AP1 of store 1.

Store 2 has neither an AP nor small cell. Nor does store 2 subscribe to the SC Common. In effect, store 2 is a no dead zone. There is no restriction imposed on the communication link between mobile terminal B and the network by store 2. When mobile terminal B enters store 2, there is nothing done by store 2 to force a handoff of the communication link between mobile terminal B and the network. If mobile terminal B enters from the street, the communication link between mobile terminal B and the network will be through tower 10. That communication link may remain uninterrupted while mobile terminal B is in store 2. If mobile terminal B enters from common area 6, the communication the communication link between mobile terminal B and the network will be through SC common 6. Once in the store, the communication link to the network through SC common 6 will be interrupted since store 2 is not a subscriber to receive access to the signal from SC common 6. Mobile terminal B will then search for and find the signal from tower 10 and connect to the network through tower 10. The communication link between mobile terminal B and the network through tower 10 may be uninterrupted while the mobile terminal B is in store 2.

As depicted on the memory map of FIG. 26B, mobile terminal B will have no internet access from an AP at store 2 since there is no AP at store 2. However, mobile terminal B may have access to AP1 of store 1, AP3 of art gallery 3, and AP 4 of restaurant 4 if access to those APs is unrestricted and the signal strength is sufficient. Each of these APs may allow access to drive traffic to the respective outlets. For example, AP4 of restaurant 4 may be configured to allow mobile terminal B to access AP4 only on the channel of the internet that broadcasts data on store 1 such as www.restaurant4.com, restaurant 4 sponsored sites, and/or restaurant 4/carrier co-sponsored sites. AP1 and AP3 may likewise be configured to allow mobile terminal B to tune to one or more limited channels of content associated with store 1 or art gallery 3, as the case may be.

Art Gallery 3 has AP3 and SC Com 3. As mobile terminal C enters art gallery 3, the network hands off the signal from either tower 10 or SC common 6b, as the case may be, to SC Com 3b. For example, if mobile terminal C is entering art gallery 3 from outside the mall, the hand-off may be from tower 10. If the mobile terminal C is entering gallery 3 from common area 6, the hand-off may be from SC common 6a. In either case, after the handoff to SC Com 3b, SC Com 3b controls the communication link between mobile terminal C and the network, and all control signals that may be imposed on the mobile terminal C by the network for the purpose of controlling functions of the mobile terminal C that may be controlled by the network. Should the signal of SC Com 6b at common area 6 try to effect a handover of the communication link with mobile terminal C from SC Com 3b because the signal of SC Com 6b may become stronger than the signal of SC Com 3b or for some other reason, SC Com 3b will deny hand-over of the communication signal to SC Com 6b. Similarly, should the signal of tower 10 try to effect a handover of the communication link with mobile terminal C from SC Com 3b because the signal of tower 10 may become stronger than the signal of SC Com 3b or for some other reason, SC Com 3b will deny hand-over of the communication signal to tower 10 except as disclosed herein.

In this illustrative embodiment, art gallery 3 configures its SC Com 3b to permit mobile terminal B to establish a communication link with tower 10 through SC Com 3b under restricted conditions as disclosed herein. In one illustrative example, SC Com 3b limits the digital data throughput to the mobile terminal C to digital data associated with art gallery 3. In one illustrative example, data throughput to mobile terminal B is limited by SC Com 3b to digital data from the website of the art gallery (e.g., www.artgallery3.com) or from a sponsored or co-sponsored site of store 1. The website of the store (e.g., www.artgallery3.com) or from a sponsored or co-sponsored site of art gallery 3 may be stored according to a memory map as depicted in FIG. 26B in NZR 23 of network as depicted in FIG. 20 for example. Alternatively, the memory map may be stored in NZR 33 of small cell 32 as depicted in FIG. 21. In another embodiment, the memory map may be stored in NZR 23 of network and NZR 33 of small cell 32 as depicted in FIG. 22. In other embodiments portions of the memory map may be located in the NZR of the network with remaining portions located in the NZR of the small cell.

This NZ or dead zone condition applies when mobile terminal C enters art gallery 3. On entry of art gallery 3, the communication link between the mobile terminal C and the network is handed off to SC Com 3b. Once the handoff is complete, the network knows that mobile terminal C is connected to the network through SC Com 3b. The network also knows that when mobile terminal C is connected to the network through SC Com 3b, the restrictions set forth in the memory map associated with SC Com 3b apply. As explained, the map may be in an NZR register in the network, on the SC Com 3b, or both.

The network then applies the restrictions found in the memory map to the communication link between the mobile terminal C and the network. In this example, those restrictions would cause SC Com 3b to configure mobile terminal C to LINK to AP3 which would be tuned to the channel of the internet that broadcasts data on art gallery 3. For example, the channel may be www.artgallery3.com, artgallery3 sponsored sites, and/or artgallery3/carrier co-sponsored sites. SC Com 3b would also throttle cellular data and apply control signals from SC Com 3b, the network, or both to prevent photo, audio, video, voice.

With these restrictions applied to mobile terminal C, the internet browsing possible by the mobile terminal C is limited to data from AP3 on the art gallery predetermined channel. Mobile terminal C would not be able to access cellular data or place a voice call. In addition, photo, audio, video functionality of mobile terminal C would be disabled so as to prevent photos, audio, and/or video functionality while in the art gallery.

Mobile terminal A would not be able to establish a communication link with small cells located elsewhere since SC Com 1b prevents it. SC Com 1b also configures mobile terminal A so as to hide all but the AP1a of store 1.

Restaurant 4 has AP4a and SC Com 4b. As mobile terminal D enters restaurant 4, the network hands off the signal from either tower 10 or SC common 6b, as the case may be, to SC Com 3b. For example, if mobile terminal D is entering restaurant 4 from outside the mall, the hand-off may be from tower 10. If the mobile terminal D is entering restaurant 4 from common area 6, the hand-off may be from SC common 6b. In either case, after the handoff to SC Com 4b, SC Com 4b controls the communication link between mobile terminal D and the network, and all control signals that may be imposed on the mobile terminal D by the network for the purpose of controlling functions of the mobile terminal D that may be controlled by the network. Should the signal of SC Com 6b at common area 6 try to effect a handover of the communication link with mobile terminal C from SC Com 4b because the signal of SC Com 6b may become stronger than the signal of SC Com 4b or for some other reason, SC Com 4B will deny hand-over of the communication signal to SC Com 6b. Similarly, should the signal of tower 10 try to effect a handover of the communication link with mobile terminal C from SC Com 4b because the signal of tower 10 may become stronger than the signal of SC Com 4b or for some other reason, SC Com 4b will deny hand-over of the communication signal to tower 10 except as disclosed herein.

In this illustrative embodiment, restaurant 4 configures its SC Com 4b to permit mobile terminal B to establish a communication link with tower 10 through SC Com 4b under restricted conditions as disclosed herein. In one illustrative example, SC Com 4b limits the digital data throughput to the mobile terminal D to digital data associated with restaurant 4. In one illustrative example, data throughput to mobile terminal D is limited by SC Com 4b to digital data from an app for menu and ordering. The website to which the app for menu and ordering connects may be stored according to a memory map as depicted in FIG. 26B in NZR 23 of network as depicted in FIG. 20 for example. Alternatively, the memory map may be stored in NZR 33 of small cell 32 as depicted in FIG. 21. In another embodiment, the memory map may be stored in NZR 23 of network and NZR 33 of small cell 32 as depicted in FIG. 22. In other embodiments portions of the memory map may be located in the NZR of the network with remaining portions located in the NZR of the small cell.

This NZ or dead zone condition applies when mobile terminal D enters restaurant 4. On entry of restaurant 4, the communication link between the mobile terminal D and the network is handed off to SC Com 4b. Once the handoff is complete, the network knows that mobile terminal D is connected to the network through SC Com 4b. The network also knows that when mobile terminal D is connected to the network through SC Com 4b, the restrictions set forth in the memory map associated with SC Com 4b apply. As explained, the map may be in an NZR register in the network, on the SC Com 4b, or both.

The network then applies the restrictions found in the memory map to the communication link between the mobile terminal D and the network. In this example, those restrictions would cause SC Com 4b to configure mobile terminal D to LINK by app to a website for menu and ordering.

With these restrictions applied to mobile terminal D, the internet browsing possible by the mobile terminal D is limited to data through the app for menu and ordering. Mobile terminal D would not be able to access AP or cellular data or place a voice call.

Mobile terminal D would not be able to establish a communication link with small cells located elsewhere since SC Com 4b prevents it. SC Com 4b also configures mobile terminal D so as to hide all APs.

Store 5 has AP5 but no SC Com. Instead, store 5 subscribes to sc comm 6b to establish the communication link between mobile terminal E and the tower. The operation of mobile terminal E would be similar to the operation of mobile terminal 1 in store 1 except that sc comm 6b is controlling the communication link between the mobile terminal E and the network and imposing the restrictions noted in the memory map depicted in FIG. 26B.

Common area 6 has both AP Comm 6a and SC Common 6b. The operation of mobile terminal F would be similar to the operation of mobile terminal A in store 1 except that sc comm 6b is controlling the communication link between the mobile terminal F and the network and imposing the restrictions noted in the memory map depicted in FIG. 26B.

Figure 27A:
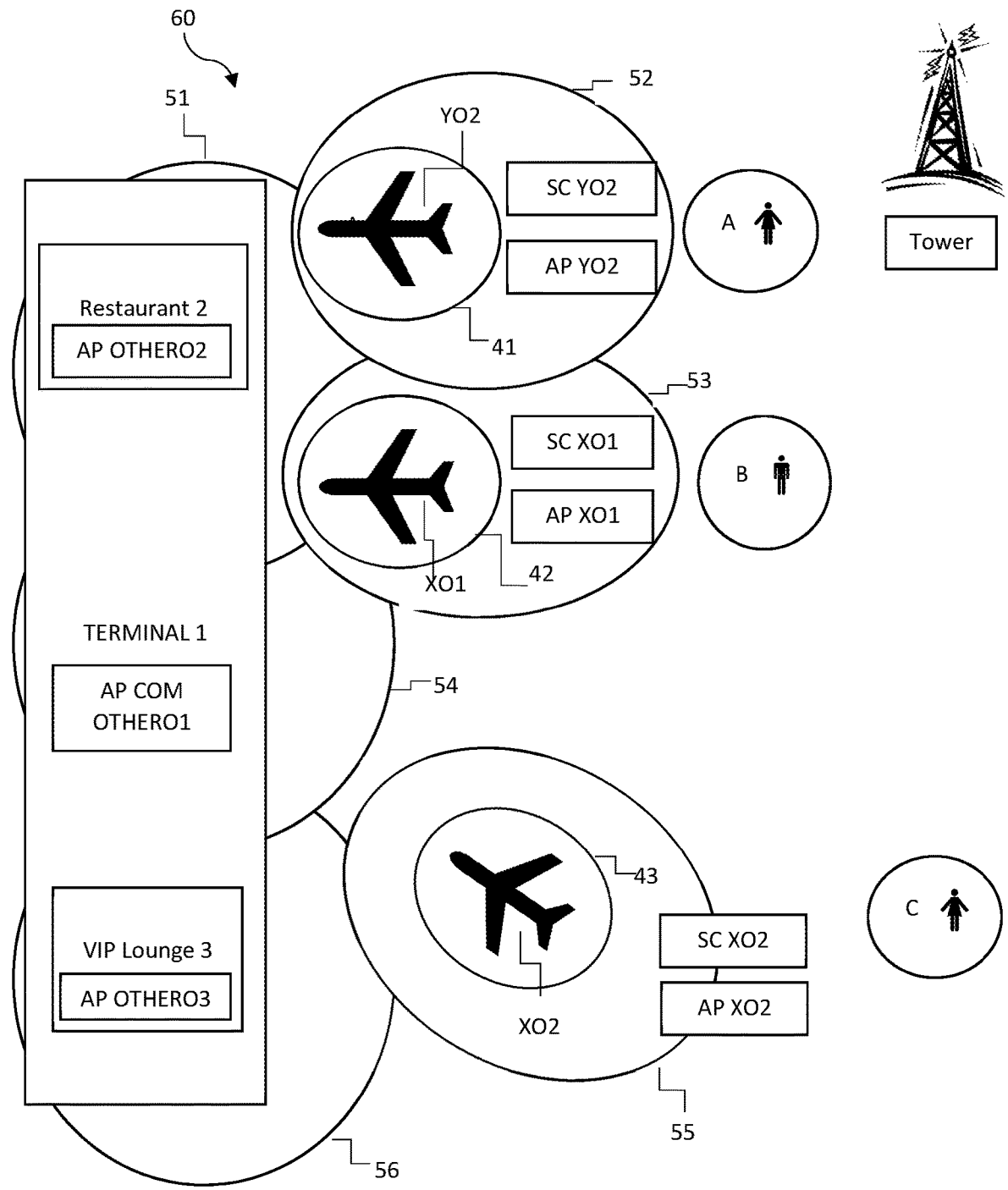

FIG. 27A shows airport 60 with terminal 1 including restaurant 2, and VIP lounge 3.

Terminal 1 includes an access point ("AP") denoted AP COMMON OTHERO1, accessible to passengers in terminal 1. AP COMMON OTHERO1 services radio cell 54, that is the radio coverage or radio footprint provided by the AP COMMON OTHERO1.

Restaurant 2 includes access point AP OTHERO2, accessible by passengers on-site the restaurant 2. AP OTHERO2 services radio cell 51, that is the radio coverage or footprint provided by the AP OTHERO1.

VIP lounge 3 includes access point AP OTHERO3, accessible by passengers on-site the VIP lounge 3. AP OTHERO3 services radio cell 56, that is the radio coverage or footprint provided by the AP OTHERO3.

Also at airport 60 are three airplanes XO1, YO1, YO2. Airplane XO1 is operated by carrier XO and airplanes YO1, YO2 by carrier YO.

Airplane YO2 includes an access point AP YO2, which forms a radio footprint 41, and a small cell SC YO2 which forms a radio footprint 52.

Airplane XO1 includes an access point AP XO1, which forms a radio footprint 42, and a small cell SC XO1 which forms a radio footprint 53.

Airplane XO2 includes an access point AP XO2, which forms a radio footprint 43, and a small cell SC XO2 which forms a radio footprint 54.

A person with mobile terminal A is inside airplane YO2, a person with mobile terminal B is inside airplane XO1, and a person with mobile terminal C is inside airplane XO2.

As depicted in FIG. 27B, as mobile terminal A enters YO2, the network hands off the signal from tower 10 to SC YO2. After the handoff to SC YO2, SC YO2 controls the communication link between mobile terminal A and the network, and all control signals that may be imposed on the mobile terminal A by the network for the purpose of controlling functions of the mobile terminal A that may be controlled by the network. Should the signal of the signal of tower 10 try to effect a handover of the communication link with mobile terminal A from SC YO2 because the signal of tower 10 may become stronger than the signal of SC YO2 or for some other reason, SC YO2 will deny hand-over of the communication signal to tower 10 except as disclosed herein.

In this illustrative embodiment, carrier Y configures its SC YO2 to permit mobile terminal A to establish a communication link with tower 10 through SC YO2 under restricted conditions as disclosed herein. In one illustrative example, SC YO2 limits the digital data throughput to the mobile terminal A to digital data except at gate. The condition of no digital data except at gate may be stored according to a memory map as depicted in FIG. 27B in NZR 23 of network as depicted in FIG. 20 for example. Alternatively, the memory map may be stored in NZR 33 of small cell 32 as depicted in FIG. 21. In another embodiment, the memory map may be stored in NZR 23 of network and NZR 33 of small cell 32 as depicted in FIG. 22. In other embodiments portions of the memory map may be located in the NZR of the network with remaining portions located in the NZR of the small cell.

This NZ or dead zone condition applies when mobile terminal A enters airplane YO2. On entry of airplane YO2, the communication link between the mobile terminal A and the network is handed off to SC YO2. Once the handoff is complete, the network knows that mobile terminal A is connected to the network through SC YO2. The network also knows that when mobile terminal A is connected to the network through SC YO2, the restrictions set forth in the memory map associated with SC YO2 apply. As explained, the map may be in an NZR register in the network, on the SC1 Com 1b, or both.

The network then applies the restrictions found in the memory map to the communication link between the mobile terminal A and the network. In this example, those restrictions would cause SC YO2 to configure mobile terminal A to LINK to AP YO2 which would be tuned to the channel of the internet that broadcasts data on airplane carrier YO. For example, the channel may be www.carrierYO.com, carrierYO.com sponsored sites, and/or carrierYO.com/carrier co-sponsored sites. SC YO2 would also deny any cellular communication except at gate. With these restrictions applied to mobile terminal A, the internet browsing possible by the mobile terminal A is limited to data on the channel of the airplane carrier YO or cellular data but only at the gate. In this way, the internet browsing capability of mobile terminal A has been throttled to cellular data at the gate or data from www.carrierYO.com, carrierYO.com sponsored sites, and/or carrierYO.com/carrier co-sponsored sites.

Mobile terminal A would not be able to establish a communication link with small cells located elsewhere since SC YO2 prevents it. SC YO2 also configures mobile terminal A so as to hide all but the AP Y02 of airplane Y02. FIG. 27B shows the various illustrative restrictions with other AP and small cells. On the memory map of FIG. 27B, these restrictions may be the "other" restrictions noted on the map.

The operation of mobile terminals B and C in airplanes XO1 and XO2 are similar since they are both operated by the same carrier XO. Alternatively, the same carrier may have different restrictions apply to different airplanes. Further, different restrictions may apply at different airports or at different gates at the same airport, and so on. In this embodiment, SC XO1 and SC XO2 are controlling the communication link between the mobile terminals B and C respectively and the network and imposing the restrictions noted in the memory map depicted in FIG. 27B. SC XO1 and SC XO2 configure mobile terminals B and C to hide or deny AP XO1 and AP XO2 to passengers only. This allows the crew to access the internet over the AP. In addition, both SC XO1 and SC XO2 throttle data to www.carrier XO.com, carrier XO sponsored sites, and/or carrier XO/carrier co-sponsored sites at the gate only.

FIG. 28A and FIG. 28B depict alternative illustrative embodiment memory maps for use with airplane carriers as depicted in FIG. 27B in NZR 23 of network as depicted in FIG. 20 for example. Alternatively, the memory map may be stored in NZR 33 of small cell 32 as depicted in FIG. 21. In another embodiment, the memory map may be stored in NZR 23 of network and NZR 33 of small cell 32 as depicted in FIG. 22. In other embodiments portions of the memory map may be located in the NZR of the network with remaining portions located in the NZR of the small cell.

FIG. 28A illustrates restrictions imposed by Carrier XO on communications with the network and AP by small cells. In this embodiment, Carrier XO imposes like restrictions on all of its airplanes at any airport.

FIG. 28B illustrates restrictions imposed by Carrier YO on airplane YO2 communications with the network and AP by small cell SC YO2. In this embodiment, Carrier YO imposes different restrictions on its airplane YO at different airports. For example, in U.S. airports, communication link is denied by SC YO2 except at gate. At Heathrow, the SC YO data is throttled to www.carrier XO.com, carrier XO sponsored sites, and/or carrier XO/carrier co-sponsored sites at gate only.

While the invention has been described in connection with specific embodiments, it is evident that numerous alternatives, modifications, and variations will be apparent to those skilled in the art within the spirit and scope of the invention described above.

What is claimed is:

1. A communication system comprising:
   a wireless device capable of performing a function;
   a cellular network configured to control a cellular communication link with the wireless device to provide a cellular network service by a carrier, the cellular network including a base station;
   a Wi-Fi access point at or near a location, the Wi-Fi access point configured to control a Wi-Fi communication link between the wireless device and a Wi-Fi network when the wireless device is at the location;
   a cellular small cell at or near the location in communication with the base station, the cellular small cell configured to control the cellular communication link provided by the cellular network service by the carrier between the wireless device and the cellular network through the base station, to control the Wi-Fi communication link between the wireless device and the Wi-Fi network when the wireless device is at the location, and to control handoff from the cellular network to the Wi-Fi network when the wireless device is at the location;
   a database of one or more restrictions on the function of the wireless device that are to be applied to the wireless device when the wireless device is at the location;
   wherein the cellular small cell is configured to query whether the wireless device is at the location, and to prevent automatic handoff from the cellular network to the Wi-Fi network except to one or more preselected Internet addresses on the Wi-Fi network when the wireless device is at the location of the cellular small cell supported by the carrier.

2. The communication system of claim 1 wherein the database of one or more restrictions is located in the cellular network.

3. The communication system of claim 1 wherein the database of one or more restrictions is located on the small cell.

4. The communication system of claim 1 wherein the database of one or more restrictions includes a first portion that is maintained on a dead zone service external to the wireless device, the dead zone service connected to the cellular network, and a second portion that is maintained on the cellular small cell.

5. The communication system of claim 1 wherein the cellular small cell restricts internet access available through the cellular communication link based on the database of one or more restrictions when the wireless device is at the location.

6. The communication system of claim 5 wherein the cellular small cell disables camera functionality of the wireless device based on the database of one or more restrictions when the wireless device is at the location.

7. The communication system of claim 5 wherein the internet access available through the cellular communication link is restricted to one or more predetermined Internet addresses associated with the location.

8. The communication system of claim 7 wherein the one or more predetermined internet addresses associated with the location is selected from the group consisting of a website of the location, a sponsored website of the location, a website that does not compete with the location, and a combination thereof.

9. The communication system of claim 5 wherein the cellular small cell disables audio or video functionality of the wireless device based on the database of one or more restrictions when the wireless device is at the location.

10. The communication system of claim 1 wherein the one or more preselected Internet addresses is selected from the group consisting of a website of the location, a sponsored website of the location, a website that does not compete with the location, and a combination thereof.

11. The communication system of claim 1 wherein the wireless device is a smart phone.

12. The communication system of claim 1 wherein the cellular small cell limits the cellular data communication of the wireless device through the small cell.

13. The communication system of claim 1 wherein the cellular small cell limits the data communication of the wireless device through the access point.

14. The communication system of claim 1 wherein the cellular small cell limits the voice communication of the wireless device.

15. The communication system of claim 1 wherein the cellular small cell limits the camera function of the wireless device.

16. The communication system of claim 1 wherein the cellular small cell prevents automatic handoff from the cellular network to the Wi-Fi network except to one or more preselected Internet addresses on the Wi-Fi network when the wireless device is at the location of the cellular small cell supported by the carrier by configuring the wireless device to hide all but one or more access points associated with the location.

17. The communication system of claim 1 wherein the cellular small cell prevents automatic handoff from the cellular network to the Wi-Fi network except to one or more preselected Internet addresses on the Wi-Fi network when the wireless device is at the location of the cellular small cell supported by the carrier by configuring the wireless device to hide all but one or more Wi-Fi networks associated with the location.

18. The communication system of claim 1 wherein the location is an art gallery and the one or more preselected Internet addresses is selected from the group consisting of a website of the art gallery, a sponsored website of the art gallery, a website that does not compete with the art gallery, and a combination thereof.

19. The communication system of claim 1 wherein the location is an art gallery and the database of one or more restrictions on the function of the wireless device that are to be applied to the wireless device when the wireless device is at the location is a restriction selected from the group consisting of a restriction on the wireless device with respect to taking a photo, a restriction on the wireless device with respect to audio, a restriction on the wireless device with respect to video, a restriction on the wireless device with respect to making a voice call, a restriction on the wireless device with respect to texting, a restriction on the wireless device with respect to emailing, a restriction on the wireless device with respect to Internet browsing, and a combination thereof.

20. The communication system of claim 1 wherein the location is a restaurant and the one or more preselected Internet addresses is selected from the group consisting of a website of the restaurant, a sponsored website of the restaurant, a website that does not compete with the restaurant, and a combination thereof.

21. The communication system of claim 1 wherein the location is a restaurant and the database of one or more restrictions on the function of the wireless device that are to be applied to the wireless device when the wireless device is at the location includes a restriction selected from the group consisting of a restriction on voice and data communication from the cellular network and access point, a restriction on limiting internet access over the cellular network and Wi-Fi of the restaurant to content provided by the restaurant through a website belonging to the restaurant or sponsored site, a restriction on allowing access to a menu and ordering app, a restriction on allowing predetermined apps, and a combination thereof.

22. The communication system of claim 1 wherein the location is a restaurant and the one or more preselected Internet addresses includes a restaurant application for menu and ordering.

23. The communication system of claim 1 wherein the location is a store and the one or more preselected Internet addresses is selected from the group consisting of a website of the store, a sponsored website of the store, a website that does not compete with the store, and a combination thereof.

24. The communication system of claim 1 wherein the location is a store and the database of one or more restrictions on the function of the wireless device that are to be applied to the wireless device when the wireless device is at the location is a limitation on browsing to data from an access point associated with the store.

25. The communication system of claim 1 wherein the location is a brick and mortar store and the database of one or more restrictions on the function of the wireless device that are to be applied to the wireless device when the wireless device is at the location is a restriction on surfing the Internet to access competitive stores for comparative pricing or product offering on like products while at the brick and mortar store.

26. The communication system of claim 1 wherein the location is an airplane of an airline and the one or more preselected Internet addresses is selected from the group consisting of a website of the airline, a sponsored website of the airline, a website that does not compete with the airline, and a combination thereof.

27. The communication system of claim 1 wherein the database of one or more restrictions is provided by subscription.

28. A communication method for a communication system comprising:
providing a wireless device;
providing cellular network communication between a wireless device and a cellular network through a base station;
providing Wi-Fi communication between a wireless device and a Wi-Fi network through an access point when the wireless device is at a location;
providing cellular communication between a wireless device and the cellular network through a cellular small cell at or near the location in communication with the base station,
controlling a cellular communication link between the wireless device and the cellular network through the base station through the cellular small cell when the wireless device is at the location wherein a carrier provides a cellular network service;
controlling the Wi-Fi communication link between the wireless device and the Wi-Fi network through the cellular small cell when the wireless device is at the location;
controlling handoff from the cellular network to the Wi-Fi network when the wireless device is at the location;
preventing automatic handoff from the cellular network to the Wi-Fi network except to one or more preselected Internet addresses on the Wi-Fi network when the wireless device is at the location of the cellular small cell supported by the carrier.

29. The method of claim 28 further comprising the step of establishing a database of one or more restrictions on a function of a wireless device at the location, the one or more restrictions on the function of the wireless device applied through the cellular small cell when the wireless device is at the location being taken from the database of restrictions.

30. The method of claim 29 further comprising the step of maintaining the database of one or more restrictions on the network.

31. The method of claim 29 further comprising the step of maintaining the database of one or more restrictions on the cellular small cell.

32. The method of claim 29 further comprising the step of maintaining a first portion of the database of one or more restrictions on a dead zone service external to the wireless device, the dead zone service connected to the cellular network, and maintaining a second portion of the database of one or more restrictions on the cellular small cell.

33. The method of claim 29 wherein wireless device is cellular data communication, and wherein the one or more restrictions include limiting the cellular data communication of the wireless device through the small cell.

34. The method of claim 29 wherein wireless device is data communication through the access point, and wherein the one or more restrictions include limiting the data communication of the wireless device through the access point.

35. The method of claim 29 wherein wireless device is voice communication and wherein the one or more restrictions include limiting the voice communication of the wireless device.

36. The method of claim 29 wherein wireless device is a camera function and wherein the one or more restrictions include preventing the camera function of the wireless device.

37. The method of claim 29 wherein the location is an art gallery and the database of one or more restrictions on the function of the wireless device that are to be applied to the wireless device when the wireless device is at the location is a restriction selected from the group consisting of a restriction on the wireless device with respect to taking a photo, a restriction on the wireless device with respect to audio, a restriction on the wireless device with respect to video, a restriction on the wireless device with respect to making a voice call, a restriction on the wireless device with respect to texting, a restriction on the wireless device with respect to emailing, a restriction on the wireless device with respect to Internet browsing, and a combination thereof.

38. The method of claim 29 wherein the location is a restaurant and the database of one or more restrictions on the function of the wireless device that are to be applied to the wireless device when the wireless device is at the location includes a restriction selected from the group consisting of a restriction on voice and data communication from the cellular network and access point, a restriction on limiting internet access over the cellular network and Wi-Fi of the restaurant content provided by the restaurant through a website belonging to the restaurant or sponsored site, a restriction on allowing access to menu and ordering app, a restriction on allowing predetermined apps, and a combination thereof.

39. The method of claim 29 wherein the location is a store and the database of one or more restrictions on the function of the wireless device that are to be applied to the wireless device when the wireless device is at the location is a limitation on browsing to data from an access point associated with the store.

40. The method of claim 29 wherein the location is a brick and mortar store and the database of one or more restrictions on the function of the wireless device that are to be applied to the wireless device when the wireless device is at the location is a restriction on surfing the Internet to access competitive stores for comparative pricing or product offering on like products while at the brick and mortar store.

41. The method of claim 29 wherein the database of one or more restrictions is provided by subscription.

42. The communication method of claim 28 wherein the step of preventing automatic handoff from the cellular network to the Wi-Fi network except to one or more preselected Internet addresses on the Wi-Fi network when the wireless device is at the location of the cellular small cell supported by the carrier is by configuring the wireless device to hide all but one or more access points associated with the location.

43. The communication method of claim 28 wherein the step of preventing automatic handoff from the cellular network to the Wi-Fi network except to one or more preselected Internet addresses on the Wi-Fi network when the wireless device is at the location of the cellular small cell supported by the carrier is by configuring the wireless device to hide all but one or more Wi-Fi networks associated with the location.

44. The method of claim 28 wherein the location is an art gallery and the one or more preselected Internet addresses is selected from the group consisting of a website of the art gallery, a sponsored web site of the art gallery, a website that does not compete with the art gallery, and a combination thereof.

45. The method of claim 28 wherein the location is a restaurant and the one or more preselected Internet addresses is selected from the group consisting of a website of the restaurant, a sponsored website of the restaurant, a website that does not compete with the restaurant, and a combination thereof.

46. The method of claim 28 wherein the location is a restaurant and the one or more preselected Internet addresses includes a restaurant application for a menu and ordering.

47. The method of claim 28 wherein the location is a store and the one or more preselected Internet addresses is selected from the group consisting of a website of the store, a sponsored website of the store, a website that does not compete with the store, and a combination thereof.

48. The method of claim 28 wherein the location is an airplane of an airline and the one or more preselected Internet addresses is selected from the group consisting of a website of the airline, a sponsored website of the airline, a website that does not compete with the airline, and a combination thereof.

\* \* \* \* \*